(12) United States Patent
Muratoglu et al.

(10) Patent No.: US 10,189,961 B2
(45) Date of Patent: Jan. 29, 2019

(54) CREEP RESISTANT, HIGHLY LUBRICIOUS, TOUGH, AND IONIC HYDROGELS INCLUDING PVA-PAAMPS HYDROGELS

(75) Inventors: Orhun K. Muratoglu, Cambridge, MA (US); Hatice Bodugoz-Senturk, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 643 days.

(21) Appl. No.: 12/676,379

(22) PCT Filed: Sep. 4, 2008

(86) PCT No.: PCT/US2008/075252
§ 371 (c)(1),
(2), (4) Date: Nov. 8, 2010

(87) PCT Pub. No.: WO2009/032921
PCT Pub. Date: Mar. 12, 2009

(65) Prior Publication Data
US 2011/0054622 A1    Mar. 3, 2011

Related U.S. Application Data

(60) Provisional application No. 60/970,052, filed on Sep. 5, 2007.

(51) Int. Cl.
*C08J 3/28* (2006.01)
*C08J 3/075* (2006.01)
*C08J 3/24* (2006.01)

(52) U.S. Cl.
CPC .............. *C08J 3/28* (2013.01); *C08J 3/075* (2013.01); *C08J 3/246* (2013.01); *C08J 2329/04* (2013.01)

(58) Field of Classification Search
CPC . C08J 3/28; C08J 3/075; C08J 2329/04; C08J 3/264; C08F 2/50; Y10S 524/916
(Continued)

(56) References Cited

U.S. PATENT DOCUMENTS 5,705,780 A * 1/1998 Bao .......................... 204/157.15
2001/0003796 A1   6/2001 Yang et al.
(Continued)

FOREIGN PATENT DOCUMENTS

| JP | 1-270867 | 10/1989 | | |
|----|----------|---------|---|---|
| JP | 5-230313 | 9/1993 | | |
| WO | WO 2006-132661 | * 12/2006 | ................ | C08J 7/02 |

OTHER PUBLICATIONS

Supplementary European Search Report for Application No. EP 08829042.
(Continued)

*Primary Examiner* — Jessica M Roswell
(74) *Attorney, Agent, or Firm* — Quarles & Brady LLP

(57) ABSTRACT

The invention provides creep resistant, highly lubricious, tough and ionic hydrogels, creep resistant, lubricious, tough ionic hydrogel-containing compositions, and methods of making the same. The invention also provides methods of implanting or administering the creep resistant, highly lubricious, tough and ionic hydrogels including ionic PVA-hydrogels, ionic PVA-PAAMPS-hydrogels, or the ionic hydrogel-containing compositions to treat a subject in need. Methods of cross-linking pre-solidified or pre-gelled ionic hydrogels and making cross-linked ionic hydrogels and cross-linked ionic hydrogel-containing compositions also are disclosed herein.

55 Claims, 24 Drawing Sheets

(58) Field of Classification Search
USPC .................. 524/535; 623/18.11; 523/113
See application file for complete search history.

(56) References Cited

U.S. PATENT DOCUMENTS

| 2003/0044585 | A1 | 3/2003 | Taylor et al. |
| 2005/0148682 | A1 | 7/2005 | Hu et al. |
| 2006/0079597 | A1 | 4/2006 | Muratoglu et al. |
| 2006/0083773 | A1 | 4/2006 | Myung et al. |
| 2007/0100015 | A1 | 5/2007 | Hubbell et al. |

OTHER PUBLICATIONS

English Abstract of JP 1-270867.
Machine Translation of JP 5-230313.
PCT International Search Report, Application No. PCT/US2008/075252, dated Dec. 3, 2008.
PCT International Preliminary Report on Patentability, Application No. PCT/US2008/075252, dated Mar. 9, 2010.
Applicant, Response to Dec. 16, 2010 Extended European Search Report, European Patent Application No. 08 829 042.4, dated Jul. 21, 2011.
A.J. Aleyamma et al., "Polyvinyl Alcohol as a Biomaterial" in Blood Compatible Materials and Devices: Perspectives Towards the 21st Century, 1991, p. 123.

\* cited by examiner

A: Monomer removal begins by immersing in DI or saline

B: Monomer removal ends and vacuum dehydration starts

C: 1 day PEG400 immersion

D: Annealing

E: Rehydration starts

A: Monomer removal begins by immersing in DI or saline

B: Monomer removal ends and vacuum dehydration starts

C: 1 day PEG400 immersion

D: Annealing

E: Rehydration starts

A: Monomer removal begins by immersing in DI or saline

B: Monomer removal ends and vacuum dehydration starts

C: 1 day PEG400 immersion

D: Annealing

E: Rehydration starts

A: Monomer removal begins by immersing in DI or saline

B: Monomer removal ends and vacuum dehydration starts

C: 1 day PEG400 immersion

D: Annealing

E: Rehydration starts

CREEP RESISTANT, HIGHLY LUBRICIOUS, TOUGH, AND IONIC HYDROGELS INCLUDING PVA-PAAMPS HYDROGELS

This application is a 371 of International Application No. PCT/US2008/075252 filed Sep. 4, 2008, which claims priority to Provisional Application No. 60/970,052 filed April Sep. 5, 2007. The entire contents of the above-identified applications are hereby incorporated by reference.

FIELD OF THE INVENTION

The invention relates to creep resistant, highly lubricious, tough, and ionic hydrogels, creep resistant, highly lubricious, tough, and ionic hydrogel-containing compositions, and methods of making fabricated ionic hydrogels and ionic hydrogel-containing compositions. The invention also relates to methods of making and using fabricated creep resistant, highly lubricious, tough, and ionic hydrogels including ionic PVA-PAAMPS-hydrogels, and creep resistant, highly lubricious, tough, and ionic hydrogel-containing compositions for cartilage repair or as interpositional devices that require mechanical integrity, high water content, and excellent lubricity in order to fully function under the high stress environment in the joint space and withstand high loads of human joints.

BACKGROUND OF THE INVENTION

Biocompatible hydrogels for cartilage repair or as interpositional devices require mechanical integrity, high water content, and excellent lubricity to fully function under the high stress environment in the human joint spaces. Hydrogels are good candidates for such purposes, but currently available hydrogels do not provide sufficient mechanical strength, creep resistance, and lubricity compatible to that of natural articular cartilage. Most hydrogels systems available for articular cartilage repair or replacement applications do not have required mechanical strength to withstand the high loads of the human joint. Various dehydration methods, described below, can be used together in combinations to alter the properties of hydrogels.

Solvent dehydration of hydrogels is described by Bao (U.S. Pat. No. 5,705,780). Bao describes immersion of PVA hydrogel into solvents such as ethanol/water mixture at room temperature to dehydrate PVA hydrogel without shape distortion.

Hyon and Ikada (U.S. Pat. No. 4,663,358) and Bao (U.S. Pat. No. 5,705,780) describe the use of water and organic solvent mixture to dissolve PVA powder and subsequently cooling the solution below room temperature and heating back up to room temperature to form a hydrogel. The hydrogel is then immersed in water to remove the organic solvent. Hyon and Ikada contend that PVA hydrogels thus formed are transparent, as opposed to the ones formed by freeze-thaw method that uses water only as the solvent to dissolve the PVA powder. Freeze-thaw gels are described in the U.S. Pat. No. 5,705,780.

Bao (U.S. Pat. No. 5,522,898) describes dehydration methods that use air dehydration, vacuum dehydration, or partial humidity dehydration to control the rate of dehydration and prevent shape distortion of PVA hydrogels for use as prosthetic spinal devices to replace the nucleus pulpous.

Ku et al. (U.S. Pat. No. 5,981,826) describes a freeze-thaw method to form a PVA hydrogel by subjecting a PVA aqueous solution to freeze-thaw followed by immersion in water and additional cycles of freeze-thaw while immersed in water.

The creep resistance of PVA is currently achieved in the field by reducing the equilibrium water content (EWC) of the hydrogel, which also reduces the lubricity of the hydrogel. The strength and the creep resistance of a hydrogel can be increased by methods described elsewhere (see Muratoglu et al., WO 2006/132661). The lubricity of the hydrogel can be increased by increasing the hydrophilicity of the hydrogel (see Muratoglu et al., U.S. provisional patent application Nos. 60/913,415, filed Apr. 23, 2007; and 60/913,618, filed Apr. 24, 2007).

Same hydrogels lack the presence of ionic components/ moieties. Cartilage is a composite structure containing ionic moieties, which are along the backbone of the glucoseaminoglycan (GAG) molecules. The GAGs are polymers of disaccharides that contain alternating sequences of glucuronic acid (GlcA) and either N-acetylglucosamine (GlcNAc) or N-acetylgalactosamine (GalNAc). The GAG family members, including hyaluronic acid (HA), chondroitin sulfate (CS), keratan sulfate (KS), and heparan sulfate (HS), plays an important role in the mechanical and transport properties of extracellular matrix (for example, CS, HA) (see Grodzinsky et al., Annu. Rev. Biomed. Eng. 2000, 2:691-713) and in cell surface ligand binding interactions (for example, HS) (see Lander et al., J. Cell. Biol. 2000, 148:227-232). For example, chondroitin sulfate GAG (CS-GAG) contains on the average one negatively charged carboxylate and sulfate group per disaccharide which is ionized under physiological pH conditions. Therefore, the high negative charge density and associated electrical repulsion between CS-GAGS play an important role in electromechanical and physicochemical interaction within biological tissues such as cartilage. The role of electrical repulsive interactions can be important in articular cartilage, providing compressive and shear stiffness during the relative motion of opposing joint surfaces. The compressive resistance of cartilage is mainly due to highly charged CS-GAGs, which are attached to a core protein, forming the proteoglycan known as aggrecan (see Moonsoo and Grodzinsky, Macromolecules 2001, 34:8330-8339). These ionic moieties also increase the ability of the cartilage to hold water. In an effort to design a synthetic hydrogel to mimic the properties of cartilage it is also important to have ionic moieties to mimic the role of the GAG molecules. Therefore, there remains a long felt but unmet need for a creep resistant, highly lubricious, and tough cartilage-like ionic hydrogel composition having ionic moieties and increased the ability to hold water and mechanical strength. Such a creep resistant, highly lubricious, tough and ionic hydrogels comprising polyacrylamido-methylpropane sulfonic acid (PAAMPS) and methods of making such a composition were not known until the instant invention. Others have failed in such endeavors.

SUMMARY OF THE INVENTION

The present invention relates generally to creep resistant, highly lubricious, tough and ionic hydrogels including ionic PVA-hydrogels, ionic hydrogel-containing compositions, and methods of making ionic hydrogels and ionic hydrogel-containing compositions. The invention also relates to methods of making and using the creep resistant, highly lubricious, tough and ionic hydrogels including ionic PVA-PAAMPS-hydrogels, and creep resistant, highly lubricious, tough and ionic hydrogel-containing compositions in treating a subject in need, for example, for articular cartilage repair or replacement that require mechanical integrity, high water content, excellent lubricity to fully function under the high stress environment in the joint space and withstand high loads of human joints.

One aspect of the invention provides methods of making a creep resistant, highly lubricious, tough and ionic hydrogel comprising: a) contacting an aqueous solution of a polymer (such as poly(vinyl alcohol) (PVA)), with an aqueous solution of an ionic monomeric or polymeric compound (such as acrylamido-methylpropane sulfonic acid (AAMPS) or polyacrylamido-methylpropane sulfonic acid (PAAMPS)), in presence of an initiator, thereby forming an ionic hydrogel solution; b) heating and/or irradiating the ionic hydrogel solution, thereby forming an inter-penetrating network (IPN) structure of polymerized ionic hydrogel in the solution; and c) subjecting the ionic hydrogel IPN to one or more freeze-thaw cycles, thereby forming a creep resistant, highly lubricious, tough and ionic hydrogel solution.

Another aspect of the invention provides methods of making a creep resistant, highly lubricious, tough and ionic PVA-hydrogel comprising: a) contacting an aqueous solution of poly(vinyl alcohol) (PVA) with an aqueous solution of an ionic polymeric or monomeric compound in presence of an initiator, thereby forming an ionic PVA-hydrogel solution; b) heating and/or irradiating the ionic PVA-hydrogel solution, thereby forming an inter-penetrating network (IPN) structure of polymerized ionic hydrogel in the PVA solution; and c) subjecting the ionic PVA-hydrogel IPN to one or more freeze-thaw cycles, thereby forming a creep resistant, highly lubricious, tough and ionic PVA-hydrogel solution.

Another aspect of the invention provides methods of making a creep resistant, highly lubricious, tough and ionic PVA-PAAMPS-hydrogel comprising: a) contacting an aqueous solution of poly(vinyl alcohol) (PVA) with an aqueous solution of acrylamido-methylpropane sulfonic acid (AAMPS) solution in presence of an initiator, thereby forming a PVA-AAMPS solution; b) heating and/or irradiating the PVA-AAMPS solution, thereby forming an inter-penetrating network (IPN) structure of polymerized PAAMPS in the PVA solution; and c) subjecting the PVA-PAAMPS IPN to one or more freeze-thaw cycles, thereby forming a tough PVA-PAAMPS hydrogel.

According to another aspect of the invention, the method of making a creep resistant, highly lubricious, tough and ionic PVA-PAAMPS-hydrogel further comprising: a) dehydrating the tough PVA-PAAMPS hydrogel in a vacuum, thereby increasing the melting point of the PVA-PAAMPS hydrogel; b) annealing the dehydrated PVA-PAAMPS hydrogel at a temperature below the melting point of the dehydrated PVA-PAAMPS hydrogel; and c) re-hydrating the PVA-PAAMPS hydrogel, thereby forming a creep resistant, highly lubricious, tough and ionic PVA-PAAMPS-hydrogel.

Another aspect of the invention provides methods of making a creep resistant, highly lubricious, tough and ionic PVA-PAAMPS-hydrogel comprising: a) contacting an aqueous solution of poly(vinyl alcohol) (PVA) with an aqueous solution of polyacrylamido-methylpropane sulfonic acid (PAAMPS), thereby forming a homogenous PVA-PAAMPS solution; and b) subjecting the PVA-PAAMPS solution to one or more freeze-thaw cycles, thereby forming a tough PVA-PAAMPS hydrogel.

According to another aspect of the invention, the method of making a creep resistant, highly lubricious, tough and ionic PVA-PAAMPS-hydrogel further comprising: a) dehydrating the tough PVA-PAAMPS hydrogel at room temperature in a vacuum, thereby increasing the melting point of the PVA-PAAMPS hydrogel; b) annealing the dehydrated PVA-PAAMPS hydrogel at a temperature below the melting point of the dehydrated PVA-PAAMPS hydrogel; and c) re-hydrating the PVA-PAAMPS hydrogel, thereby forming a creep resistant, highly lubricious, tough and ionic PVA-PAAMPS-hydrogel.

Another aspect of the invention provides methods of making a creep resistant, highly lubricious, tough and ionic PVA-PAAMPS-hydrogel comprising: a) contacting an aqueous solution of poly(vinyl alcohol) (PVA) with an aqueous solution of polyacrylamido-methylpropane sulfonic acid (PAAMPS), thereby forming a homogenous PVA-PAAMPS solution; b) pouring the PVA-PAAMPS solution onto a mold (optionally pre-heated); c) cooling the PVA-PAAMPS-hydrogel by freezing at a temperature below 0° C.; d) thawing the PVA-PAAMPS-hydrogel to a temperature above 0° C.; and e) dehydrating PVA-PAAMPS-hydrogel at room temperature in a vacuum.

According to another aspect of the invention, the method of making a creep resistant, highly lubricious, tough and ionic PVA-PAAMPS-hydrogel further comprising: a) annealing the dehydrated PVA-PAAMPS hydrogel at a temperature below the melting point of the dehydrated PVA-PAAMPS hydrogel; and b) re-hydrating the PVA-PAAMPS hydrogel, thereby forming a creep resistant, highly lubricious, tough and ionic PVA-PAAMPS-hydrogel.

In another aspect, the invention provides ionic hydrogels, ionic PVA-hydrogels, or the PVA-PAAMPS hydrogels made by processes according to any of the methods described above, wherein the hydrogel does not lose lubricity upon annealing.

In another aspect, the invention provides ionic hydrogels, ionic PVA-hydrogels, or the PVA-PAAMPS hydrogels comprising dehydrated hydrogel made by processes according to any of the methods described above, wherein the hydrogel does not lose lubricity upon annealing.

According to another aspect, the invention provides methods as described above, wherein the hydrogel comprises ionic hydrogel (for example, ionic PVA-hydrogel, such as ionic PVA-PAAMPS hydrogel, and the like), wherein the hydrogel comprises water and/or one or more other ingredients. The ingredient is AAAMPS, PAAMPS, polyethylene glycol (PEG), and/or salt, proteoglycan, water soluble polymer, amino acid, alcohol, DMSO, water soluble vitamins, such as vitamin C, or vitamin E, wherein in the ingredients is partially or completely soluble in water.

According to another aspect, the ingredient is PAAMPS, and/or salt, proteoglycan, water soluble polymer amino acid, alcohol, DMSO, water soluble vitamins, such as vitamin C, or vitamin E, wherein in the ingredients is partially or completely soluble in water.

According to another aspect, the ingredient is PEG, wherein the PEG is in a solution of water, ethanol, ethylene glycol, DMSO, or another suitable solvent.

According to another aspect, the ingredient is non-volatile.

According to another aspect, the ingredient is at least partially miscible in water.

According to another aspect, the ingredient is selected from the group consisting of PEG, salt, NaCl, KCl, $CaCl_2$, vitamins (such as vitamin E, vitamin C), carboxylic acids, sulfonic acid, persulfate ($K_2S_2O_8$, $(NH4)_2S_2O_8$), anhydride, acrylates/polyacrylates, hydrocarbons, esters, and amino acids, PEG of different molecular weights or a blend of PEGs of different molecular weights, or any combination of the above.

According to another aspect, the water miscible polymer is PEO, Pluronic, amino acids, proteoglycans, polyacrylamido-methylpropane sulfonic acid (PAAMPS), polyvinylpyrrolidone, polysaccharides, dermatin sulfate, keratin sulfate, chondroitin sulfate, or dextran sulfate, or any combination of the above.

According to another aspect, the dehydration is carried out by placing the ionic hydrogel in: a) a non-solvent, wherein i) the non-solvent is PEG, alcohols, acetones, saturated salinated water, vitamin, or carboxylic acid, aqueous solution of a salt of an alkali metal, or a combination thereof, and ii) the non-solvent contains more than one ingredient including water, PEG, vitamin, polymer, ester, proteoglycan, and carboxylic acid, or b) in a supercritical fluid.

According to another aspect, the dehydration is carried out by leaving the ionic hydrogel (for example, ionic PVA-hydrogel, such as ionic PVA-PAAMPS hydrogel, and the like) in a vacuum at room temperature or at an elevated temperature, for example, at about 40° C., above 40° C., about 80° C., above 80° C., about 90° C., about 100° C., above 100° C., about 150° C., about 160° C., above 160° C., about 180° C., about 200° C., or above 200° C.

According to another aspect, the dehydration is carried out by heating the ionic hydrogel in air or inert gas to elevated temperature, wherein the heating rate is slow or fast or the heating follows the vacuum or air dehydration.

According to another aspect, the dehydrated hydrogel is re-hydrated by placing the dehydrated ionic hydrogel: i) in water, saline solution, Ringer's solution, salinated water, buffer solution, and the like, or a combination thereof, ii) in a humid chamber, or iii) at room temperature or at an elevated temperature.

According to another aspect, the ionic hydrogel (for example, ionic PVA-hydrogel, such as ionic PVA-PAAMPS hydrogel, and the like) made by above disclosed methods are re-hydrated to reach an equilibrium, wherein the ionic hydrogels are re-hydrated in water or a salt solution.

In another aspect, the invention provides medical implants comprising an ionic hydrogel (for example, ionic PVA-hydrogel, such as ionic PVA-PAAMPS hydrogel, and the like), for example, an interpositional device, wherein the interpositional device can be a unispacer, wherein the unispacer is a free floating articular implant in human joints such as a knee, a hip, a shoulder, an elbow, or an upper or an extremity joint or the intervertebral space in the spine.

According to another aspect, the ionic hydrogel (for example, ionic PVA-hydrogel, such as ionic PVA-PAAMPS hydrogel, and the like) is contacted with positively charged ions by immersing the hydrogel in a salt solution, an acidic solution, and/or an alkaline solution, thereby protecting the sulfonic acid group of the PAAMPS which is responsible from the high lubricity of the PAAMPS based gel from formation of acetyl groups during heating and/or annealing thereby keeping the lubricity at desired level even after the heating and/or annealing. Therefore, the lubricity of the gel is not decreased as a result of the heating and/or annealing. According to one aspect, the salt is NaCl, KCl, $CaCl_2$ or the like, the acidic solution is HCl, an acidic buffer, or the like, and the alkaline solution is NaOH, an alkaline buffer, or the like.

According to another aspect, the ionic hydrogel (for example, ionic PVA-hydrogel, such as ionic PVA-PAAMPS hydrogel, and the like) is contacted with different pH and ionic strength media by immersing the hydrogel in a salt solution, an acidic solution, and/or an alkaline solution, thereby increasing the lubricity of the PVA-PAAMPS hydrogels. According to one aspect, the salt is NaCl, KCl, $CaCl_2$ or the like, the acidic solution is HCl, an acidic buffer, or the like, and the alkaline solution is NaOH, an alkaline buffer, or the like.

Unless otherwise defined, all technical and scientific terms used herein in their various grammatical forms have the same meaning as commonly understood by one of ordinary skill in the art to which this invention belongs. Although methods and materials similar to those described herein can be used in the practice or testing of the present invention, the preferred methods and materials are described below. In case of conflict, the present specification, including definitions, will control. In addition, the materials, methods, and examples are illustrative only and are not limiting. The order of steps and actions set forth herein may be changed.

Further features, objects, advantages, and aspects of the present invention are apparent in the claims and the detailed description that follows. It should be understood, however, that the detailed description and the specific examples, while indicating preferred aspects of the invention, are given by way of illustration only, since various changes and modifications within the spirit and scope of the invention will become apparent to those skilled in the art from this detailed description.

during monomer removal in various solvents, dehydration in vacuum and in PEG400, annealing and subsequent rehydration in DI water.

Figure 13:
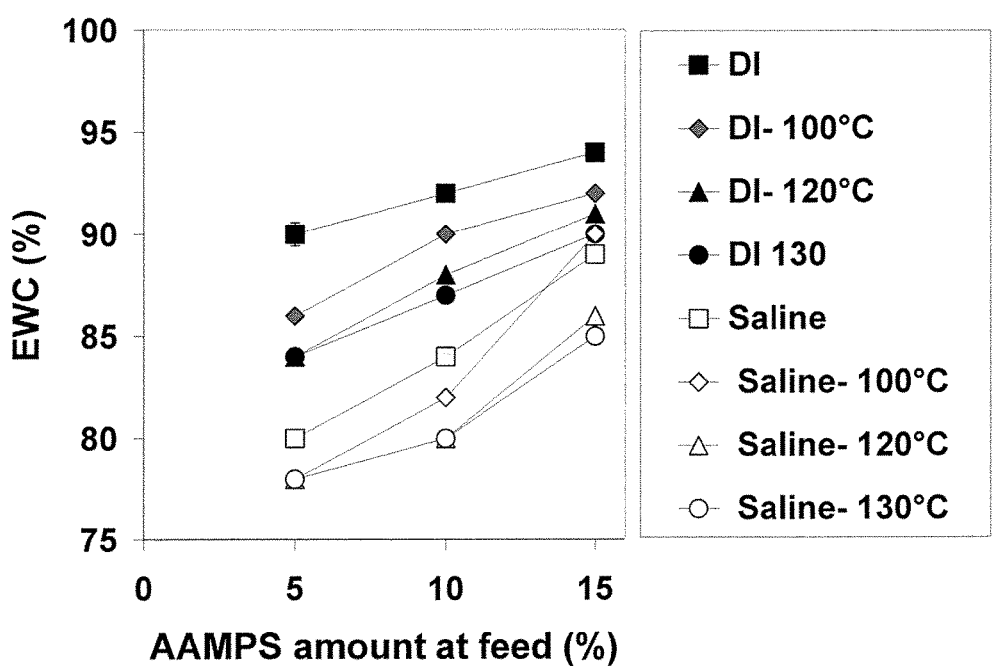

FIG. 13 shows equilibrium water content (EWC) of 15-15% PVA/PAAMPS gels prepared by Method 2 (as described in Example 1) after monomer removal or annealing and subsequent rehydration in DI water or saline.

Figure 14:
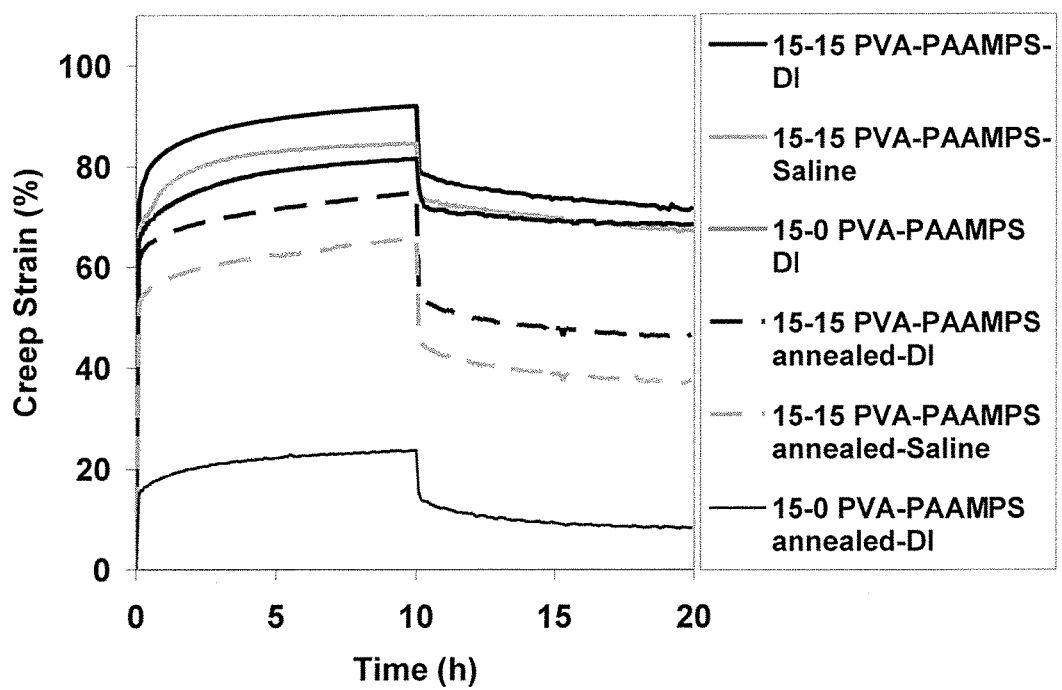

FIG. 14 shows creep strain of 15-15% PVA/PAAMPS gels prepared by Method 2, as described in Example 1.

Figure 15:
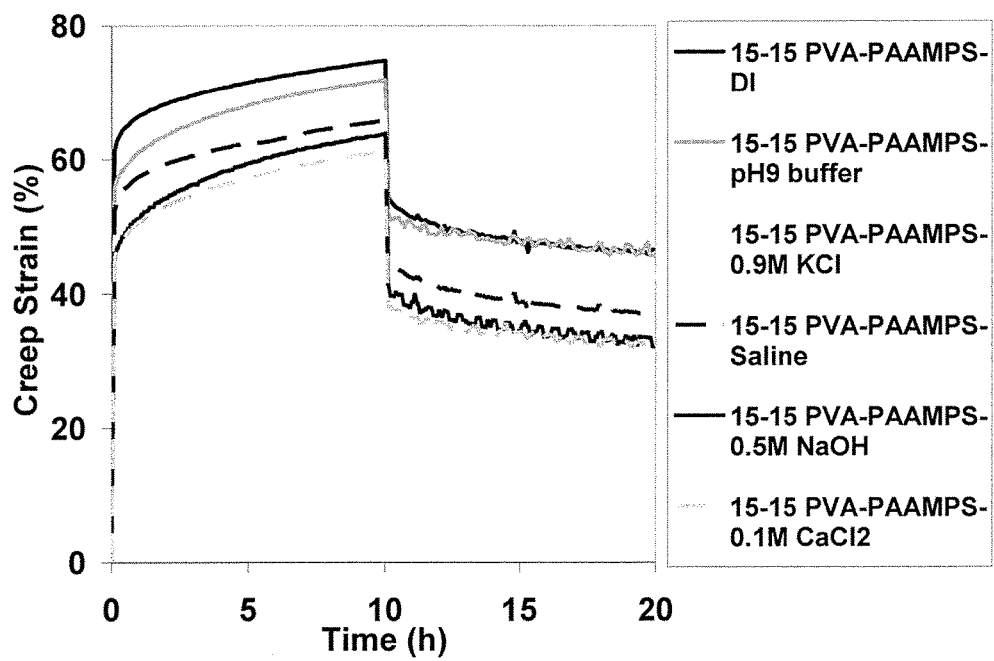

FIG. 15 shows creep strain of 15-15% PVA/PAAMPS gels prepared by Method 2 (as described in Example 1) and treated with various solvents.

Figure 16:
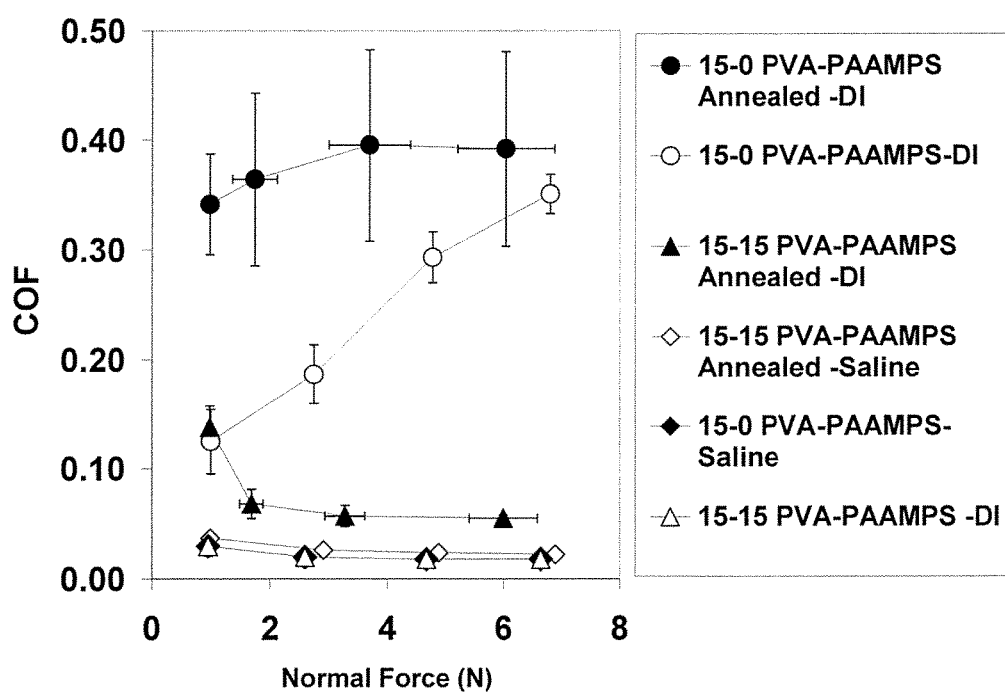

FIG. 16 shows coefficient of friction of 15-15% PVA/PAAMPS gels prepared by Method 2 (as described in Example 1) and treated with various solvents.

Figure 17:
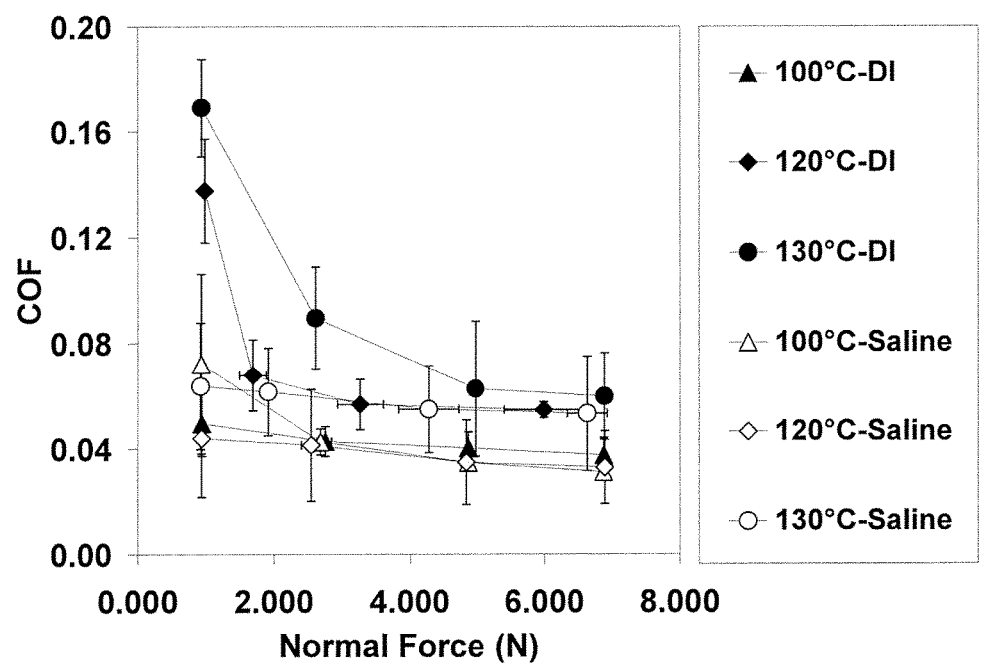

FIG. 17 shows effect of annealing temperature on coefficient of friction of 15-15 PVA/PAAMPS gels prepared by Method 2 (as described in Example 1).

Figure 18:
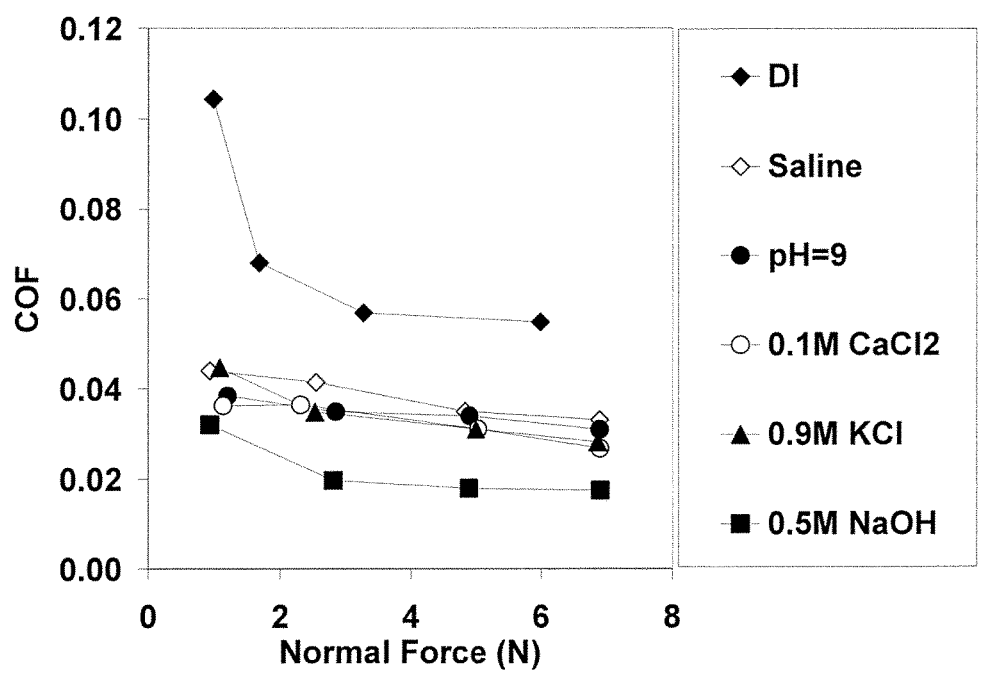

FIG. 18 shows coefficient of friction of 15-15 PVA/PAAMPS gels prepared by Method 2 (as described in Example 1) and treated with various solvents.

Figure 19:
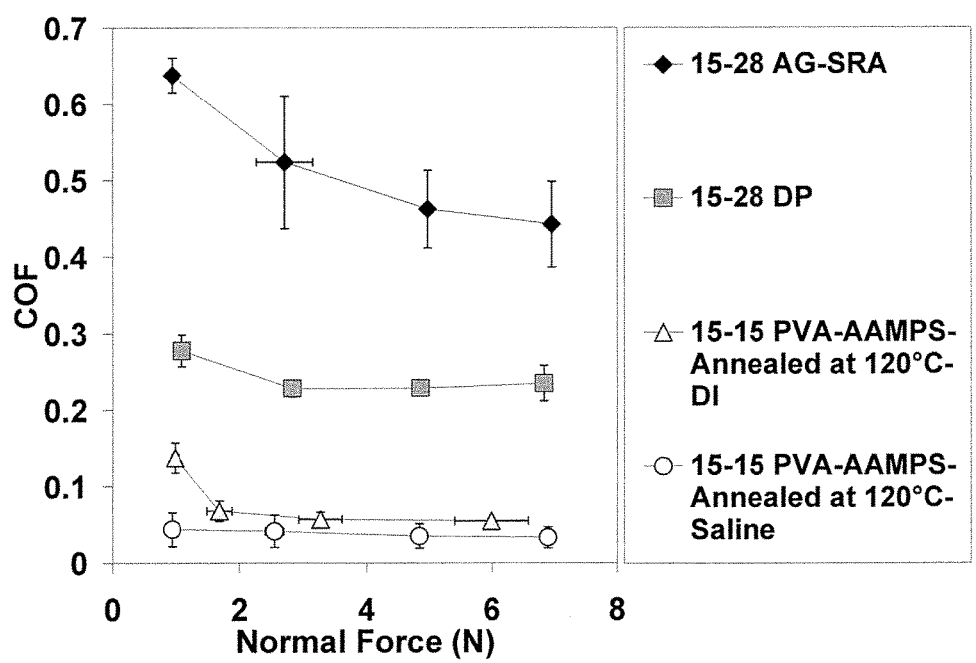

FIG. 19 shows the coefficient of friction comparison PVA-PEG AG-SRA and PVA-PEG DP and PVA/PAAMPS IPN in DI in their annealed and as is form.

Figure 20:
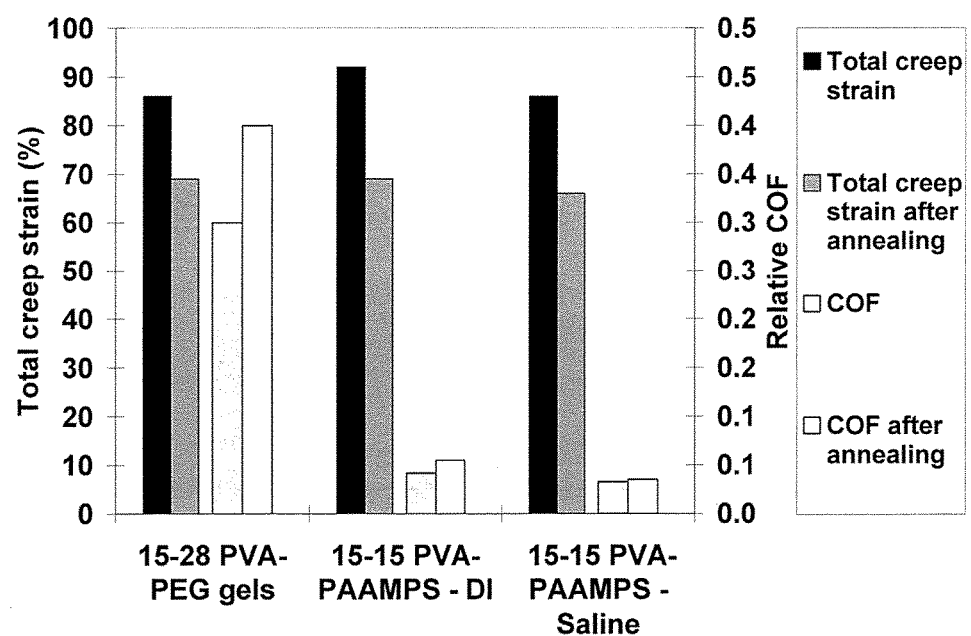

FIG. 20 shows the changes in coefficient of friction and creep strain of PVA-PEG AG-SRA and PVA-PEG DP and PVA/PAAMPS IPN before and after annealing.

Figure 21:
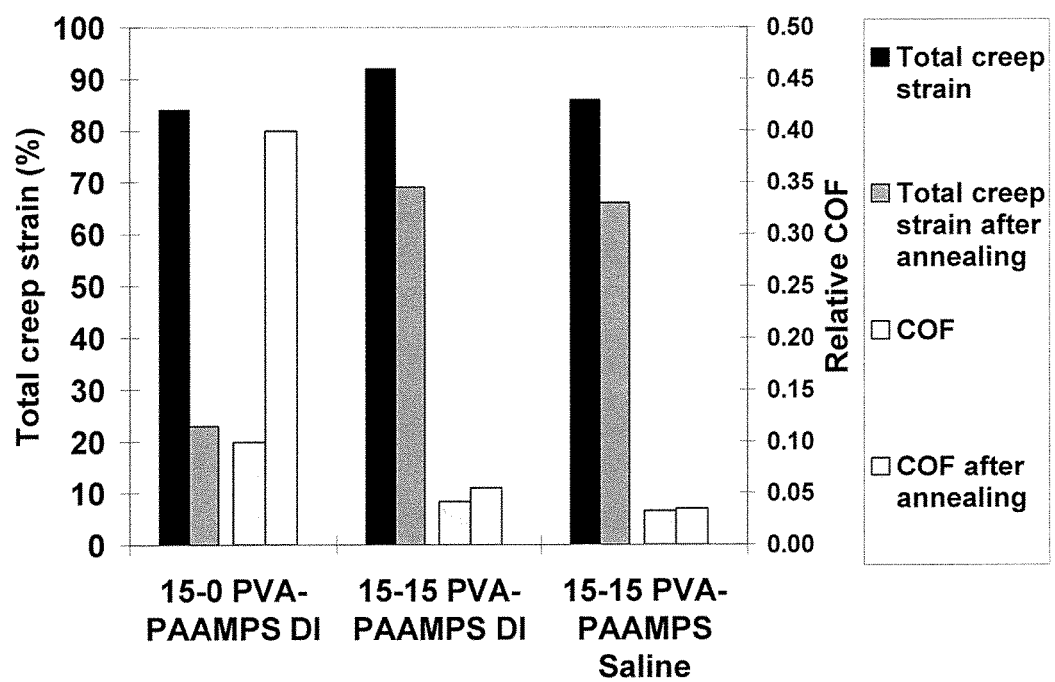

FIG. 21 shows the changes in coefficient of friction and creep strain of 15-0% PVA/PAAMPS and 15-15% PVA/PAAMPS IPNs before and after annealing.

Figure 22:
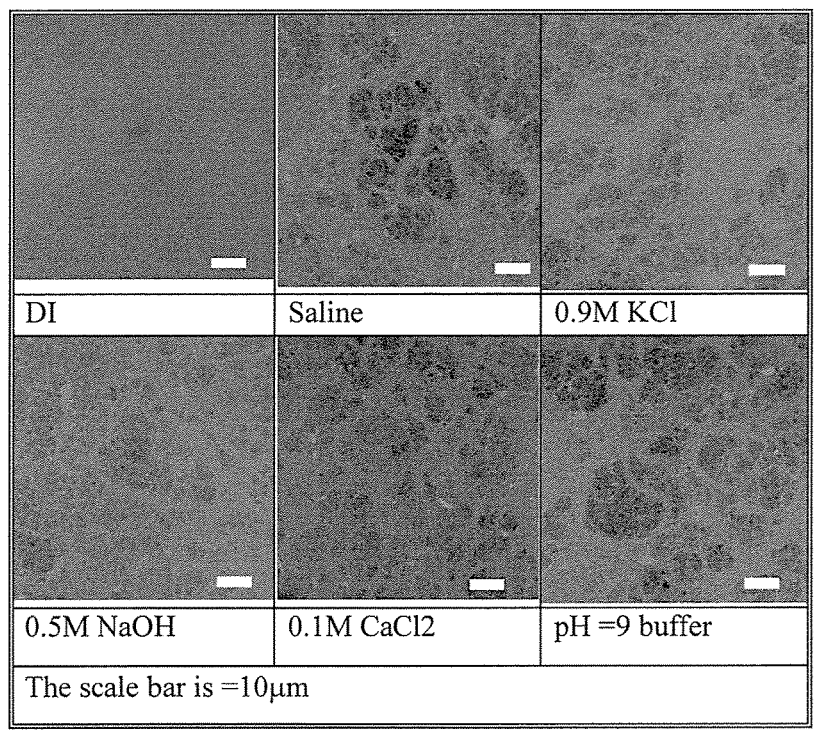

FIG. 22 depicts confocal images of PVA/PAAMS IPNs.

Figure 23:
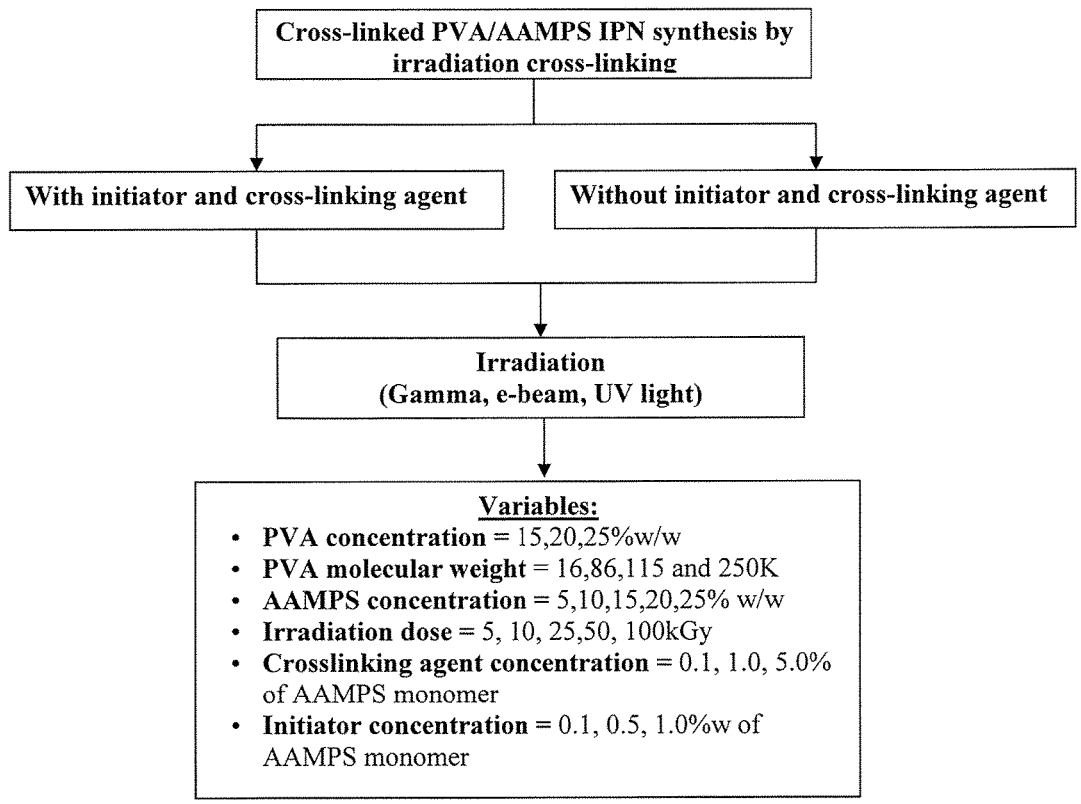

FIG. 23 shows a schematic chart of crosslinked PVA/PAAMPS IPNs synthesis.

Figure 24:
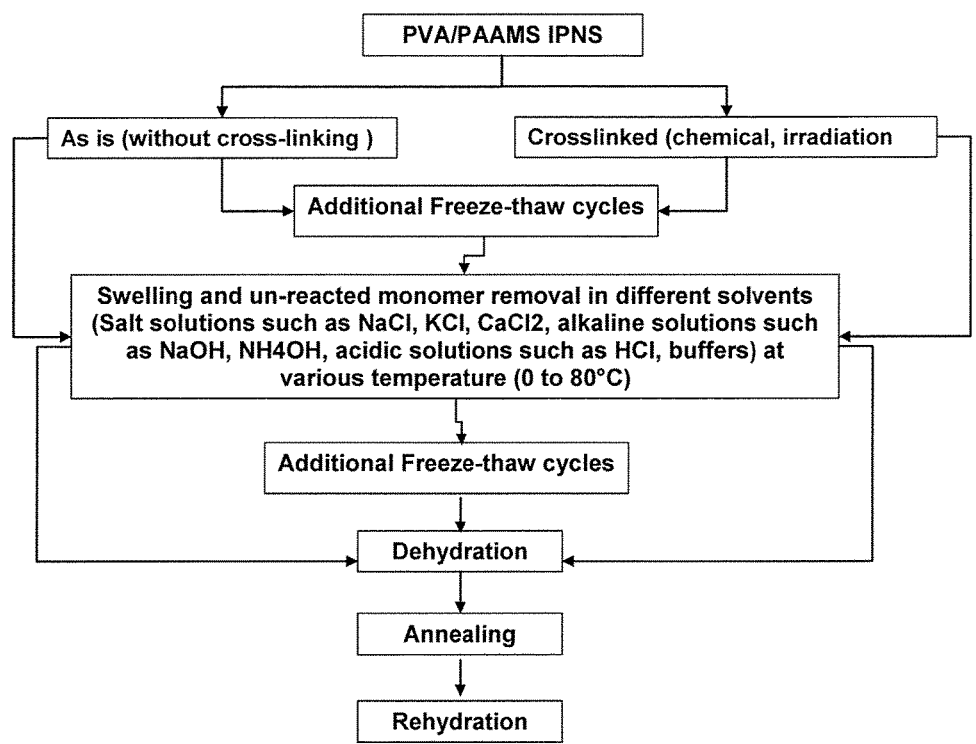

FIG. 24 shows a schematic flow chart of the post processing of PVA/AAMPS IPNs.

DETAILED DESCRIPTION OF THE INVENTION

The present invention provides creep resistant, highly lubricious, tough and ionic hydrogels (for example, ionic PVA-hydrogel, such as ionic PVA-PAAMPS hydrogel, and the like), creep resistant, highly lubricious, tough ionic hydrogel-containing compositions, and methods of making fabricated ionic hydrogels, and the ionic hydrogel-containing compositions. The hydrogels according to the invention are creep resistant, highly lubricious, tough, cartilage-like, and having ionic moieties and increased the ability to hold water. The invention also provides methods of using the fabricated creep resistant lubricious tough ionic hydrogels (for example, ionic PVA-hydrogels, such as ionic PVA-PAAMPS hydrogels, and the like) and creep resistant, highly lubricious, tough and ionic hydrogel-containing compositions for cartilage repair or as interpositional devices that require mechanical integrity, high water content, and excellent lubricity in order to fully function under the high stress environment in the joint space and withstand high loads of human joints. The ionic moiety in the PAAMPS-hydrogel is as shown below:

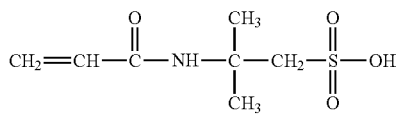

Acrylamido-methylpropane sulfonic acid (AAMPS) structure.

Hydrogels are sought after for applications in cartilage repair or as interpositional devices. Toughening of a given hydrogel system often results in increased solid content and as a result decreased water content, which may not be desirable for certain applications where lubricity imparted by water in the hydrogel, is compromised. One method of toughening hydrogels is through annealing, which increases the creep resistance of PVA but also reduces the equilibrium water content (EWC). We have discovered, among other things, that by adding an ionic hydrophilic compound, such as polyacrylamido-methylpropane sulfonic acid (PAAMPS) into PVA and annealing that mixture, the creep resistance can be increased while maintaining a high level of EWC. PAAMPS has a hydrophilic nature and high water uptake capability. The ionic hydrogels (for example, ionic PVA-hydrogels, such as ionic PVA-PAAMPS hydrogels, and the like) that are prepared according to the invention disclosed herein are very tough, very creep resistant, very lubricious, and having ionic moieties like the naturally occurring cartilage.

Increasing EWC is beneficial to increase lubrication between the hydrogel and counterface that it will be articulating against in vivo, such as bone, cartilage, metallic or ceramic surfaces, or polymeric materials. The addition of PAAMPS is not limited to the PVA host or base polymer; it can be used with other hydrogel systems as well. Copolymers and blends of polyacrylamido-methylpropane sulfonic acid (PAAMPS) can be prepared using PVA as a host or base polymer or without PVA. It is generally expected that with addition of ionic groups, PAAMPS hydrogel becomes a stimuli response system in which the swelling behavior of hydrogels is affected by environmental conditions such as temperature, ionic strength, and pH of the swelling medium.

The ionic hydrogels (for example, ionic PVA-hydrogels, such as ionic PVA-PAAMPS hydrogels, and the like) can be prepared by a number of methods. One method is to mix the polymer (such as PVA) solution with acrylamido-methylpropane sulfonic acid (AAMPS) monomer solution containing an initiator (for example, thermal initiators such as nitriles (for example, azobisisobutyronitrile) and persulfates (for example, ammonium persulfate), peroxides (for example, benzoyl peroxide); photoinitiators (for example, glutaric acid)) and a catalyst (base or acids, for example, hydrochloric acid (HCl), sodium hydroxide (NaOH), buffer solutions like phosphate buffers), which polymerizes and/or cross-links the AAMPS in the PVA solution. The polymerization of the PAAMPS in the polymer (such as PVA) solution can be achieved by applying heat or irradiation. This results in an inter-penetrating network (IPN) structure of PVA-PAAMPS.

According to one embodiment, ionic polymeric or monomeric compounds, carboxylix acid and polycarbocylic acids (for example, citric, malic, malonic, oxalic, succinic, and tartaric), methyacrylic acid and polymethacrylicacids, sulfonic acids and polysulfonic acid, carboxymethylcellulose, alginate, dextran sulfate, carboxymethyl dextran, heparin, carrageenan, pectin, polycations, and chitosan, can be mixed with a host hydrogel with otherwise no ionic moieties to impart ionic properties that can be used to increase the water uptake of the host hydrogel. One such approach is to form an inter-penetrating network (IPN) structure where the ionic moiety is polymerized in the host hydrogel matrix. Another approach is to blend the host hydrogel with other hydrogel(s) having ionic moieties.

The IPN route can be achieved by several methods. One method is to prepare an aqueous solution of the hydrogel and mix that solution with the monomer and the catalyst. In some aspects and embodiments, a cross-linking agent and/or an initiator is used. Then the mixture is pre-polymerized to cause the polymerization of the monomer and, in some aspects and embodiments, polymerization and cross-linking of the monomer. Depending on the system, the pre-polymerization and/or cross-linking can be initiated by heat, ionizing radiation such as gamma, e-beam, or x-rays, or ultraviolet (UV) light. Another method is to gel the host hydrogel and soak it in the mixture that contains monomer, catalyst, initiator, and/or crosslinking agent and then pre-polymerize and/or crosslink the soaked hydrogel.

The blend route can be achieved by several different methods. According to one embodiment, the host hydrogel is blended in a compounder with the other hydrogel(s) containing ionic moieties. In another embodiment, a solution of the host hydrogel is mixed with a solution of the other hydrogel(s) containing ionic moieties. The mixture is then caused to gel using methods such as theta-gel, radiogel, cryo-gel (freeze/thaw method) or the like.

According to one embodiment, the monomer used in the IPN polymerization can have ionic moieties. The monomer also can be a mixture of different monomers, which can be of different ionic strengths. In some embodiments, the monomer can be without ionic moieties.

According to one aspect of the invention, the hydrogel blend can be further subjected to an IPN method. Either the IPN or the blend hydrogels are post-processed by a variety methods to improve certain properties. Dehydration, annealing by heat, radiation cross-linking and other methods are used to further improve the properties of the hydrogels.

In one embodiment, the interpenetrating polymer network (IPN) hydrogel based on acrylamido-methylpropane sulfonic acid (AAMPS) is prepared by pre-solution polymerization using initiators such as azobisisobutyronitrile (AIBN) and ammonium persulfate (APS) in the presence of poly(vinyl alcohol) PVA. Optionally a cross-linking agent such as methylene-bisacrylamido-methylpropane sulfonic acid (MBA) also is used. Subsequent to pre-polymerization, the hydrogel is subjected to one or more cycles of freeze-thaw to further strengthen the gel. The resulting hydrogel is subjected to annealing to further improve its toughness. Optionally, before annealing the hydrogel is dehydrated using solvent or vacuum dehydration methods. The residual monomer is removed either before or after freeze thaw, or alternatively after dehydration or annealing. One method is to wash the hydrogel with saline, DI water, alcohol solutions at between about 1° C. to about 80° C. The unreacted monomer extraction also can be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl)acrylamide, ethylene glycol dimethacrylate (EGDMA or EGMA) and derivatives (such as diethylene glycol dimethacrylate, triethylene glycol dimethacrylate, etc.), ethylene glycol diacrylate (EGDA) and derivatives such as diethylene glycol diacrylate, tetra ethylene glycol diacrylate, N,N-(1,2-Dihydroxyethylene) bisacrylamide, divinylbenzene, and/or the like.) and wash it with water or soak it in a supercritical fluid below or above the melting point of the hydrogel. Optionally, the IPN is radiation cross-linked before or after monomer removal, before dehydration, after dehydration, and/or after annealing with an optional post-irradiation thermal treatment step.

In another embodiment, PVA and PAAMPS polymer blend is prepared. The polymer blend is prepared by blending the polymer solutions or in a compounder.

In another embodiment, the acrylamido-methylpropane sulfonic acid (AAMPS) monomer, PVA, and water is mixed in a compounder or reaction vessel with the initiator and catalyst and the polymerization is carried out in the compounder. Alternatively, the same mixture is prepared, molded into a desired shape and the polymerization of the acrylamido-methylpropane sulfonic acid (AAMPS) is carried out by heating the shaped article.

In another embodiment, the acrylamido-methylpropane sulfonic acid polymer (PAAMPS), PVA, and water is blended in a compounder or reaction vessel. Alternatively, the blend is prepared, and molded into a desired shape.

In another embodiment, PVA hydrogel can be doped by diffusion with acrylamido-methylpropane sulfonic acid (AAMPS) monomer, catalyst, and initiator. The doped PVA is then heated to initiate the polymerization reaction of the acrylamido-methylpropane sulfonic acid (AAMPS).

In another embodiment, PVA hydrogel can be doped by diffusion with PAAMPS. Optionally, the doped PVA is crosslinked. Crosslinking can be achieved by ionizing radiation or by chemical crosslinking. For the method a cross-linking agent in the presence of an initiator (for example, Azo-bis iso butyro nitrile (AIBN), Ammonium persulfate (APS), Benzoyl peroxide (BPO), and Potassium peroxide (PPO)) also is diffused into the doped PVA or the crosslinking agent, initiator and PAAMPS are diffused into PVA simultaneously. Subsequently, the doped PVA is heated to achieve chemical crosslinking. In some aspects and embodiments, both methods of crosslinking are used.

In another embodiment, a PVA solution is subjected to one or more freeze-thaw cycles (for example, 2, 3, 4, 5, 6, 7, 8, 9, 10 or more cycles) and the resulting hydrogel is immersed in an acrylamido-methylpropane sulfonic acid (AAMPS) and an initiator solution. Alternatively, the PVA hydrogel is prepared by the theta-gel method, radiation crosslinking method, or chemical crosslinking method, or a combination thereof. The monomer infused gel is then kept at an elevated temperature (for example, above room temperature, above about 30, 40, 50, 55, 60, or 65° C.) for some time (for example, for about 1, 2, 4, 8, 16 hours or longer; more specifically, for example, for about 55° C. for about 2 h-6 h and at about 65° C. for about 4 h-8 h or longer) for the polymerization of the acrylamido-methylpropane sulfonic acid (AAMPS) (0.1% to 50% w/w). This process forms a PVA/PAAMPS IPN. The IPN is alternatively subjected to additional freeze thaw cycles (for example, more than 1 cycle, preferably 2 or more cycles; for example, 3, 4, 5, 8, 10 or more cycles). The resulting hydrogel is subjected to annealing to further improve its toughness. Optionally, before annealing the hydrogel is dehydrated using solvent or vacuum dehydration methods. The residual monomer is removed either before or after freeze thaw, or alternatively after dehydration or annealing. One method is to wash the hydrogel with saline, DI water, alcohol solutions at between about 1° C. to about 80° C. The unreacted monomer extraction can also be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl) acrylamide, ethylene glycol dimethacrylate (EGDMA or EGMA) and derivatives (such as diethylene glycol dimethacrylate, triethylene glycol dimethacrylate, etc.), ethylene glycol diacrylate (EGDA) and derivatives such as diethylene glycol diacrylate, tetra ethylene glycol diacrylate, N,N-(1,2-Dihydroxyethylene) bisacrylamide, divinylbenzene, and/or the like.) and wash it with water or soak it in a supercritical fluid below or above the melting point of the hydrogel. Optionally, the IPN can be radiation crosslinked before or after monomer removal, before dehydration, after dehydration, and/or after annealing with an optional post-irradiation thermal treatment step.

In another embodiment, a PVA solution is subjected to one or more freeze-thaw cycles and the resulting hydrogel is immersed in an acrylamido-methylpropane sulfonic acid (AAMPS) and initiator solution. Alternatively, the PVA hydrogel is prepared by the theta-gel method, radiation crosslinking method, or chemical crosslinking method, or a combination thereof. The monomer infused gel is subjected to gamma, e-beam, x-ray, or UV radiation for the polymerization of the acrylamido-methylpropane sulfonic acid. The radiation dose can be about 1, 10, 20, 50, 100, 150 kGy, 200 kGy, or more. This process forms a PVA/PAAMPS IPN. The IPN is alternatively subjected to additional freeze thaw cycles (for example, 1 cycle, preferably 2 or more cycles; for example, 3, 4, 5, 8, 10 or more cycles). The resulting hydrogel is subjected to annealing to further improve its toughness. Optionally, before annealing the hydrogel is dehydrated using solvent or vacuum dehydration methods. The residual monomer is removed either before or after freeze thaw, or alternatively after dehydration or annealing. One method is to wash the hydrogel with saline, DI water, alcohol solutions at between about 1° C. to about 80° C. The unreacted monomer extraction can also be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl)acrylamide, ethylene glycol dimethacrylate (EGDMA or EGMA) and derivatives (such as diethylene glycol dimethacrylate, triethylene glycol dimethacrylate, etc.), ethylene glycol diacrylate (EGDA) and derivatives such as diethylene glycol diacrylate, tetra ethylene glycol diacrylate, N,N-(1,2-Dihydroxyethylene)bisacrylamide, divinylbenzene, and/or the like.) and wash it with water or soak it in a supercritical fluid below or above the melting point of the hydrogel. Optionally, the IPN is radiation crosslinked before or after monomer removal, before dehydration, after dehydration, and/or after annealing with an optional post-irradiation thermal treatment step.

In another embodiment, a PVA-PEG theta-gel is dePEGed (removed PEG after gellation) by immersion in saline or water and then immersed in an acrylamido-methylpropane sulfonic acid (AAMPS) and initiator solution. The monomer infused gel is then kept at an elevated temperature (for example, above room temperature, above about 30, 40, 50, 55, 60, or 65° C.) for some time (for example, for about 1, 2, 4, 8, 16 hours or longer; more specifically, for example, for about 55° C. for about 2 h-6 h and at about 65° C. for about 4 h-8 h or longer) for the polymerization of the acrylamido-methylpropane sulfonic acid (AAMPS). This process forms a PVA/PAAMPS IPN. The IPN is alternatively subjected to additional freeze thaw cycles (for example, more than 1 cycle, preferably 2 or more cycles; for example, 3, 4, 5, 6, 7, 8, 9, 10 or more cycles). Optionally, the resulting hydrogel can be subjected to annealing to further improve its toughness. Optionally, before annealing the hydrogel is dehydrated using solvent or vacuum dehydration methods. The residual monomer is removed either before or after freeze thaw, or alternatively after dehydration or annealing. Optionally, the IPN can be radiation crosslinked before or after monomer removal, before dehydration, after dehydration, and/or after annealing with an optional post-irradiation thermal treatment step.

In another embodiment a PVA-PEG theta-gel is dePEGed by immersion in saline or water and then immersed in an acrylamido-methylpropane sulfonic acid (AAMPS) and initiator solution. The monomer infused gel is subjected to gamma, e-beam, x-ray, or UV radiation (for a dose of about 1 to 200 kGy, the radiation dose can be about 1, 10, 20, 50, 100, 150 kGy, 200 kGy, or more) for the polymerization of the acrylamido-methylpropane sulfonic acid (AAMPS). This process forms a PVA/PAAMS IPN. The IPN is alternatively subjected to additional freeze thaw cycles (for example, more than 1 cycle, preferably 2 or more cycles; for example, 3, 4, 5, 6, 7, 8, 9, 10 or more cycles). The resulting hydrogel is subjected to annealing to further improve its toughness. Optionally, before annealing the hydrogel is dehydrated using solvent or vacuum dehydration methods. The residual monomer is removed either before or after freeze thaw, or alternatively after dehydration or annealing. One method is to wash the hydrogel with saline, DI water, alcohol solutions at between about 1° C. to about 80° C. The unreacted monomer extraction also can be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl)acrylamide, ethylene glycol dimethacrylate (EGDMA or EGMA) and derivatives (such as diethylene glycol dimethacrylate, triethylene glycol dimethacrylate, etc.), ethylene glycol diacrylate (EGDA) and derivatives such as diethylene glycol diacrylate, tetra ethylene glycol diacrylate, N,N-(1,2-Dihydroxyethylene)bisacrylamide, divinylbenzene, and/or the like.) and wash it with water or soak it in a supercritical fluid below or above the melting point of the hydrogel. Optionally, before annealing the hydrogel can be dehydrated using solvent or vacuum dehydration methods. The residual monomer is removed either before or after freeze thaw, or alternatively after dehydration or annealing.

According to one embodiment, the IPN or the polymer blend is subjected to a freeze-thaw method to cause gelation. In another embodiment, the IPN or the polymer blend is subjected to radiation crosslinking. In another embodiment, the PVA used in the preparation of the IPN or the polymer blend is subjected to radiation crosslinking.

According to one embodiment, PVA-AAMPS solution with or without a crosslinking agent is first subjected to a freeze-thaw method. This is to cause gelation. Subsequent to gelation PVA-AAMPS gel is polymerized by applying heat or radiation, In some aspects and embodiments, the polymerized IPN is subjected to more freeze-thaw cycle(s) to form a tougher hydrogel. In some aspects and embodiments, the hydrogel is first dehydrated prior to annealing and rehydrated in DI water, saline, saturated NaCl, dilute KCl, dilute $CaCl_2$, or other salt, buffer alkaline and acidic solutions.

According to another embodiment, the hydrogel IPN or the hydrogel polymer blend is annealed at an elevated temperature either under inert atmosphere in a closed vessel or in a poor solvent such as polyethylene glycol (PEG). In some aspects and embodiments, the hydrogel is first dehydrated prior to annealing. Dehydration may be through a number of methods such as, vacuum dehydration, solvent dehydration (for example, by soaking in PEG, IPA, ethanol, methanol, or the like), and the like.

According to some aspects and embodiments, the IPN or the blend is rehydrated in saturated and dilute NaCl, saturated and dilute KCl, saturated and dilute $CaCl_2$, or other salt solutions. This is to change the swelling behavior, lubricity and morphology of the gel. By adding salt to the rehydrating solution the swelling of the gel is decreased, which is then beneficial during the subsequent annealing step.

According to some aspects and embodiments, the IPN or the blend is rehydrated in dilute acid, dilute alkaline and buffer solutions. This is to change the swelling behavior, lubricity and morphology of the gel. By changing the pH of the rehydrating solution the lubricity and the swelling of the gel increased which can be beneficial during the subsequent annealing step.

According to other embodiments the IPN or the blend can be crosslinked by maleic anhydride (MA). One method of MA crosslinking embodies the addition of MA into the host polymer during the pre-polymerization step. Another method is to add MA during the blending of the host hydrogel with the other ionic moiety containing hydrogel.

According to some aspects and embodiments, the monomer can be added to the hydrogel after dehydration, annealing, and/or radiation crosslinking prior to the polymerization step.

According to one embodiment of the invention, the network is polymerized to a lower degree and the PVA/PAAMPS IPN is subjected to freeze-thaw treatment, which increases the toughness of the IPN. This network (IPN) structure can be irradiated to introduce some cross-linking into the structure or a cross-linking agent can be added to the polyacrylamido-methylpropane sulfonic acid (PAAMPS) solution even before polymerization.

Another method is to blend the PVA and PAAMPS in a solution to form a polymer blend and cause the blended PVA-PAAMPS solution to gel by one or more freeze-thaw cycle, cooling to room temperature, radiation cross-linking or chemical cross-linking, or thermal polymerization and crosslinking in the presence of initiator or initiator systems (as mentioned above) and a cross-linking agent, such as methylene bis acrylamide.

According to another embodiment, in both methods mentioned above, the resulting network can be subjected to room temperature gelation after forming a mixture with PVA and AAMPS or PAAMPS at higher temperatures. According to this procedure a bad solvent (for example, PEG) is added to PVA and PAAMPS or AAMPS mixture at high temperature and the resulting solution is cooled down to room temperature to form a gel. Additional freeze-thaw, irradiation and thermal polymerization (in case of AAMPS monomer) can be applied after room temperature gelation to introduce cross-linking and crystalline regions into network.

According to another embodiment, after all of the above mentioned methods, a dehydration and annealing step is applied to form a mechanically strong hydrogel.

The gelation steps described above increase the mechanical strength of the IPN or polymer blends. To further increase the mechanical strength, the IPN hydrogel or polymer blend hydrogel is heated. Heating temperature, environment, duration is varied to tailor the mechanical strength of the IPN or the polymer blend for a specific application. If the heating temperature is above the melting point of the IPN hydrogel or polymer blend hydrogel then a dehydration step is used to elevate the melting point to above the heating temperatures of the IPN hydrogel or polymer blend hydrogel.

Dehydration can be achieved by a variety of methods, for example, slow heating, vacuum dehydration, solvent dehydration, and other methods known in the art. For some applications, dehydration followed by rehydration may be sufficient to obtain the desired mechanical properties and annealing may not be necessary in that process.

According to one embodiment of the invention, the mechanical properties of the IPN hydrogel or polymer blend hydrogel can be tailored by changing the ratio of PVA to PAAMPS and/or by changing the extent of cross-linking induced by the chemical and/or the ionizing radiation routes.

According to one embodiment of the invention, the creep resistant, highly lubricious, tough and ionic PVA-hydrogels or the ionic PVA-PAAMPS-hydrogels contains 40-90% EWC while maintaining a creep resistance of 10-60%.

According to one embodiment, the IPN or the polymer blend can be mixed with a gellant such as PEG at an elevated temperature so as to cause gelation of the system upon cooling down to room temperature.

According to another embodiment, the IPN or the polymer blend is subjected to freeze-thaw method to cause gelation. In another embodiment, the IPN or the polymer blend is subjected to radiation cross-linking. In another embodiment, the PVA used in the preparation of the IPN or the polymer blend is subjected to radiation cross-linking.

According to another embodiment, the hydrogel IPN or the hydrogel polymer blend can be annealed at an elevated temperature. In some aspects and embodiments, the hydrogel can be first dehydrated prior to annealing. Dehydration can be done through a number of methods such as, vacuum dehydration, solvent dehydration (by soaking in PEG, IPA, ethanol, methanol, and the like), and other methods known in the art.

According to one embodiment, interpenetrating polymer network (IPN) hydrogel based on polyacrylamido-methylpropane sulfonic acid (PAAMPS) is prepared by pre-solution polymerization using azobisisobutyronitrile (AIBN) initiator with or without cross-linker system (methylenebisacrylamide (MBA)) and subsequent freeze-thawing method in the presence of poly(vinyl alcohol) PVA.

According to another embodiment, the polymer blend can be prepared in a compounder.

According to another embodiment, the acrylamido-methylpropane sulfonic acid (AAMPS), PVA, and water is blended in a compounder with the initiator and catalyst and the polymerization of the PAAMPS is carried out in the compounder. Alternatively, the blend can be prepared, molded into a desired shape and the polymerization of the polyacrylamido-methylpropane sulfonic acid (PAAMPS) can be carried out by heating the shaped article.

According to another embodiment, hydrogel can be doped by diffusion of acrylamido-methylpropane sulfonic acid (AAMPS) mixed with a catalyst (base or acids, for example, hydrochloric acid (HCl), sodium hydroxide (NaOH), buffer solutions like phosphate buffers) and an initiator, for example, nitriles (azobisisobutyronitrile, (AIBN)) or persulfates (ammonium persulfate (APS)), peroxides (benzoyl peroxide), photo-initiators such as glutaric acid)). The doped PVA hydrogel is then heated or irradiated to initiate the polymerization reaction of the acrylamido-methylpropane sulfonic acid (AAMPS).

According to another embodiment doping of PVA hydrogel can be carried out by diffusion of PAAMPS into PVA.

Yet, according to another embodiment, a polymer solution is subjected to one or more freeze-thaw cycles and the resulting hydrogel is immersed in an acrylamido-methylpropane sulfonic acid (AAMPS) and an initiator solution. The monomer infused gel is then kept at an elevated temperature (for example, 65° C.) for some time (for example, 8 hours or longer) for the polymerization of the acryl-amide. This process forms an ionic hydrogel (for example, ionic PVA-hydrogel, such as ionic PVA-PAAMPS hydrogel, and the like) IPN structure. Alternatively, the IPN can be subjected to additional freeze-thaw cycles (for example, more than one cycle, preferably two cycles, or more). The resulting hydrogel can be subjected to annealing in order to further improve its toughness. Optionally, before annealing the hydrogel can be hydrated using solvent or vacuum dehydration methods. The residual monomer can be removed either before or after freeze thaw, or alternatively after dehydration or annealing.

According to another embodiment, a 15-28 PVA-PEG theta-gel is dePEGed by immersing in water or de-ionized (DI) water and then immersed in an acrylamido-methylpropane sulfonic acid (AAMPS) and an initiator solution. The monomer infused gel is then kept at an elevated temperature (for example, about 65° C.) for some time (for example, about 8 hours or longer) for the polymerization of the AAMPS monomer. This process forms a PVA-PAAMPS IPN. Alternatively, the IPN can be subjected to additional freeze-thaw cycles (for example, more than 1 cycle, preferably 2 cycles, or more). The resulting hydrogel can be subjected to annealing to further improve its toughness. Optionally, before annealing the hydrogel can be hydrated using solvent or vacuum dehydration methods. The residual monomer can be removed either before or after freeze thaw, or alternatively after dehydration or annealing.

According to one embodiment of the invention, a second polymer is incorporated by physically blending with PVA and/or chemically tethering the molecules of the second polymer to PVA molecules in the hydrogel. The second polymer also can be polymerized in the presence of PVA molecules. A number of post-processing methods such as freeze-thaw, vacuum dehydration, solvent dehydration, heating, also can be used.

Increased hydrophilicity achieved by the addition of this second polymer results in increased water uptake, which improves surface lubricity of the PVA hydrogels. In cases where the second polymer has high ionic strength, electrostatic repulsion provides increased elasticity under compressive or tensile loading, similar to cartilage. The second polymer also can have chemical functional groups that can cross-link with each other or with the PVA molecules to form an interpenetrating network to reinforce the original PVA network structure. Polymers with weak acid or weak base functional groups also can be used to impart pH-sensitivity to the originally non-ionic PVA hydrogels. This is useful for pH-induced volume transition and complexation with dyes, drugs, and/or biological molecules.

In another embodiment, the invention provides methods of designing such systems. With PVA hydrogels as a base hydrogel system, the newly incorporated hydrophilic entities are macromolecules (compounds) with ionic chemical functionality and/or hydrogen bonding capability, namely, polyacrylamido-methylpropane sulfonic acid (PAAMPS), copolymers of poly(acrylamido-methylpropane sulfonic acid (PAAMPS)) and poly(acrylic acid), poly(acrylamido-methylpropane sulfonic acid (PAAMPS))-co-poly(acrylic acid) and poly(allylamine hydrochloride) (PAH), copolymers of PVA-PAAMPS, copolymers of poly(ethylene oxide) and polyacrylamido-methylpropane sulfonic acid (PAAMPS), poly(ethylene oxide) (PEO)-PAAMPS copolymer, poly(ethylene glycol), hyaluronic acid (HA), and polyvinylpyrrolidone (PVP). The base hydrogel system in some of the embodiment is a copolymer of poly(ethylene) and poly (acrylic acid), poly(ethylene)-co-poly(acrylic acid) copolymer, a copolymer of poly(ethylene) and PVA, poly(ethylene)-co-poly(vinyl alcohol), a copolymer of poly(ethylene) and poly(acrylamido-methylpropane sulfonic acid (PAAMPS)), poly(ethylene)-co-poly(acrylamido-methylpropane sulfonic acid (PAAMPS)), or mixtures thereof with PVA; and the same hydrophilic entities listed above are incorporated into these base hydrogel systems. Methods for incorporating the new hydrophilic moieties include blends with the base hydrogel before gel formation and diffusion into the base hydrogel after gel formation. Methods for stabilizing the introduced new moieties inside the original gel network include, chemical cross-linking, irradiation, dehydration, and/or thermal treatment and combinations thereof. The incorporation of the second polymer in the base hydrogel can be non-uniform to impart, for example, non-uniform gradient properties to the final implant, such as different water content, creep strength, mechanical properties, and cross-link density, and the like.

The base hydrogel can be fabricated using any known method of gelation such as the methods of freeze thaw, theta-gel, radiogel, or chemical crosslinking. Some of the base hydrogels, for instance PVA, can be formed by single or multiple times freezing and thawing of the aqueous solution of the base hydrogel. Alternatively, the base hydrogel solution is mixed with a bad (poor) solvent (for instance PVA solution mixed with PEG) and gelation is carried out by cooling to below the critical solution temperature (in the case of PVA/PEG cooling the aqueous solution of the mixture to below 60° C.). The radiogel method for gelation of the base hydrogel is to radiation polymerize and/or crosslink the base hydrogel solution either in the presence or absence of an initiator and/or a crosslinking agent. For instance, a PVA aqueous solution is irradiated with electron beam or gamma radiation to form a PVA hydrogel. The radiation dose level can be between 1 kGy and 1000 kGy and the irradiation is carried out in air or in inert gas. For example crosslinking agents such as, gluteraldehyde, ethylene glycol dimethacrylate (EGDM), methylene bis-acrylamide, are used with different base hydrogel solutions to enhance the crosslinking during irradiation. Alternatively, the base hydrogel can be formed by heating in the presence of the crosslinking agent and preferably an initiator to crosslink the hydrogel molecules and cause gelation. Initiators such as AIBN, benzoyl peroxide (BPO), or ammonium persulfate can be used. Chemical crosslinking can either be initiated by radiation and/or by heating. These gelation methods can be used in any combination as well for the formation of the base hydrogels. In some aspects and embodiments, the base hydrogel solution prior to gelation may also contain the hydrophilic entities that are intended to increase the equilibrium water and/or lubricity of the base hydrogel. In these embodiments additional processing steps may be necessary to crosslink the hydrophilic entity to the base hydrogel and/or to itself. Examples of these additional processing steps are dehydration followed by thermal treatment, radiation crosslinking in the presence or absence of a crosslinking agent, and/or chemical crosslinking in the presence of a crosslinking agent.

In one embodiment, aqueous polyacrylamido-methylpropane sulfonic acid (PAAMPS) solution is mixed with an aqueous solution of poly(vinyl alcohol) (PVA) at an elevated temperature above room temperature (for example, above room temperature, above about 30, 40, 50, 55, 60, or 65° C.) to form a homogenous PVA-PAAMPS solution. PVA: PAAMPS ratio can be about 1:1, 1:2, or 1:3, with the total polymer content in the mixture at about 10 wt % to about 50% of higher, for example, about 15 wt %, 20 wt %, 25 wt %, 30 wt %, 35 wt %, 40 wt % or higher, or 45 wt %. The homogenous PVA-PAAMPS solution can be heated or irradiated to form a gel. The homogenous PVA-PAAMPS solution also can be poured into a mold (optionally pre-heated) followed by cooling down to a lower temperature to form a gel.

In another embodiment, aqueous polyacrylamido-methylpropane sulfonic acid (PAAMPS) solution is mixed into an aqueous solution of poly(vinyl alcohol) (PVA) at an elevated temperature above room temperature (for example, above room temperature, above about 30, 40, 50, 55, 60, or 65° C.) to form a homogenous PVA-PAAMPS solution. PVA:PAAMPS ratio can be about 1:1, 1:2, or 1:3, with the total polymer content in the mixture at about 10 wt % to about 50% or more, for example, about 15 wt %, 20 wt %, 25 wt %, 30 wt %, 35 wt %, 40 wt %, or 45 wt % or higher than 45%. Hot PVA-PAAMPS (for example, at about 90° C.) solution can be poured into a mold (optionally pre-heated) followed by freezing at a temperature below 0° C. followed by thawing above 0° C. In some aspects and embodiments, the freeze thaw cycles are repeated.

According to one aspect of the invention, the mold is pre-heated to a temperature between about 1 and about 200° C., preferably between about 25° C. and about 150° C., more preferably about 90° C.

The hydrophilic entity incorporated in the ionic PAAMPS hydrogels by any of the methods described above is not limited to PAAMPS homopolymer, but can be other types of hydrophilic polymers with chemical functionality, namely, copolymer, PVA-PAAMPS copolymer, poly(ethylene oxide) (PEO)-PAAMPS copolymer, polyvinylpyrrolidone (PVP), hyaluronic acid (HA), and poly(allylamine hydrochloride) (PAH). The freeze-thaw methods described in the above gels do not need to be limited to 1 cycle of freeze/thaw but can be more than one cycle, for example, 2, 3, 4, 5, 6, 7, 8, 9, 10 or more cycles. In any of the above embodiments the final gel device can be dehydrated in a solvent or under vacuum and/or subsequently heated prior to final re-hydration in water or physiologic saline solution.

According to one embodiment, once ionic hydrogels containing PAAMPS are made using any of the above methods described herein, the gels are dehydrated in one or combination of the following environments; in air, vacuum, inert gas, or organic solvents. Dehydration of PAAMPS containing ionic hydrogels can render PAAMPS molecules physically trapped inside the PVA gel network by densification, pore collapse, or further polymeric crystallization.

According to another embodiment, once ionic hydrogels containing PAAMPS are made using any of the above methods, the gels are dehydrated in one or combination of the following environments; in air, vacuum, and/or inert gas at an elevated temperature below the melting point of the gel. Dehydration of PAAMPS containing ionic hydrogels can render PAAMPS molecules physically trapped inside the ionic hydrogel network by densification, pore collapse, or further polymeric crystallization. Another alternative dehydration method is through soaking the hydrogel in PEG or a PEG solution. The PEG solution could be in any solvent such as water, ethanol, other alcohols, and the like. The PEG solution can vary in concentration between 1 and 100% PEG in the respective solvent.

According to another embodiment, once ionic hydrogels containing PAAMPS are made using any of the above methods, the gels are dehydrated in one or combination of the following environments; in air, vacuum, and/or inert gas, at an elevated temperature below the melting point of the gel. Dehydration of PAAMPS containing ionic hydrogels can render PAAMPS molecules physically trapped inside the ionic hydrogels network by densification, pore collapse, or further polymeric crystallization. Subsequent to dehydration, the gel can be thermally treated in vacuum, or inert gas at an elevated temperature higher than 100° C., preferably above or below about 160° C., for example, above about 80° C. to about 260° C., for about an hour up to about 20 hours or longer. Such thermal treatments can improve mechanical strength of the gels by further increasing polymer crystallinity.

Thermal treatment under high pressure: Thermal treatment method described in PEG annealing above also can be done at an elevated pressure than the ambient atmosphere.

Cross-linking by anhydrides, esters and acetal: When polyethylene glycol (PEG) or carboxylic acid is one of the ingredients in the gels thermal treatment methods described above can chemically cross-link PVA chains by forming anhydrides between carboxylic acids or esters thus making PAAMPS-interpenetrating network with PVA network. Hydroxyl groups in PVA and sulfonic acids in PAAMPS also can form acetal during such thermal treatments.

Cross-linking by gamma, e-beam irradiation: In some aspects and embodiments radiation cross-linking in the PAAMPS containing PVA gels processed by methods described here are carried by gamma or e-beam irradiation. The cross-linking increases the wear resistance and creep resistance. The cross-linking can be carried out at any step of the processing/methods described herein.

Cross-linking by cross-linking agents: Another type of chemical cross-linking method is using cross-linking agents such as ethyleneglycol dimethacrylate (EGDMA), methylenebisacrylamide, to cross-link PAAMPS chains in the PVA-PAAMPS gels processed by methods described above. Cross-linkers such as glutaraldehyde and epichlorohydrin can cross-link PVA chains in the gel to improve mechanical properties in addition to physical locking of the incorporated PAAMPS in the gel.

Cross-linking of PAAMPS during pH-induced volume transition: The charge density of the PAAMPS chains is pH-tunable which enables systematic control of the electrostatic repulsion imparted from the anionic charges. By adjusting the charge density by lowering the pH of the PAAMPS-containing gel well below its pKa values, one can increase the number of protonated sulfonates in PAAMPS, which can bring PAAMPS chains closer and also promote intramolecular or intermolecular hydrogen bonding in PAAMPS. PAAMPS chains at such a state are cross-linked among themselves or with neighboring PVA chains by any of the methods described above. Increasing the pH of the gel back to physiological pH value deprotonates the non-cross-linked acid groups in PAAMPS, whose electrostatic repulsion will benefit the mechanical integrity of the gels under repetitive loading conditions expected in the joint space.

Controlled diffusion of PAAMPS into the PVA cryogels for gradient distribution of PAAMPS in the recipient gel: The effects of incorporated PAAMPS into the PVA gels can be controlled to result in a non-uniform gel with a gradient of properties, i.e., larger effects from the presence of PAAMPS on the gel surface than the bulk of the gel by having a higher PAAMPS concentration on the surface than the bulk. This is achieved by controlling and/or varying the diffusion rate. Diffusion rate will be faster with lower molecular weight PAAMPS, with larger pores in the PVA, with increased porosity of PVA, with higher hydration of the PVA, and the like.

Layer-by-layer buildup to create "vertical" gradient properties: PVA-PAAMPS gels can be built up in a layer-by-layer fashion by sequentially molding different concentration solution in the mold (optionally pre-heated) to achieve gradient properties. The gradient is thus disposed in a direction perpendicular to the direction of deposit. A hot (for example, about 90° C.) PVA-PAAMPS mixture solution is poured into a container up to a certain thickness to form the first layer. The solution in the mold (optionally pre-heated) is gelled by cooling down to the room temperature or lower temperature. Gelation can also be achieved by radiation. Upon gelling, the first layer in the container is heated to a temperature below the melting temperature with no disruption of the formed layer. Another layer of solution can be added from a hot PVA-PAAMPS mixture to the first layer to ensure adhesion of the two layers. The second layer can be formed from same or different composition of the polymer solution, or a new component can be added in the mixture. The container is again cooled down and/or irradiated to form a layered gel structure. This procedure can be repeated to the desired number of layers or thickness. Such layer-by-layer gel formation can be applied to PVA cryogel as well, followed by PAAMPS diffusion.

Gradient effects of thermal treatment: Thermal treatment on the PAAMPS containing PVA gels can be deliberately controlled in a gradient manner by having one of the surfaces of the dehydrated gel in contact with higher temperature than the opposite surface of the gel. The gel surface in contact with higher temperature will be affected more by heating, i.e., more cross-linking and higher crystallinity, lower water content, and the like, than the other surface in contact with lower temperature.

According to one embodiment, this invention provides fabricated ionic hydrogels, PVA-PAAMPS-hydrogels, PVA-PAAMPS-hydrogel-containing compositions, and methods of making PVA-PAAMPS-hydrogels and PVA-PAAMPS-hydrogel-containing compositions. The invention also provides methods of using the fabricated ionic hydrogels, PVA-PAAMPS-hydrogels and PVA-PAAMPS-hydrogel-containing compositions in treating a subject in need.

Hydrogels previously described (see for example, US Published Application Nos. 20040092653 and 20040171740) can be used as starting materials for making PVA-hydrogels of the present invention by employing methods described herein for the first time. The PVA-PAAMPS-hydrogels provided in the present invention can be used in a body to augment or replace any tissue such as cartilage, muscle, breast tissue, nucleus pulpous of the intervertebral disc, other soft tissue, interpositional devices that generally serves as a cushion within a joint, and the like. These PVA-PAAMPS-hydrogels provided in the present invention also can be used in the spine for augmenting, replacing the nucleus pulpous, as wound dressing, or as drug delivery vehicles.

PVA-PAAMPS-hydrogels generally include polymer, polymer blends, or copolymers of polyvinyl alcohol (PVA), polyacrylamido-methylpropane sulfonic acid (PAAMPS), polyvinyl pyrrolidone (PVP), poly ethylene oxide (PEO), alginates, polysaccharides, polyoxyethylene-polyoxypropylene co-polymers, poly-N-alkylacrylamides, poly-N-isopropyl acrylamide (PNIAAm), chondroitin sulfate, dextran sulfate, dermatin sulfate, or combinations of two or more thereof.

PVA-PAAMPS-hydrogels, as disclosed herein, comprised of uniformly distributed hydrogel molecules or hydrogel particles comprising polyvinyl alcohol (PVA) copolymerized and/or blended with at least one of the other polymers or gellants, for example, polyvinyl pyrrolidone (PVP), poly-N-isopropyl acrylamide (PNIPAAm), poly ethylene oxide (PEO), chondroitin sulfate, dextran sulfate, dermatin sulfate and the like, or combinations of two or more thereof.

According to one aspect of the invention, the PVA-PAAMPS-hydrogels comprise polyvinyl alcohol (PVA) copolymerized and/or blended with at least one of the other polymers.

According to another aspect of the invention, the hydrogel solutions comprise polyvinyl alcohol (PVA), polyacrylamido-methylpropane sulfonic acid (PAAMPS), polyvinyl pyrrolidone (PVP), poly ethylene oxide (PEO), poly-N-isopropyl acrylamide (PNIAAm), or combinations of two or more thereof.

According to another aspect of the invention, the hydrogel solution is a polyvinyl alcohol-polyacrylamido-methylpropane sulfonic acid (PVA-PAAMPS) solution.

PVA-PAAMPS-hydrogels of the invention can be used in a variety of fashions in joints in mammals such as human joints. For example, an interpositional device can be manufactured from the PVA-PAAMPS-hydrogels, which meet required mechanical strength to withstand high loads of human joints, and can be used in articular cartilage replacement applications. The interpositional devices typically act as a cushion within the joint to minimize the contact of the cartilage surfaces to each other. This is beneficial in patients with arthritic joints. Early arthritic joints with cartilage lesions can be treated with such interpositional devices, which minimize the contact between the damaged cartilage surfaces of the patient. The interpositional devices are described by Fell et al. (see U.S. Pat. Nos. 6,923,831, 6,911,044, 6,866,684, and 6,855,165). These devices can have a variety of shapes and sizes. For a hydrogel interpositional device to perform in vivo in the long-term, the device first needs to have a high creep resistance. This is to minimize the changes to the shape of the interpositional hydrogel device during in vivo use. PVA-hydrogel materials of the invention with increased stiffness display increased creep resistance. The hydrogel interpositional device according to the invention also have superior mechanical properties, such as toughness, wear resistance, high creep resistance, high lubricity, cartilage-like ionic moieties, and the like.

Another method for the use of a hydrogel implant is through the filling of a cavity in the joint. The cavity can be an existing one or one that is prepared by a surgeon. A PVA-PAAMPS-hydrogel plug can be inserted into the cavity. The hydrogel plug can be of any shape and size; for instance it can be cylindrical in shape. In some aspects and embodiments, the plug can be oversized to be elevated from the surrounding cartilage surface. In other embodiments the plug can be undersized to stay recessed in the cavity. The over-sizing or under-sizing can be such that the plug can stand proud above the surrounding cartilage surface or recessed from the surrounding cartilage surface by about less than 1 mm, by about 1 mm, by more than about 1 mm, by about 2 mm, by about 3 mm, or by about more than 3 mm. In some aspects and embodiments, the hydrogel plug can be slightly dehydrated to shrink its size and to allow an easy placement into the cavity. The hydrogel plug then can be hydrated and swollen in situ to cause a better fit into the cavity. The dehydrated and re-hydrated dimensions of the hydrogel plug can be tailored to obtain a good fit, under-sizing, or over-sizing of the plug after re-dehydration and re-swelling. The re-dehydration in situ can also be used to increase the friction fit between the plug and the cavity. This can be achieved by tailoring the dimensions and the extent of dehydration such that upon re-dehydration the cross-section of the plug can be larger than the cross-section of the cavity; by for instance about 1 mm, less than 1 mm, or more than 1 mm. In some aspects and embodiments, the cavity can be filled with an injectable hydrogel system known in the art, such as the one described by Ruberti and Braithwaite (see US Published Application Nos. 20040092653 and 20040171740), Muratoglu et al. (International Application WO 2006/125082), Lowman (US Published Application No. 20040220296), and other injectable systems.

The present invention also provides methods of fabricating ionic hydrogels, ionic PVA-PAAMPS-hydrogel systems to obtain ionic PVA-PAAMPS-hydrogels that can maintain shape under the high stress of human joints, as well as the hydrogels and systems themselves. According to one aspect of the invention, the ionic PVA-PAAMPS-hydrogels are obtained by improving the stiffness, toughness and strength of hydrogels to increase resistance to creep and resistance to wear. The invention provides dehydration methods useful for improving the mechanical properties of the hydrogel. Various dehydration methods, described above, can be used together in combinations to improve the properties of hydrogels. Any of the dehydration methods can be used either by itself or in combination with the other dehydration methods to improve the mechanical properties of hydrogels.

In the case of extreme dehydration of the PVA-PAAMPS-hydrogel, it can be important for some of the applications to subsequently re-hydrate the PVA-PAAMPS-hydrogel at least to some extent to regain the lubrication imparted by the presence of water for some of the aspects and embodiments. If the heat dehydration is carried out starting with a hydrogel that contains water and one or more other ingredient(s), which are in most embodiments non volatile such as low molecular weight PEG, and others such as PVP, PEO, chondroitin sulfate, the dehydrated hydrogel can be easily re-hydrated to varying levels. According to one aspect of the invention, the level of re-hydration following heat dehydration depends on the concentration of other ingredient(s) in the water phase of the initial hydrogel before dehydration. In contrast, if the starting hydrogel contains no other ingredients but water, then the extent of re-hydration subsequent to heat dehydration is substantially reduced compared to the re-hydration levels of the hydrogels dehydrated in the presence other ingredient(s). The presence of the other ingredient(s) other than water also has implication on the creep behavior of the hydrogel following heat dehydration and subsequent re-hydration. The hydrogel is more viscoelastic when it is heat treated in the presence of other ingredient(s).

According to another aspect, ionic hydrogels (for example, ionic PVA-hydrogels, such as ionic PVA-PAAMPS hydrogels, and the like) containing a low molecular weight ingredient, such as PEG, retain their opacity during heat dehydration. In contrast, ionic hydrogels (for example, ionic PVA-hydrogels, such as ionic PVA-PAAMPS hydrogels, and the like) containing no such ingredients and heat dehydrated under identical conditions lose their opacity and turn transparent, an indication for the loss of the molecular porosity. The molecular porosity is thought to be the free space in the structure where the water molecules penetrate the hydrogel, thus hydrating it. The loss of the opacity upon heat dehydration of hydrogels not containing any such ingredient can be the reason for their substantially reduced ability to re-hydrate. According to one aspect on the invention, the non-volatile ingredient remains in the hydrogel structure during heat dehydration and prevents the collapse of the molecular porosity, and thus allowing these hydrogels to re-hydrate following heat dehydration.

The invention also provides freeze-thaw (FT) prepared ionic hydrogels (for example, ionic PVA-hydrogels, such as ionic PVA-PAAMPS hydrogels, and the like) hydrogels, wherein the ionic hydrogel is further treated by heating at around 160° C. Upon re-hydration, the heated gels remain transparent forming an elastic and tough, almost rubber-like material. While this material is useful in some application, it may not be for applications requiring high water content in the hydrogel. The extent of re-hydration is further tailored in the heated FT-ionic hydrogels by adding an ingredient such as PEG into the water phase prior to the heating.

In another embodiment, the ionic hydrogel based implant is packaged and sterilized. The packaging can be such that the hydrogel device is immersed in an aqueous solution to prevent dehydration until implantation, such as during sterilization and storage. The aqueous solution can be water, deionized water, saline solution, Ringer's solution, or salinated water. The aqueous solution also can be a solution of poly-ethylene glycol in water. The solution can be of less than 5% (wt) in PEG, about 5% (wt), more than about 5% (wt), about 10% (wt), about 15% (wt), about 20% (wt), about 30% (wt), about 50% (wt), about 90% (wt) or about 100% (wt). The hydrogel device also can be sterilized and stored in a non-volatile solvent or non-solvent.

The sterilization of the ionic hydrogel based implant can be carried out through gamma sterilization, heat, gas plasma sterilization, or ethylene oxide sterilization, for example. According to one embodiment, the hydrogel is sterilized by autoclave. The sterilization is carried out at the factory; or alternatively, the implant is shipped to the hospital where it is sterilized by autoclave. Some hospitals are fitted with ethylene oxide sterilization units, which also are used to sterilize the hydrogel implant.

In one embodiment, the ionic hydrogel implant is sterilized after packaging. In other embodiments the ionic hydrogel implant is sterilized and placed in a sterile aqueous solution.

In another embodiment, ionic PVA-PAAMPS-hydrogel is prepared using the freeze-thaw method starting with an aqueous PVA solution (at least about 10% (wt) PVA, above about 15% (wt) PVA, about 20% (wt) PVA, about 25% (wt) or more PVA and subjecting it to freeze-thaw cycles (at least 1 cycle to 100 cycles, for example, more than 2, 3, 4, 5, 6, 7, 8, 9, 10 or more cycles). The freeze-thaw cycle is defined as cooling the PVA solution below 0° C. and heating it back up above 0° C. The ionic PVA-PAAMPS-hydrogel is then subjected to dehydration. Subsequently, the dehydrated hydrogel is placed in saline solution for re-hydration. This process results in very little re-hydrated ionic PVA-PAAMPS-hydrogel with high mechanical strength.

In another embodiment, the invention provides a process of modification of PVA-hydrogels to increase water content, improve lubricity, with least compromise with mechanical strength, such as creep resistance by addition of hydrophilic ionic molecules such as AAMPS by methods of blending prior to gelling and/or diffusion into the formed gel.

In another embodiment, the invention provides a process incorporation of solvents such as PEG during subsequent processing on PVA-PAAMPS gels to prevent loss of mechanical integrity and maintain high water affinity by methods of blending PEG during PVA-PAAMPS gel formation; diffusing PEG into the PVA-PAAMPS gels; and/or diffusing PEG simultaneously or sequentially as PAAMPS into the PVA gels.

In one embodiment of the invention, the PVA:PAAMPS ratio can be 1:1, 1:2, or 1:3, with the total polymer content in the mixture at about 10 wt % to about 50%, for example, about 15 wt %, 20 wt %, 25 wt %, 30 wt %, 35 wt %, 40 wt %, or 45 wt % or more.

In another embodiment, the invention provides a process of controlled diffusion of PAAMPS into the PVA gels for gradient distribution of PAAMPS in the recipient gel. PAAMPS containing PVA gels can be dehydrated in air, vacuum, inert gas, solvents for physical fixation of PAAMPS in the PVA gel at room temperature, or at an elevated temperature, such as below or above 80° C., for example above room temperature to about 100° C. Thermal treatment following dehydration on PAAMPS containing PVA gels can be done in vacuum, inert gas at temperature higher than 100° C., preferably above or below 160° C., for example, above about 80° C. to about 260° C., for 1 hour up to 24 hours or longer for irreversibly linking PAAMPS in the hydrogel network and improve creep resistance. Thermal annealing following dehydration on PAAMPS containing PVA gels in vacuum, inert gas also can be done by heating at heating rates such as about 0.01° C./min, about 0.1° C./min, about 1° C./min, or about 10° C./min, starting at room temperature or at an elevated temperature, such as below or above 80° C., for example above room temperature to about 100° C., up to a final temperature higher than about 100° C., preferably above or below 160° C., for example, above about 80° C. to about 260° C., for about one hour up to 24 hours or longer.

According to another aspect of the invention, above described processes also can be carried under high pressure environment. The thermal treatment method described herein also can be carried out at an elevated pressure than the ambient atmosphere.

According to another aspect of the invention, cross-linking of PAAMPS in PVA gels with or without PEG can be done by gamma or e-beam irradiation. Cross-linking of PAAMPS in PVA gels with or without PEG can be done by chemical cross-liking method using cross-linking agents such as ethyleneglycol dimethacrylate (EGDMA). Cross-linking density of PAAMPS in PVA gels can be controlled through pH-adjustment prior to cross-linking by altering the number of protonated sulfonates in PAAMPS chains.

According to another aspect of the invention, "vertical" gradient properties of the final gel can be formed by composition control, for example, a) Layer-by-layer buildup of PVA-PAAMPS gels with varying composition ratio of PVA to PAAMPS in each layer by adding one layer at a time in repeated freeze-thawing process; b) Layer-by-layer buildup of PVA-PAAMPS gels with varying composition ratio of PVA to PAAMPS in each layer by adding one layer at a time in repeated freeze-thawing process or theta-gelling process; and c) co-extrusion to form layers of PVA/PAAMPS of different concentrations.

According to another aspect of the invention, the "vertical" gradient properties of the final gel can be also formed by heating condition control by a) having one of the surfaces of the dehydrated gel in contact with higher temperature than the opposite surface of the gel; and b) having only one of the surfaces of the non-PEG containing dehydrated gel in contact with PEG during heating.

In one embodiment of the invention, PEG is used as a non-volatile non-solvent for PVA hydrogels. DMSO is used instead of water in preparing the aqueous PVA-PAAMPS-solution, the precursor to the hydrogel.

In one embodiment of the invention, PEG solution is a solution of PEG in a solvent (preferably water, ethanol, ethylene glycol, DMSO, or others). The solution concentration can be anywhere between 0.1% (wt) PEG and 99.9% (wt) PEG. The PEG in the solution can be of different molecular weights (preferably 300, 400, or 500 g/mol, more than 300 g/mol, 1000 g/mol, 5000 g/mol or higher). The PEG in the solution can be a blend of different average molecular weight PEGs.

In another embodiment, PEG containing PVA-PAAMPS-hydrogel is prepared using the freeze-thaw method starting with an aqueous PVA solution (at least about 1% (wt) PVA to about 99 (wt %) PVA, for example, about 15% (wt) PVA, about 20% (wt) PVA, about 25% (wt) PVA, about 27% (wt) PVA, about 30% (wt) PVA, about 35% (wt) PVA, about 40% (wt) PVA, or about 45% (wt) PVA and subjecting it to freeze-thaw cycles (at least 1 cycle to 100 cycles, for example, 2, 3, 4, 5, 6, 7, 8, 9, 10 or more cycles). At this step the PVA-PAAMPS-hydrogel can be optionally placed in saline to reach full hydration. Subsequently, the gel is placed in a low molecular weight PEG solution. This is to dope the hydrogel with the non-solvent PEG. The duration of PEG solution soak can be varied to either reach a uniform equilibrium PEG content throughout the hydrogel or to reach a non-uniform PEG distribution (by shortening the soak duration). The latter results in PEG-rich skin and a gradient of PEG concentration within the PVA-PAAMPS-hydrogel.

In another embodiment, PEG containing PVA hydrogel is prepared by starting with an aqueous PVA solution (at least about 1% (wt) PVA to above about 99% (wt) PVA, for example, above about 15% (wt) PVA, about 20% (wt) PVA, about 25% (wt) PVA, about 27% (wt) PVA, about 30% (wt) PVA, about 35% (wt) PVA, about 40% (wt) PVA, or about 45% (wt) PVA) and mixing it with a low molecular weight PEG solution at an elevated temperature (above room temperature or above 50° C.). Upon cooling down to room temperature, the mixture forms a PVA-PAAMPS-hydrogel containing water and the non-solvent PEG.

In another embodiment, PVA-PAAMPS-hydrogel is heat dehydrated. The PVA-PAAMPS-hydrogel contains PEG during heat dehydration (or heating). The heating can be carried out a temperature about 40° C. to about 200° C. or more. The heat dehydration is carried out at about 40° C., at above about 40° C., at 80° C., at above 80° C., at 90° C., at about 100° C., at above 100° C., at about 150° C., at about 160° C., at above 160° C., at about 180° C., at above 180° C., at about 190° C., at above 190° C., at about 200° C., or at above 200° C. In another embodiment, the dehydration is carried out at about 40° C., about 80° C., about 90° C., about 100° C., about 150° C., about 160° C., about 180° C., about 190° C., about 200° C., or above 200° C. for about an hour to about 24 hours. The duration and the temperature of the thermal treatment depends on the size and hydration level of the hydrogel, for example, the duration can be for about an hour or less, about 5 hours, about 10 hours, about 24 hours, several days, or a few weeks. The heat dehydration can be carried out in any environment, preferably in an inert gas like nitrogen or argon or in vacuum. The heat dehydration also can be carried out in air or acetylene gas or mixture of a number of gases. The heat dehydration can be carried out either by placing the hydrogel in an already heated environment to achieve a higher rate of heat dehydration or by heating the hydrogel slowly to achieve a slower rate of heat dehydration. According to another embodiment, prior to heat dehydration, the PVA-PAAMPS-hydrogel can be preheated at a temperature below the melting point of the hydrogel. The rate of heat dehydration can be such that the hydrogel loses weight from removal of water at a rate of 1% weight loss per day, 10% weight loss per day, 50% weight loss per day, 1% weight loss per hour, 10% weight loss per hour, 50% weight loss per hour, 1% weight loss per minute, 5% weight loss per minute, 10% weight loss per minute, 50% weight loss per minute or any amount thereabout or therebetween. The rate of heat dehydration depends on the rate at which the temperature is raised and the size of the hydrogel. Prior to heat dehydration, the hydration level of the hydrogel can be reduced by vacuum dehydration. Subsequent to the heat dehydration the hydrogel is placed in saline solution for re-hydration. This results in good levels of re-hydration in the PVA hydrogel resulting in high mechanical strength and good lubrication when articulating against human cartilage or other hydrophilic surfaces. This hydrogel is expected to maintain its hydrogen bonded structure, thus is not be subject to dissolution over long-term in water, saline or bodily fluid.

Although the description and examples are given for a PVA-PAAMPS-hydrogel systems, but can be applied to any hydrogel system of a polymeric structure, that is, with long-chain molecules. Therefore, the invention provides hydrogel systems that includes, but not limited to, PVA and/or PAAMPS as the base material.

According to one aspect of the invention, PVA or PAAMPS can be used as the base hydrogel. The base PVA or PAAMPS hydrogel can be prepared by the well-known freeze-thaw method by subjecting a PVA or PAAMPS solution (PVA or PAAMPS can be dissolved in solvents such as water or DMSO) to one or multiple cycles of freeze-thaw. PVA or PAAMPS solution used in the freeze-thaw method can contain another ingredient like PEG. The base PVA- or PAAMPS-hydrogel also can be prepared by radiation cross-linking of a PVA or PAAMPS solution. Another method of preparing the PVA or PAAMPS hydrogel can be used to blend a PVA or PAAMPS solution with a gallant (for example, PEG) at an elevated temperature and cooling down to room temperature.

In one embodiment, the hydrogel can be of any shape, such a cubical shape, cylindrical shape, rectangular prism shape, or implant shape.

In another embodiment, NIPAAM can be used as the base hydrogel. The base NIPAAM hydrogel can be prepared by radiation cross-linking of a NIPAAM solution. Alternatively, the methods described by Lowman et al. can be used.

In another embodiment, a topological gel (TP) can be used as the base hydrogel. The base TP hydrogel can be prepared by methods described by Tanaka et al. (see *Progress in Polymer Science,* 2005, 30:1-9). The polymer chains in TP gels are flexibly bound by cross-linkers that are sliding along the individual chain.

In the following embodiments, a nanocomposite (NC) gel structure can be used as the base hydrogel. The base NC hydrogel can be prepared by methods described by Tanaka et al. (see *Prog. Polym. Sci.* 2005, 30:1-9).

In some of the aspects and embodiments a dehydrated hydrogel can be used as the base hydrogel. The level of dehydration can be controlled such that the base hydrogel contains between 99% and 1% water, more preferably between 99% and 5% water, more preferably between 99% and 25% water, more preferably between 99% and 50% water, more preferably between 99% and 75% hydrogel, more preferably about 70% (wt) water, or 80% (wt) water.

The water content of the hydrogel can be determined by measuring the weight change of between its equilibrium hydration level and its dehydrated level.

In some aspects and embodiments, a hot solution of PVA-PAAMPS-PEG in water is cooled down to room temperature and is used in its "as-gelled" form.

According to one aspect of the invention, the PVA-PAAMPS-PEG-hydrogel is immersed in water, deionized water, saline solution, phosphate buffered saline solution, Ringer's solution or salinated water to remove the PEG. The process is called the dePEGing process. During dePEGing the hydrogel also absorbs water approaching equilibrium water content. Therefore, dePEGing also can be a re-hydration process.

In another embodiment, the dehydrated hydrogel is re-hydrated. In some of the aspects and embodiments, the re-hydrated hydrogel contains less water than the hydrogel did before the dehydration step.

In some aspects and embodiments, the hydrogel dimensions are large enough so as to allow the machining of a medical device.

Dehydration of the hydrogel can be achieved by a variety of methods. For instance, the hydrogel can be placed in vacuum at room temperature or at elevated temperatures to drive out the water and cause dehydration. The amount of vacuum can be reduced by adding air or inert gas to the vacuum chamber where the hydrogel is placed during dehydration. Dehydration of the hydrogel also can be achieved by keeping it in air or inert gas at room temperature or at an elevated temperature. Dehydration in air or inert gas also can be carried out at temperatures lower than room temperature. In many embodiments, if the dehydration is carried out at elevated temperatures, it is necessary to keep the temperature below the melting point of the hydrogel. However, the melting point of the hydrogel can increase during the dehydration step and make it possible to go to higher temperatures as the dehydration evolves. Dehydration of the hydrogel also can be carried out by placing the hydrogel in a solvent. In this case the solvent drives the water out of the hydrogel. For example, placing of PVA-PAAMPS-hydrogel in a low molecular weight PEG (higher than 100 g/mol, about 300-400 g/mol, about 500 g/mol) can cause dehydration of the PVA-PAAMPS-hydrogel. In this case the PEG can be used as pure or in a solution. The higher is the PEG concentration the higher is the extent of dehydration. The solvent dehydration also can be carried out at elevated temperatures. These dehydration methods can be used in combination with each other.

Re-hydration of the hydrogel can be done in water containing solutions such as, saline, water, deionized water, salinated water, or an aqueous solution or DMSO.

In some aspects and embodiments, when the acrylamidomethylpropane sulfonic acid (AAMPS) monomer is used to polymerize the IPN hydrogel, the unreacted monomer should be removed. One method is to wash the hydrogel with water at room temperature or at an elevated temperature. The unreacted monomer extraction can also be carried out by contacting the hydrogel with a supercritical fluid, such as $CO_2$ or propane. Another alternative is to crosslink the hydrogels (radiation crosslinking or chemical crosslinking with epichlorohydrin, gluteraldehyde, methylene bisacrylamide, N-(1-Hydroxy-2,2-dimethoxyethyl)acrylamide, ethylene glycol dimethacrylate (EGDMA or EGMA) and derivatives (such as diethylene glycol dimethacrylate, triethylene glycol dimethacrylate, and the like.), ethylene glycol diacrylate (EGDA) and derivatives such as diethylene glycol diacrylate, tetra ethylene glycol diacrylate, N,N-(1,2-Dihydroxyethylene)bisacrylamide, divinylbenzene, and/or the like.) and wash it with water or soak it in a supercritical fluid below or above the melting point of the hydrogel.

In some aspects and embodiments, the hydrogel is shaped into a medical device and subsequently dehydrated. The dehydrated implant is then re-hydrated. The initial size and shape of the medical implant is tailored such that the shrinkage caused by the dehydration and the swelling caused by the subsequent re-hydration (in most embodiments the dehydration shrinkage is larger than the re-hydration swelling) result in the desired implant size and shape that can be used in a human joint.

In certain embodiments, the ionic hydrogels (for example, ionic PVA-hydrogels, ionic PVA-PAAMPS-hydrogels, and the like) can be formed or machined into a desired shape to act as medical device, such as a kidney shaped interpositional device for the knee, a cup shaped interpositional device for the hip, a glenoid shaped interpositional device for the shoulder, other shapes for interpositional devices for any human joint. Also the machining of the ionic hydrogel (for example, ionic PVA-hydrogel, ionic PVA-PAAMPS-hydrogel, and the like) can result in a cylindrical, cuboid, or other shapes to fill cartilage defects either present in the joint or prepared by the surgeon during the operation.

The ionic hydrogel based (for example, ionic PVA-hydrogel, ionic PVA-PAAMPS-hydrogel, and the like) medical device can be an interpositional device such as a unispacer, to act as a free floating articular implant in a human joint, such as the knee joint, the hip joint, the shoulder joint, the elbow joint, and the upper and lower extremity joints.

In some of the aspects and embodiments, the ionic hydrogel (for example, ionic PVA-hydrogel, ionic PVA-PAAMPS-hydrogel, and the like) is placed in 100% PEG to dehydrate the hydrogel. Subsequently the dehydrated gel is placed in saline solution for re-hydration. This process decreases the equilibrium water content in the gel, and hence further improves the mechanical properties of the hydrogel.

In other embodiments, the ionic hydrogel (for example, ionic PVA-hydrogel, ionic PVA-PAAMPS-hydrogel, and the like) is placed in a PEG-water solution for controlled dehydration followed by re-hydration in saline. The concentration of the PEG-water solution can be tailored to achieve desired level of dehydration of the hydrogel. Higher dehydrations provide more improvements in mechanical properties and at lower dehydrations the improvement is less. In some applications, it is desirable to achieve a lower stiffness; therefore a lower PEG and/or water concentration solution can be used for the dehydration process.

In some aspects and embodiments the ionic hydrogel (for example, ionic PVA-hydrogel, ionic PVA-PAAMPS-hydrogel, and the like) is dehydrated in vacuum at room temperature or at an elevated temperature. The vacuum dehydration can be carried out at about 10° C., above about 10° C., about 20° C., about 30° C., 40° C., 50° C., 60° C., 75° C., 80° C., 90° C., about 100° C. or above 100° C., or at 130° C. or any temperature thereabout or therebetween.

In some aspects and embodiments the vacuum dehydration of the ionic hydrogel (for example, ionic PVA-hydrogel, ionic PVA-PAAMPS-hydrogel, and the like) is first carried out at room temperature until a desired level of dehydration is reached; thereafter the temperature is increased to further dehydrate the hydrogel. The temperature is increased, preferably to above about 100° C., to above or below 160° C., for example, above about 80° C. to about 260° C.

In some aspects and embodiments, the ionic hydrogel is heated in air or inert gas or partial vacuum of inert gas for dehydration.

In some of these embodiments, the ionic hydrogel is vacuum dehydrated before heating in air or inert gas.

In some aspects and embodiments, the heating of the ionic hydrogel (for example, ionic PVA-hydrogel, ionic PVA-PAAMPS-hydrogel, and the like) is carried out slowly; for example at less than about 1° C./min, at more than about 1° C./min, at 2, 5, 10° C./min or faster. Slower heating rates results in stronger gels than higher heating rates with some of the ionic hydrogel compositions.

In most embodiments, the finished medical device is packaged and sterilized.

In some of the aspects and embodiments, the hydrogel is subjected to dehydration steps. The dehydration is carried out in air or in vacuum or at an elevated temperature (for instance heating at above or below 160° C., for example, above about 80° C. to about 260° C.). The dehydration causes loss of water hence a reduction in volume accompanied by a reduction in weight. The weight loss is due to loss of water. The reduction in volume on the other hand could be due to the loss of water or further crystallization of the hydrogel. In some aspects and embodiments the dehydration is carried out by placing the hydrogel in a low molecular weight polymer (for instance placing an ionic hydrogel (for example, ionic PVA-hydrogel, ionic PVA-PAAMPS-hydrogel, and the like) in a PEG solution). In some cases the dehydration is caused by loss of water, but in most cases, there is also uptake of the non-solvent by the hydrogel. Therefore, the weight change of the hydrogel is the sum of loss of water and uptake of the non-solvent. The change in volume in this case is due to loss of water, uptake of the non-solvent, further crystallization of the hydrogel, or partial collapse of the porous structure of the non-solvent that is not occupying the space that water was filling in the pores.

In some of the aspects and embodiments, the hydrogel is attached to a metal piece. The metal piece is a porous backside surface that is used for bone-in-growth in the body to fix the hydrogel implant in place. The metal piece attachment to the hydrogel can be achieved by having a porous surface on the substrate where it makes contact with the hydrogel; the porous surface can be infiltrated by the gelling hydrogel solution (for instance a hot PVA-PAAMPS and/or PEG mixture in water); when the solution forms a hydrogel, the hydrogel can be interconnected with the metal piece by filling the porous space.

In some aspects and embodiments, there can be more than one metal piece attached to the hydrogel for fixation with the hydrogel in the body to multiple locations.

In some aspects and embodiments, the hydrogel/metal piece construct can be used during the processing steps described above, such as solvent dehydration, non-solvent dehydration, irradiation, packaging, sterilization, and the like.

In some of the aspects and embodiments the hydrogel contains hyaluronic acid (HA), either by having HA present in the solutions used to make the hydrogel and/or by diffusing HA into the hydrogel. In some of the aspects and embodiments the HA-containing hydrogel is irradiated. The irradiation can be carried out before, after, or during the processing steps such as vacuum dehydration, non-solvent dehydration, re-hydration, and/or heating. The irradiation cross-links the hydrogel matrix and in some aspects and embodiments also forms covalent bonds with the HA. Addition HA to some of the hydrogels increases the lubricity of the hydrogel implant. It can be beneficial for the ionic hydrogels (for example, ionic PVA-hydrogels, ionic PVA-PAAMPS-hydrogels, and the like) to contain substantially reduced water content.

In some aspects and embodiments, the hydrated ionic hydrogel based implants are slightly heated at the surface to partially melt the hydrogel and allow it to reform with more uptake and lubricity.

In some aspects and embodiments, a microwave oven can be used to prepare the PVA solution. The PVA powder is place in water and the mixture is heated in a microwave oven to form a solution.

In some of the aspects and embodiments, the heat dehydration or heating of the hydrogel is carried out in a microwave oven.

According to one embodiment of the invention, creep resistant, highly lubricious, tough and ionic PVA-PAAMPS-hydrogel is prepared by a process comprising the steps of: a) contacting an aqueous solution of poly(vinyl alcohol) (PVA) with an aqueous solution of acrylamido-methylpropane sulfonic acid (AAMPS) solution in presence of an initiator, thereby forming a PVA-AAMPS solution; b) heating or irradiating the PVA-AAMPS solution, thereby forming an inter-penetrating network (IPN) structure of polymerized PAAMPS in the PVA solution; c) subjecting the PVA-PAAMPS IPN to one or more freeze-thaw cycles, thereby forming a tough and ionic PVA-PAAMPS hydrogel; d) dehydrating the ionic PVA-PAAMPS hydrogel in a vacuum, thereby increasing the melting point of the ionic PVA-PAAMPS hydrogel; e) annealing the dehydrated ionic PVA-PAAMPS hydrogel at a temperature below the melting point of the dehydrated ionic PVA-PAAMPS hydrogel; and f) re-hydrating the ionic PVA-PAAMPS hydrogel, thereby forming a creep resistant, highly lubricious, tough and ionic PVA-PAAMPS-hydrogel.

According to another embodiment of the invention, creep resistant, highly lubricious, tough and ionic PVA-PAAMPS-hydrogel is prepared by a process comprising the steps of: a) contacting an aqueous solution of poly(vinyl alcohol) (PVA) with an aqueous solution of polyacrylamido-methylpropane sulfonic acid (PAAMPS), thereby forming a homogenous PVA-PAAMPS solution; b) subjecting the PVA-PAAMPS solution to one or more freeze-thaw cycles, thereby forming a tough PVA-PAAMPS hydrogel; c) dehydrating the tough PVA-PAAMPS hydrogel at room temperature in a vacuum, thereby increasing the melting point of the PVA-PAAMPS hydrogel; d) annealing the dehydrated PVA-PAAMPS hydrogel at a temperature below the melting point of the dehydrated PVA-PAAMPS hydrogel; and e) re-hydrating the PVA-PAAMPS hydrogel, thereby forming a creep resistant, highly lubricious, tough and ionic PVA-PAAMPS-hydrogel.

According to another embodiment of the invention, creep resistant, highly lubricious, tough and ionic PVA-PAAMPS-hydrogel is prepared by a process comprising the steps of: a) contacting an aqueous solution of poly(vinyl alcohol) (PVA) with an aqueous solution of polyacrylamido-methylpropane sulfonic acid (PAAMPS), thereby forming a homogenous PVA-PAAMPS solution; b) pouring the PVA-PAAMPS solution onto a mold (optionally pre-heated); c) cooling the PVA-PAAMPS-hydrogel by freezing at a temperature below 0° C.; d) thawing the PVA-PAAMPS-hydrogel to a temperature above 0° C.; e) dehydrating PVA-PAAMPS-hydrogel at room temperature in a vacuum; 0 annealing the dehydrated PVA-PAAMPS hydrogel at a temperature below the melting point of the dehydrated PVA-PAAMPS hydrogel; and g) re-hydrating the PVA-PAAMPS hydrogel, thereby forming a creep resistant, highly lubricious, tough and ionic PVA-PAAMPS-hydrogel.

According to one embodiment, the mold can be pre-heated to a temperature between about 1 and about 200° C., preferably between about 25° C. and about 150° C., more preferably about 90° C.

According to one embodiment, the PVA-AAMPS solution is heated at a temperature below the boiling point of the PVA-AAMPS solution, thereby forming an inter-penetrating network (IPN) structure of polymerized PAAMPS in the PVA solution.

According to another embodiment, the PVA-AAMPS solution is heated at a temperature between about 40° C. and 45° C., thereby forming an inter-penetrating network (IPN) structure of polymerized PAAMPS in the PVA solution.

According to another embodiment, the PVA-AAMPS solution is irradiated, thereby forming an inter-penetrating network (IPN) structure of polymerized PAAMPS in the PVA solution.

According to another embodiment, the PVA-PAAMPS hydrogel is dehydrated under an inert environment or in a dehydrating solvent.

According to another embodiment, the PVA-PAAMPS hydrogel is dehydrated by immersing in a PEG solution to allow diffusion of the PEG into the PVA-PAAMPS-hydrogel.

According to another embodiment, the dehydrated PVA-PAAMPS hydrogel is annealed at a temperature about 80° C., about 90° C., about 100° C., about 120° C., about 140° C., about 160° C., 190° C., or about 200° C., for about one hour to about 24 hours.

According to another embodiment, the dehydrated PVA-PAAMPS hydrogel is annealed for about 24 hours.

According to another embodiment, the PVA-PAAMPS hydrogel is re-hydrated by soaking in a saline solution or in water.

According to another embodiment, the PVA:PAAMPS ratio is about 1:1, 1:2 or 1:3.

According to another embodiment, the total polymer content in PVA-PAAMPS solution is about 10 wt % to about 50 wt %, for example, about 15 wt %, 20 wt %, 25 wt %, 30 wt %, 35 wt %, 40 wt % or 45 wt %.

According to another embodiment, the PVA-PAAMPS solution is heated to a temperature above room temperature to about 90° C.

According to another embodiment, the PVA-PAAMPS solution is heated to a temperature above room temperature to about 90° C.

According to another embodiment, the freeze-thaw step is repeated for at least 2, 3, 4, 5, 6, 7, 8, 9, 10, or more cycles.

According to another embodiment, the PVA-PAAMPS hydrogel is dehydrated to remove part or all of the water content.

According to another embodiment, the PVA-PAAMPS hydrogel is dehydrated by a method comprising the steps of: a) contacting the PVA-PAAMPS hydrogel with an organic solvent, wherein the PVA-PAAMPS hydrogel comprises a polymer which is not soluble in the solvent, and wherein the solvent is at least partially miscible in water; b) heating the PVA-PAAMPS hydrogel to a temperature below or above the melting point of the PVA-PAAMPS hydrogel; and c) cooling the heated PVA-PAAMPS hydrogel to room temperature.

According to another embodiment, the PVA-PAAMPS hydrogel is dehydrated by a method comprising the steps of: a) contacting the PVA-PAAMPS hydrogel with an organic solvent, wherein the hydrogel comprises a polymer which is not soluble in the solvent, and wherein the solvent is at least partially miscible in water; and b) air-drying the PVA-PAAMPS hydrogel at room temperature.

According to another embodiment, the PVA-PAAMPS hydrogel is dehydrated by a method comprising the steps of: a) contacting the PVA-PAAMPS hydrogel with an organic solvent, wherein the PVA-PAAMPS hydrogel comprises a polymer which is not soluble in the solvent, and wherein the solvent is at least partially miscible in water; and b) subjecting the PVA-PAAMPS hydrogel to at least one freeze-thaw cycle and allowing the PVA-PAAMPS hydrogel to warm-up room temperature.

According to another embodiment, the dehydration is carried out by placing the PVA-PAAMPS hydrogel in: a) a non-solvent, wherein i) the non-solvent is PEG, alcohols, acetones, saturated salinated water, vitamin, or carboxylic acid, aqueous solution of a salt of an alkali metal, and ii) the non-solvent contains more than one ingredient including water, PEG, vitamin, polymer, ester, proteoglycan, and carboxylic acid; or b) in a supercritical fluid.

According to another embodiment, the dehydration is carried out by heating the PVA-PAAMPS hydrogel in air or in inert gas to an elevated temperature, wherein the heating rate is slow or fast, ranging from about 0.01° C./min to about 10° C./min, or the heating follows the vacuum or air dehydration.

According to another embodiment, the dehydrated PVA-PAAMPS hydrogel is re-hydrated by placing the dehydrated PVA-PAAMPS hydrogel: i) in water, saline solution, Ringer's solution, salinated water, buffer solution, and the like, ii) in a humid chamber, or iii) at room temperature or at an elevated temperature.

According to another embodiment, the method further comprises a step of heating the PVA-PAAMPS to a temperature above about 40° C. to about 200° C. or more.

According to another embodiment, the PVA-PAAMPS hydrogel is re-hydrated to reach equilibrium.

According to another embodiment, the PVA-PAAMPS hydrogel is re-hydrated in water or a salt solution.

In one aspect, the invention provides a PVA-PAAMPS-hydrogel made by any of the methods described herein.

According to one aspect of the invention, the PVA-PAAMPS-hydrogel made by any of the methods described herein, the PVA-PAAMPS ratio is about 1:1, 1:2, 1:3 or 1:4.

According to another aspect of the invention, the PVA-PAAMPS-hydrogel made by any of the methods described herein, the total polymer content in PVA-PAAMPS solution is about 10 wt % to about 50%, for example, 15 wt %, 20 wt %, 25 wt %, 30 wt %, 35 wt %, 40 wt %, or 45 wt %.

According to another aspect of the invention, the PVA-PAAMPS-hydrogel made by any of the methods described herein, the PVA-PAAMPS-hydrogel comprises one or more hydrophilic polymers selected from the group consisting of: PVA-polyacrylamido-methylpropane sulfonic acid (PVA-PAAMPS) copolymer, poly(ethylene oxide) (PEO)-PAAMPS copolymer, polyvinylpyrrolidone (PVP), hyaluronic acid (HA), and poly(allylamine hydrochloride) (PAH).

According to another aspect of the invention, the PVA-PAAMPS-hydrogel made by any of the methods described herein, the PVA-PAAMPS hydrogel comprises water and/or one or more other ingredients, wherein the ingredient is PVA, PAAMPS, PEG, and/or salt, proteoglycan, water soluble polymer, amino acid, alcohol, DMSO, water soluble vitamin, wherein in the ingredients is partially or completely soluble in water, wherein the ingredient is PEG, wherein the PEG is in a solution of water, ethanol, ethylene glycol, DMSO, or a suitable solvent, wherein the ingredient is non-volatile, wherein the ingredient is at least partially miscible in water, wherein the ingredient is selected from the group consisting of PEG, salt, NaCl, KCl, $CaCl_2$, vitamins, buffers, acids, alkaline solvents, carboxylic acids, hydrocarbons, esters, and amino acids, wherein the ingredient is PEG of different molecular weights or a blend of PEGs of different molecular weights, wherein the ingredient is a water miscible polymer, wherein the water miscible polymer is PEO, Pluronic, amino acids, proteoglycans, polyacrylamido-methylpropane sulfonic acid (PAAMPS), polyvinylpyrrolidone. polysaccharides, dermatin sulfate, keratin sulfate, chondroitin sulfate, or dextran sulfate.

Embodiments and aspects of the invention also include:

1. Ionic PVA-PAAMPS-hydrogels that are capable of re-hydration following dehydration, wherein the ionic PVA-PAAMPS-hydrogel is capable of re-hydration following dehydration, wherein a) the dehydration reduces the weight of the hydrogel, for example, by more than about 34%; and b) the re-hydration results increase in equilibrium water content in the re-hydrated hydrogel, for example, at least about 46%.

2. Ionic PVA-PAAMPS-hydrogels with biaxial orientation.

3. Ionic PVA-PAAMPS-hydrogels with uniaxial orientation.

4. Ionic PVA-PAAMPS-hydrogels with a high ultimate tensile strength.

5. Dehydration of an ionic PVA-PAAMPS-hydrogel containing water and/or one or more other ingredient (for example, PEG or Salt), wherein
   a. the ingredient is non-volatile such as PEG;
   b. the ingredient is at least partially miscible with water;
   c. at least 0.1% of the hydrogel's weight constitutes one or more non-volatile ingredient, such as PEG, hydrocarbons, and the like;
   d. the ingredient is a water miscible polymer such as PEO, Pluronic, amino acids, proteoglycans, polyvinylpyrrolidone, polyacrylamido-methylpropane sulfonic acid (PAAMPS), polysaccharides, dermatin sulfate, keratin sulfate, chondroitin sulfate, dextran sulfate, and the like;
   e. the ingredient is selected from the group of PEG, salt, NaCl, KCl, $CaCl_2$, vitamins, buffers, acids, alkaline solvents, carboxylic acids, hydrocarbons, esters, amino acids, and the like;
   f. the ingredient is PEG, wherein
      i. PEG of different molecular weights, or
      ii. blends of PEGs,
   g. the dehydration is carried out by placing in a non-solvent, wherein
      i. the non-solvent is selected from PEG, alcohols (such as isopropyl alcohol), acetones, saturated salinated water, aqueous solution of a salt of an alkali metal, vitamins, buffers, acids, alkaline solvents, carboxylic acids, and the like, or
      ii. the non-solvent contains more than one ingredient such as water, PEG, vitamins, polymers, proteoglycans, carboxylic acids, esters, and the like.
   h. the dehydration is carried out by leaving the hydrogel in air;
   i. the dehydration is carried out by placing the hydrogel in vacuum;
   j. the dehydration is carried out by placing the hydrogel in vacuum at room temperature;
   k. the dehydration is carried out by placing the hydrogel in vacuum at an elevated temperature;
   l. the dehydration is carried out by heating the hydrogel in air or inert gas to elevated temperature, wherein
      i. the heating rate is slow,
      ii. the heating rate is fast, or
      iii. the heating follows the vacuum or air dehydration; and m. the dehydrated hydrogel is re-hydrated
  i. by placing in water, saline solution, Ringer's solution, salinated water, buffer solution, and the like,
  ii. by placing in a relative humidity chamber, or
  iii. by placing at room temperature or at an elevated temperature.

Each composition and attendant aspects, and each method and attendant aspects, which are described above can be combined with another in a manner consistent with the teachings contained herein. According to the embodiments of the inventions, all methods and the steps in each method can be applied in any order and repeated as many times in a manner consistent with the teachings contained herein.

Definitions and Further Embodiments

The terms "about" or "approximately" in the context of numerical values and ranges refers to values or ranges that approximate or are close to the recited values or ranges such that the invention can perform as intended, such as having a desired degree of cross-linking, creep resistance, lubricity, charge, and/or toughness, as is apparent to the skilled person from the teachings contained herein. This is due, at least in part, to the varying properties of polymer compositions. Thus these terms encompass values beyond those resulting from systematic error. These terms make explicit what is implicit.

"Irradiation", in one aspect of the invention, the type of radiation, preferably ionizing, is used. According to another aspect of the invention, a dose of ionizing radiation ranging from about 25 kGy to about 1000 kGy is used. The radiation dose can be about 25 kGy, about 50 kGy, about 65 kGy, about 75 kGy, about 100 kGy, about 150, kGy, about 200 kGy, about 300 kGy, about 400 kGy, about 500 kGy, about 600 kGy, about 700 kGy, about 800 kGy, about 900 kGy, or about 1000 kGy, or above 1000 kGy, or any value thereabout or therebetween. Preferably, the radiation dose can be between about 25 kGy and about 150 kGy or between about 50 kGy and about 100 kGy. These types of radiation, including gamma and/or electron beam, kills or inactivates bacteria, viruses, or other microbial agents potentially contaminating medical implants, including the interfaces, thereby achieving product sterility. The irradiation, which may be electron or gamma irradiation, in accordance with the present invention can be carried out in air atmosphere containing oxygen, wherein the oxygen concentration in the atmosphere is at least 1%, 2%, 4%, or up to about 22%, or any value thereabout or therebetween. In another aspect, the irradiation can be carried out in an inert atmosphere, wherein the atmosphere contains gas selected from the group consisting of nitrogen, argon, helium, neon, or the like, or a combination thereof. The irradiation also can be carried out in a sensitizing gas such as acetylene or mixture or a sensitizing gas with an inert gas or inert gases. The irradiation also can be carried out in a vacuum. The irradiation can also be carried out at room temperature, or at between room temperature and the melting point of the polymeric material, or at above the melting point of the polymeric material. Subsequent to the irradiation step the hydrogel can be melted or heated to a temperature below its melting point for annealing. These post-irradiation thermal treatments can be carried out in air, PEG, solvents, non-solvents, inert gas and/or in vacuum. Also the irradiation can be carried out in small increments of radiation dose and in some embodiments these sequences of incremental irradiation can be interrupted with a thermal treatment. The sequential irradiation can be carried out with about 1, 10, 20, 30, 40, 50, 100 kGy, or higher radiation dose increments. Between each or some of the increments the hydrogel can be thermally treated by melting and/or annealing steps. The thermal treatment after irradiation may eliminate the residual free radicals in the hydrogels created by irradiation, and/or eliminate the crystalline matter, and/or help in the removal of any extractables that may be present in the hydrogel.

In accordance with another aspect of this invention, the irradiation may be carried out in a sensitizing atmosphere. This may comprise a gaseous substance which is of sufficiently small molecular size to diffuse into the polymer and which, on irradiation, acts as a polyfunctional grafting moiety. Examples include substituted or unsubstituted polyunsaturated hydrocarbons; for example, acetylenic hydrocarbons such as acetylene; conjugated or unconjugated olefinic hydrocarbons such as butadiene and (meth)acrylate monomers; sulphur monochloride, with chloro-tri-fluoroethylene (CTFE) or acetylene being particularly preferred. By "gaseous" is meant herein that the sensitizing atmosphere is in the gas phase, either above or below its critical temperature, at the irradiation temperature.

At any step of fabrication, the hydrogel can be irradiated by e-beam or gamma to cross-link. The irradiation can be carried out in air, in inert gas, in sensitizing gas, or in a fluid medium such as water, saline solution, polyethylene-glycol solution, and the like. The radiation dose level is between one kGy and 10,000 kGy, preferably 25 kGy, 40 kGy, 50 kGy, 200 kGy, 250 kGy, or above.

The term "dose rate" refers to a rate at which the radiation is carried out. Dose rate can be controlled in a number of ways. One way is by changing the power of the e-beam, scan width, conveyor speed, and/or the distance between the sample and the scan horn. Another way is by carrying out the irradiation in multiple passes with, if desired, cooling or heating steps in-between. With gamma and x-ray radiations the dose rate is controlled by how close the sample is to the radiation source, how intense is the source, the speed at which the sample passes by the source.

The dose rate of the electron beam can be adjusted by varying the irradiation parameters, such as conveyor speed, scan width, and/or beam power. With the appropriate parameters, a 20 Mrad melt-irradiation can be completed in for instance less than 10 minutes. The penetration of the electron beam depends on the beam energy measured by million electron-volts (MeV). Most polymers exhibit a density of about 1 g/cm$^3$, which leads to the penetration of about 1 cm with a beam energy of 2-3 MeV and about 4 cm with a beam energy of 10 MeV. The penetration of e-beam is known to increase slightly with increased irradiation temperatures. If electron irradiation is preferred, the desired depth of penetration can be adjusted based on the beam energy. Accordingly, gamma irradiation or electron irradiation may be used based upon the depth of penetration preferred, time limitations and tolerable oxidation levels.

Ranges of acceptable dose rates are exemplified in International Application WO 97/29793. In general, the dose rates vary between 0.5 Mrad/pass and 50 Mrad/pass. The upper limit of the dose rate depends on the resistance of the polymer to cavitation/cracking induced by the irradiation.

If electron radiation is utilized, the energy of the electrons also is a parameter that can be varied to tailor the properties of the irradiated polymer. In particular, differing electron energies result in different depths of penetration of the electrons into the polymer. The practical electron energies range from about 0.1 MeV to 16 MeV giving approximate iso-dose penetration levels of 0.5 mm to 8 cm, respectively. The preferred electron energy for maximum penetration is about 10 MeV, which is commercially available through vendors such as Studer (Daniken, Switzerland) or E-Beam Services New Jersey, USA). The lower electron energies may be preferred for embodiments where a surface layer of the polymer is preferentially cross-linked with gradient in cross-link density as a function of distance away from the surface.

The term "heating" refers to thermal treatment of the polymer at or to a desired heating temperature. In one aspect, heating can be carried out at a rate of about 10° C. per minute to the desired heating temperature. In another aspect, the heating can be carried out at the desired heating temperature for desired period of time. In other words, heated polymers can be continued to heat at the desired temperature, below or above the melt, for a desired period of time. Heating time at or to a desired heating temperature can be at least 1 minute to 48 hours to several weeks long. In one aspect the heating time is about 1 hour to about 24 hours. In another aspect, the heating can be carried out for any time period as set forth herein, before or after irradiation. Heating temperature refers to the thermal condition for heating in accordance with the invention. Heating can be performed at any time in a process, including during, before and/or after irradiation.

The term "annealing" refers to heating or a thermal treatment condition of the polymers in accordance with the invention. Annealing generally refers to continued heating the polymers at a desired temperature below its peak melting point for a desired period of time. Annealing time can be at least 1 minute to several weeks long. In one aspect the annealing time is about 4 hours to about 48 hours, preferably 24 to 48 hours and more preferably about 24 hours. "Annealing temperature" refers to the thermal condition for annealing in accordance with the invention. Annealing can be performed at any time in a process, including during, before and/or after irradiation.

In certain embodiments of the present invention in which annealing can be carried out, for example, in an inert gas, e.g., nitrogen, argon or helium, in a vacuum, in air, and/or in a sensitizing atmosphere, for example, acetylene.

"Supercritical fluid" refers to what is known in the art, for example, supercritical propane, acetylene, carbon dioxide ($CO_2$). In this connection the critical temperature is that temperature above which a gas cannot be liquefied by pressure alone. The pressure under which a substance may exist as a gas in equilibrium with the liquid at the critical temperature is the critical pressure. Supercritical fluid condition generally means that the fluid is subjected to such a temperature and such a pressure that a supercritical fluid and thereby a supercritical fluid mixture is obtained, the temperature being above the supercritical temperature, which for $CO_2$ is 31.3° C., and the pressure being above the supercritical pressure, which for $CO_2$ is 73.8 bar.

"Metal Piece", in accordance with the invention, the piece forming an interface with polymeric material is, for example, a metal. The metal piece in functional relation with polymeric material, according to the present invention, can be made of a cobalt chrome alloy, stainless steel, titanium, titanium alloy or nickel cobalt alloy, for example.

"Non-metallic Piece", in accordance with the invention, the piece forming an interface with polymeric material is, for example, a non-metal. The non-metal piece in functional relation with polymeric material, according to the present invention, can be made of ceramic material, for example.

The term "inert atmosphere" or "inert environment" refers to an environment having no more than 1% oxygen and more preferably, an oxidant-free condition that allows free radicals in polymeric materials to form cross links without oxidation during a process of sterilization. An inert atmosphere is used to avoid $O_2$, which would otherwise oxidize the medical device. Inert atmospheric conditions such as nitrogen, argon, helium, or neon are used for sterilizing polymeric medical implants by ionizing radiation.

Inert atmospheric conditions such as nitrogen, argon, helium, neon, or vacuum are also used for sterilizing interfaces of in medical implants by ionizing radiation.

Inert atmospheric conditions also refer to an inert gas, inert fluid, or inert liquid medium, such as nitrogen gas or silicon oil.

The term "vacuum" refers to an environment having no appreciable amount of gas. A vacuum is used to avoid $O_2$. A vacuum condition can be used for sterilizing implants by ionizing radiation. A vacuum condition can be created using a commercially available vacuum pump. A vacuum condition also can be used when sterilizing interfaces in medical implants by ionizing radiation.

"Sterilization", one aspect of the present invention discloses a process of sterilization of medical implants containing PVA-hydrogels, such as PVA-PAAMPS-hydrogels. The process comprises sterilizing the medical implants by ionizing sterilization with gamma or electron beam radiation, for example, at a dose level ranging from about 25-70 kGy, or by gas sterilization with ethylene oxide or gas plasma.

Another aspect of the present invention discloses a process of sterilization of medical implants containing PVA-hydrogels, such as PVA-PAAMPS-hydrogels. The process comprises sterilizing the medical implants by ionizing sterilization with gamma or electron beam radiation, for example, at a dose level ranging from 25-200 kGy. The dose level of sterilization is higher than standard levels used in irradiation. This is to allow cross-linking or further cross-linking of the medical implants during sterilization.

The team "contact" includes physical proximity with or touching, mixing, blending, doping, diffusing, imbibing, soaking, or immersing of one ingredient with another. For example, a PVA solution in contacted with a PAAMPS solution, or a PVA solution is mixed with a AAMPS solution, or a PVA-PAAMPS hydrogel is doped with a solution by diffusion. The environment can be heated to a temperature ranging from room temperature to a temperature below the melting point of the material. The contact period ranges from at least about 1 minute to several weeks and the duration depending on the temperature of the environment.

Contacting also refers to placing the hydrogel sample in a specific environment for a sufficient period of time at an appropriate temperature, for example, contacting the hydrogel sample with a solution containing one or more salt, acidic and/or alkaline ingredients. The environment is heated to a temperature ranging from room temperature to a temperature below the melting point of the hydrogel material. The contact period ranges from at least about 1 minute to several weeks and the duration depending on the temperature of the environment.

The term "hydrogel" or the term "PVA-hydrogels", as described herein, encompasses polymer-based hydrogels, including PVA-based hydrogels, "PVA-PAAMPS-hydrogels", "PVA-PAAMPS-PEG-hydrogels", and all other hydrogel compositions disclosed herein including de-hydrated hydrogels. PVA-hydrogels are networks of hydrophilic polymers containing absorbed water that can absorb a large amounts of energy, such as mechanical energy, before failure.

A hydrogel under certain environmental conditions can be transformed into liquid phase, in which it flows and is injectable (solution, formulation and the like). Such conditions can be defined by environmental factors such as the ingredients of the formulation, temperature, pressure, pH, ionic strength, environment such as vacuum, gas and/or liquid, electromagnetic environment and/or irradiation.

The term "hydrogel solution" or "polymer solution" refers to a solution comprising a monomer, polymer, mixture of monomer and/or polymers, co-polymers, networks of hydrophilic polymers, a polymer formulation containing other ingredients, that is in a non-solid, injectable, liquid, can be flowable under gravity, flowable under additional forces such as an applied pressure, or can be a fluid-like, biocompatible pre-gel material (having all the ingredients to form a hydrogel and a viscosity such that can pass through an injection needle), and capable of forming hydrogel under suitable conditions.

The term "cryogel" generally refers to a gel prepared by subjecting a polymer (such as polyvinyl alcohol) solution or a mixture or blend of polymer solutions to freezing and thawing cycles where freezing of the water molecules in the polymer solution is thought to force polymer chains to phase-separate and form concentrated domains. During thawing the polymer chains in these polymer-rich domains are free to move and form crystals, causing the solution to form a physically-crosslinked gel.

The term "theta gel" generally refers to a gel prepared by the addition of a gelling agent which is a good solvent at high temperature and a bad (poor) solvent at low temperature in a polymer solution at high temperature and cooling down the mixture to a lower temperature at which the polymer chains are forced to phase separate and crystallize forming a physically crosslinked hydrogel network.

The term "radiogel" generally refers to a gel prepared by irradiating the polymer solution or gels with or with out an initiator and cross-linking agent to various radiation dose where the polymer chains form chemically crosslinked network.

The term "creep resistance" (adj. creep resistant) generally refers to the resistance to continued extension or deformation, which results from the viscoelastic flow of the polymer chains under continuous load.

The term "lubricity" (adj. lubricious) generally refers to a physical property of a hydrogel, for example, it is a measure of the slipperiness of a hydrogel surface, which also relates to the hydrophilicity of the same surface.

The term coefficient of friction (COF) generally refers to the coefficient of friction between two solid surfaces, which is defined as the ratio of the tangential force required to produce sliding divided by the normal force between the surfaces.

The term "ionic moieties" refers to the ionic structures present in a hydrogel, such as acrylamido-methylpropane sulfonic acid (AAMPS) (as shown below) present in a PVA-PAAMPS-hydrogel made according to the invention:

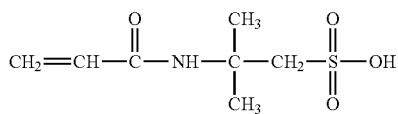

Acrylamido-methylpropane sulfonic acid (AAMPS) structure.

Likewise, an ionic hydrogel (for example, ionic PVA-hydrogel, ionic PVA-PAAMPS-hydrogel, and the like) refers to a hydrogel having ionic structures, such as acrylamido-methylpropane sulfonic acid (AAMPS).

Each composition and attendant aspects, and each method and attendant aspects, which are described above can be combined with another in a manner consistent with the teachings contained herein. According to the embodiments of the inventions, all methods and the steps in each method can be applied in any order and repeated as many times in a manner consistent with the teachings contained herein.

The invention is further described by the following examples, which do not limit the invention in any manner.

EXAMPLES

Determination of the Equilibrium Water Content (EWC) in a Hydrogel

Following method was used to determine the equilibrium water content (EWC) in a hydrogel. The specimens were first immersed in saline solution or DI water with agitation for removal of any unbound molecules and for equilibrium hydration. To determine when the gels reached equilibrium hydration, their weight changes were recorded daily and the saline solution or DI water was replaced with fresh saline solution or DI water, respectively. After the equilibrium hydration level was reached, the equilibrium hydration weights of the specimens were recorded. Subsequently, the gel specimens were dried in an air convection oven at 90° C. until no significant changes in weight were detected. The EWC in a gel was then calculated by the ratio of the difference between the hydrated and dehydrated weights to the weight at equilibrated hydration state.

The EWC of the hydrogels were also determined using a Thermogravimetric Anaylzer (TGA Q 500, TA Instruments) after immersing in saline solution or DI water with agitation for removal of any unbound molecules and for equilibrium hydration. Three samples of approximately 20 mg were cut from each hydrogel. The samples were placed on a TGA platinum pan and heated at a rate of 1-20° C./minute from 0-25° C. to 200-300° C. under a nitrogen purge. The weight change of the samples was determined by taking the difference between the initial weight and the equilibrium dried weight. The percent equilibrium water content was determined using Universal Analysis 2000 (TA Instruments) by dividing the weight change over the initial weight.

Example 1. Preparation of Polyvinyl Alcohol-Acrylamido-Methylpropane Sulfonic Acid IPNs Exemplary Method 1. A PVA/AAMPS aqueous solution was prepared by first dissolving PVA (PVA, Molecular weight=115,000 g/mol, Scientific Polymer Products, Ontario, N.Y.) in deionized water at 90° C. by constant stirring where the concentration of PVA was 15% ((wPVA)/(wWater+wPVA)) in the final PVA/AAMPS mixture. After formation of a clear PVA solution this PVA solution was cooled down to the 40° C. Previously prepared acrylamido-methylpropane sulfonic acid (where the concentration of AAMPS in PVA/AAMPS mixture was be 5%, 10%, 15%, or 20% (wAAMPS)/(wWater+wAAMPS) in the PVA/AAMPS mixture) monomer solution was added to this PVA solution with continuous agitation at 40° C. An initiator mixture was prepared by dissolving equal amounts of azobisisobutyronitrile (AIBN) and ammonium persulfate (APS) such that when added to the respective PVA/AAMPS solution the total amount of the initiator was 0.1 weight percent of AAMPS monomer in ethanol and DI mixture (1:5 ratio). This initiator mixture was then added to the clear PVA/

AAMPS solution. The final solution was then polymerized for 2 hours by mixing continuously at 40-45° C. in the reaction vessel. The pre-polymerized solution was poured into a hot glass mold and sealed with a glass cover. This mold was kept at 55° C. between two stainless steel blocks for 2 hours then at 65° C. for 4 hours to form a sheet. The mold was then placed in a −17° C. freezer for 16 hours, and subsequently thawed for 8 hours. This freeze-thaw process can be repeated for more cycles. Upon removal from the mold, some IPN sheets were placed in water to remove the unreacted acrylamido-methylpropane sulfonic acid monomer and stirred continuously by changing the water daily until no trace monomer was detected by UV-VIS as described in Example 3. Some of the IPNs were placed in saline and some in DI water for removal of unreacted monomer and also to determine the swelling behavior and equilibrium water content of the polyvinyl alcohol-acrylamido-methylpropane sulfonic acid IPN. The weight and dimensional changes of the samples were recorded until equilibrium hydration was reached in both media (see FIGS. 1 and 2, which shows weight change for PVA/AAMPS IPNs in DI water and saline).

Figure 1:
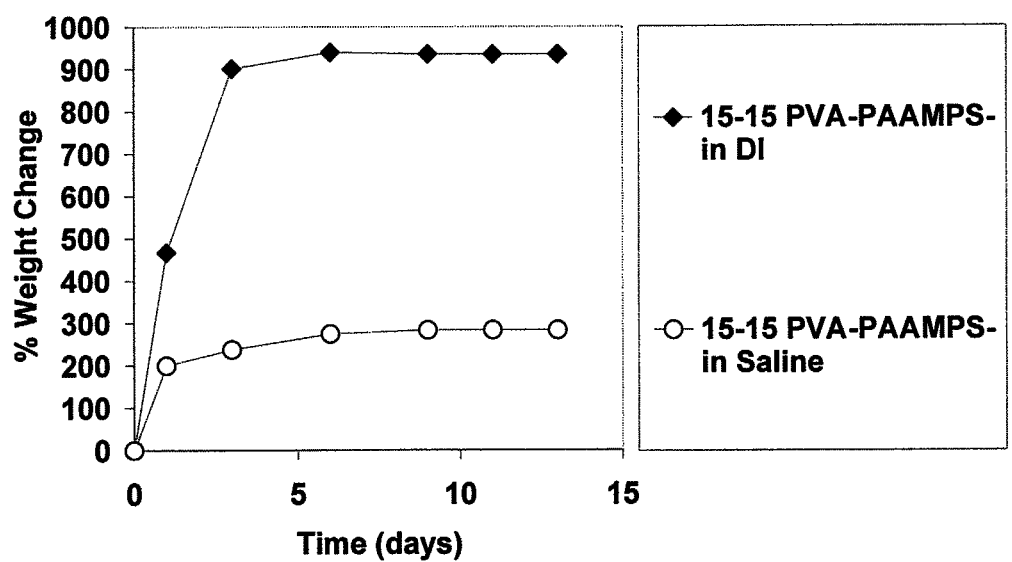
FIG. 1 shows weight change for noncrosslinked PVA/AAMPS IPNs in DI water and saline prepared by Method 1, as described in Example 1.
Figure 2:
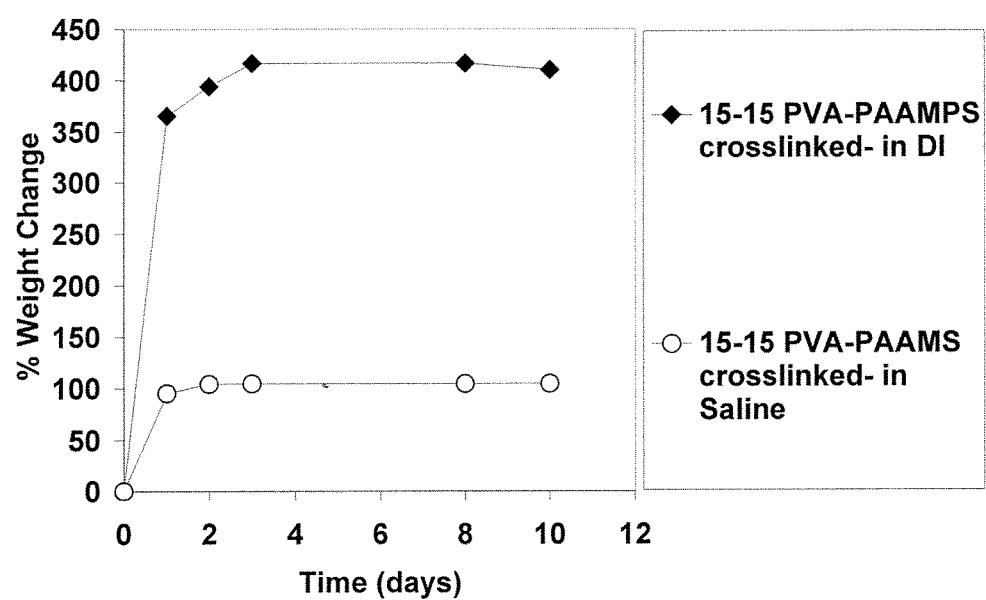
FIG. 2 shows weight change for crosslinked PVA/AAMPS IPNs in DI water and saline prepared by Method 1, as described in Example 1.

PVA/AAMPS IPNs exhibited high degree of swelling in DI water compared to saline (see FIGS. 1 and 2). Both gels were lubricous; however, the gel that was hydrated in DI water was somewhat brittle.

The same procedure described above (see Example 1 Method 1) for the formation of the PVA/PAAMPS IPN was repeated by using methylene-bisacrylamide (MBA) (Sigma-Aldrich Inc. St Louis, Mo.) as a cross-linking agent using 15% AAMPS, 15% PVA and 0.1% initiator (APS+AIBN). MBA was dissolved in DI water and added into the clear PVA/AAMPS mixture prior to the addition of initiator such that when added to the respective PVA/AAMPS solution the total amount of the MBA was 1.0 weight percent of AAMPS. An initiator mixture was prepared by dissolving equal amounts of azobisisobutyronitrile (AIBN) and ammonium persulfate (APS) such that when added to the respective PVA/AAMPS solution the total amount of the initiator was 0.1 weight percent of AAMPS monomer in ethanol and DI mixture (1:5 ratio). This initiator mixture was then added to the clear PVA/AAMPS solution. The final solution was then polymerized for 2 hours by mixing continuously at 40-45° C. in the reaction vessel. The pre-polymerized solution was poured into a hot glass mold and sealed with a glass cover. This mold was kept at 55° C. between two stainless steel blocks for 2 hours then at 65° C. for 4 hours to form a sheet. The mold was then placed in a −17° C. freezer for 16 hours, and subsequently thawed for 8 hours. This freeze-thaw process can be repeated for more cycles. Upon removal from the mold, some IPN sheets were placed in water to remove the unreacted acrylamido-methylpropane sulfonic acid monomer and stirred continuously by changing the water daily until no trace monomer was detected by UV-VIS as described in Example 3. Some of the IPNs were placed in saline and some in DI water for removal of unreacted monomer and also to determine the swelling behavior and equilibrium water content of the polyvinyl alcohol-acrylamido-methylpropane sulfonic acid IPN. The weight and dimensional changes of the samples were recorded until equilibrium hydration was reached in both media (see Example 2). Crosslinked IPNs in DI water or saline showed less swelling then their non-crosslinked counterparts in respective media. The swelling of the DI immersed crosslinked IPNs were higher then saline immersed ones.

In both the crosslinked and noncrosslinked IPNs the swelling was lower with saline than with DI water. This is due to the screening of the charges by the Na$^+$ in saline. The screening of the charges reduces the repulsion between the sulfonic acid groups and results in reduced swelling. Therefore the extent of swelling of these IPNs can be tailored by either changing the concentration of AAMPs and/or by varying the ionic strength of the solution they are stored in. For instance one can store implants made from IPN containing AAMPS in a solution of high ionic strength to collapse the IPN structure; upon implantation in vivo the gel will swell and fill the space that it needs to occupy, or the swelling in vivo will take place in a constrained space.

Figure 3:
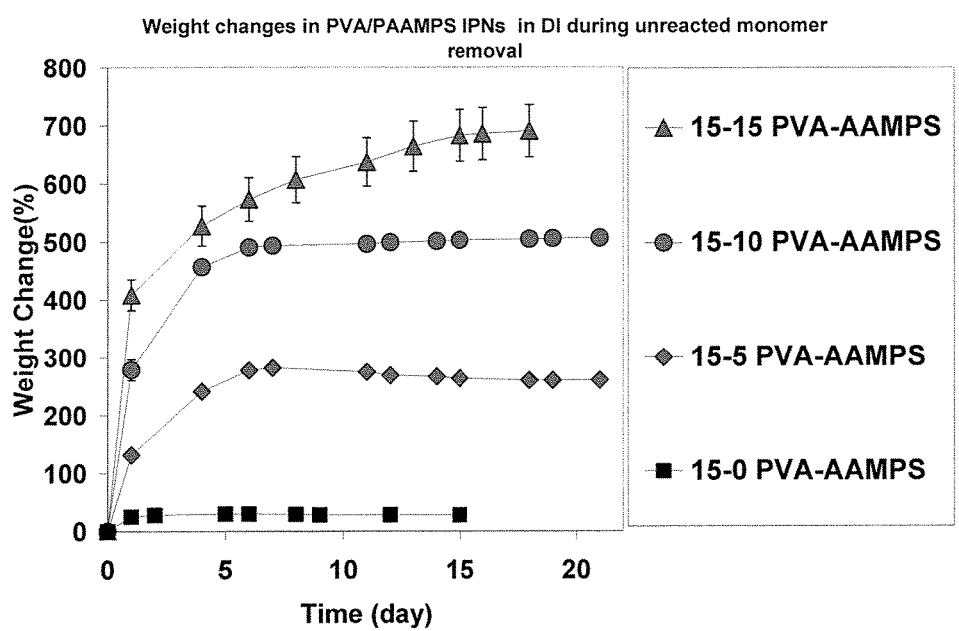
FIG. 3 shows weight change for crosslinked PVA/AAMPS IPNs in DI water prepared by Method 2, as described in Example 1.
Figure 4:
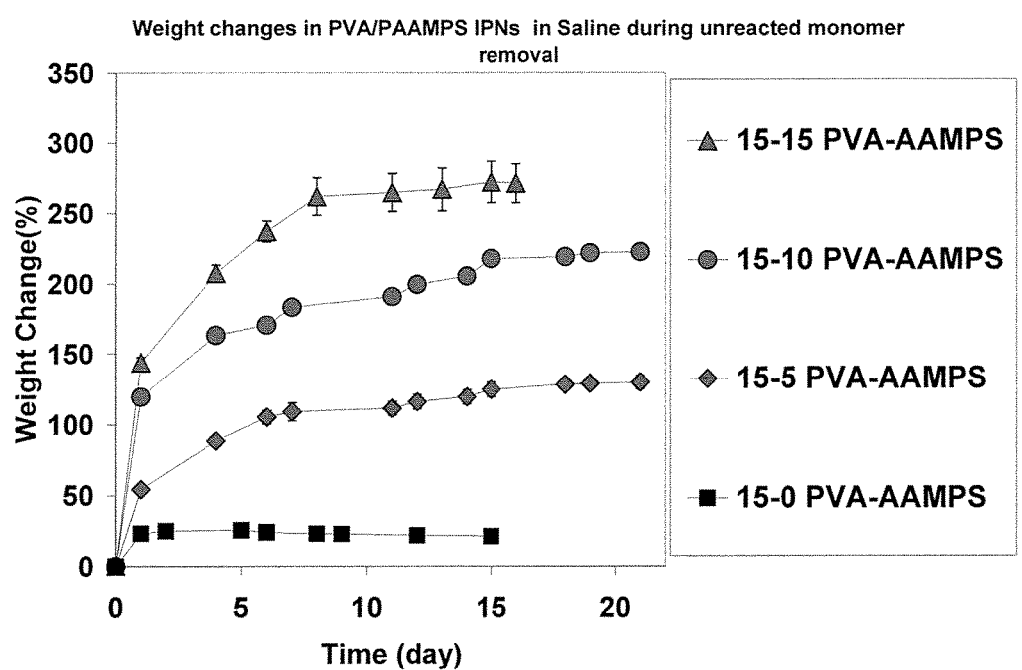
FIG. 4 shows weight change for crosslinked PVA/AAMPS IPNs in saline prepared by Method 2, as described in Example 1.

Exemplary Method 2. A PVA/AAMPS aqueous solution was prepared by first dissolving PVA (PVA, Molecular weight=115,000 g/mol, Scientific Polymer Products, Ontario, N.Y.) in deionized water at 90° C. by constant stirring where the concentration of PVA was 15% ((wPVA)/wWater+wPVA)) in the final PVA/AAMPS mixture. After formation of a clear PVA solution, this PVA solution was cooled down to the 40° C. Previously prepared acrylamido-methylpropane sulfonic acid (where the concentration of AAMPS in final PVA/AAMPS mixture was 5%, 10%, 15%, and 20% (wAAMPS)/(wWater+wAAMPS) in the PVA/AAMPS mixture) monomer solution was added to this PVA solution with continuous agitation at 40° C. MBA was added into clear PVA/AAMPS mixture by dissolving MBA in DI water such that when added to the respective PVA/AAMPS solution the total amount of the MBA was 1.0 weight percent of AAMPS. An initiator mixture was prepared by dissolving equal amounts of azobisisobutyronitrile (AIBN) and ammonium persulfate (APS) such that when added to the respective PVA/AAMPS solution the total amount of the initiator was 0.1 weight percent of AAMPS monomer in ethanol and DI mixture (1:5 ratio). This initiator mixture was then added to the clear PVA/AAMPS solution. Resulting mixture was pre-polymerized for 1 h by mixing continuously at 40° C. in the reaction vessel. The pre-polymerized solution was poured into a glass mold placed in a −17° C. freezer for 16 h, subsequently thawing for 8 h at room temperature. Resulting gel was further polymerized in a convection oven using an 8 h polymerization process (1 h to 45° C., 217 at 45° C., 1 h to 55° C., 4 h at 55° C.). The polymerized IPN was then subjected to one more freeze-thaw cycle. Upon removal from the mold, some of the IPNs were placed in saline and some in DI water for removal of unreacted monomer. The weight and dimensional changes of the samples were recorded until equilibrium hydration was reached and until no trace monomer was detected with UV-VIS in both media (see Example 2). Table 1 shows the swelling values for PVA/PAAMPS IPNs in DI water and saline during unreacted monomer removal (see FIGS. 3 and 4).

Increasing amount of AAMPS component in the PVA-PAAMPS IPNs resulted in higher swelling in both DI water and saline media. DI water treated IPNs with all formulations showed higher swelling then their saline treated counterparts.

TABLE 1

Equilibrium Swelling values for PVA/PAAMPS IPNs in DI water and saline.

| Sample | Weight Change in saline during unreacted monomer removal (%) | Weight Change in DI during unreacted monomer removal (%) |
| --- | --- | --- |
| 15-0 PVA-PAAMPS | 28 ± 5 | 21 ± 1 |
| 15-5 PVA-PAAMPS | 130 ± 3 | 261 ± 11 |

TABLE 1-continued

Equilibrium Swelling values for PVA/PAAMPS IPNs in DI water and saline.

| Sample | Weight Change in saline during unreacted monomer removal (%) | Weight Change in DI during unreacted monomer removal (%) |
|---|---|---|
| 15-5 PVA-PAAMPS | 223 ± 5 | 507 ± 12 |
| 15-15 PVA-PAAMPS | 272 ± 12 | 686 ± 18 |

Figure 5:
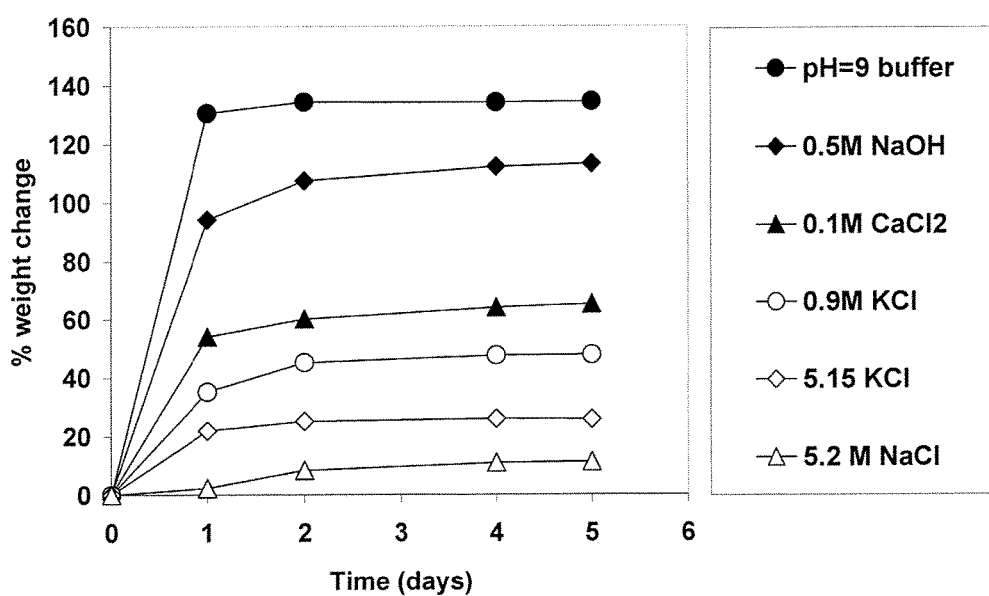
FIG. 5 shows weight change for crosslinked PVA/AAMPS IPNs in various solvents prepared by Method 2, as described in Example 1.

PVA/PAAMPS IPNs which were prepared by mixing 15% PVA with 15% AAMPS monomer were also immersed in acidic, buffer, alkaline solutions (0.9M Potassium chloride (KCl), 0.1M calcium chloride ($CaCl_2$), 0.5M sodium hydroxide (NaOH), phosphate buffer (pH=9) to exchange the un-reacted monomer and investigate the effect of immersion media (prior to annealing) on the gel properties such as EWC and creep resistance. FIG. 5 shows the swelling behaviour for PVA/PAAMPS IPNs which were immersed in these solutions. Salt and alkaline immersed IPNs exhibited lower equilibrium swelling values then their DI and saline immersed counterparts.

Figure 6:
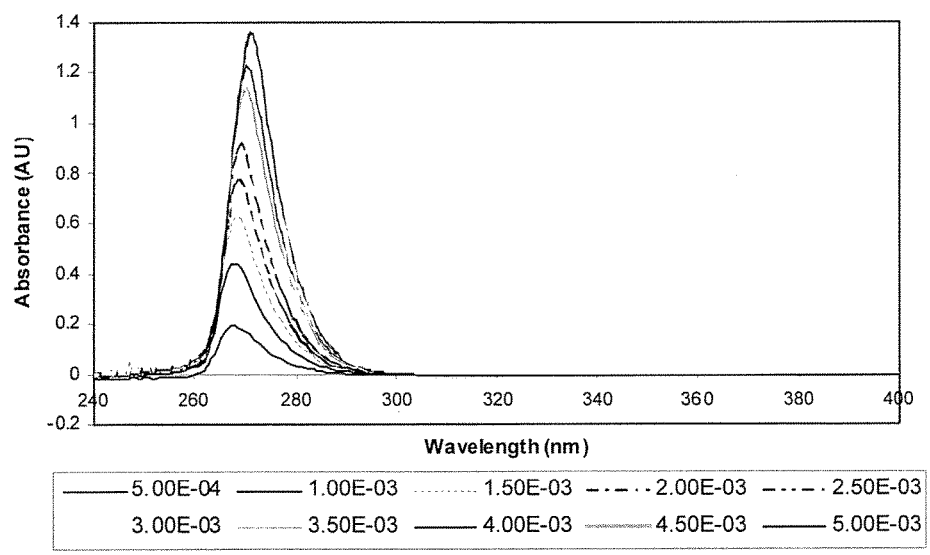
FIG. 6 depicts UV-Vis spectra of AMMPS solutions.
Figure 7:
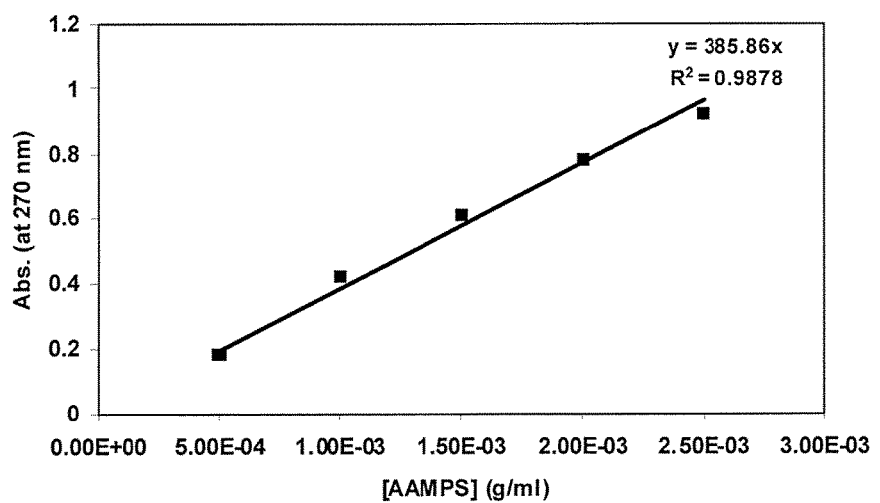
FIG. 7 illustrates that calibration curve for AMMPS solutions.
Figure 8:
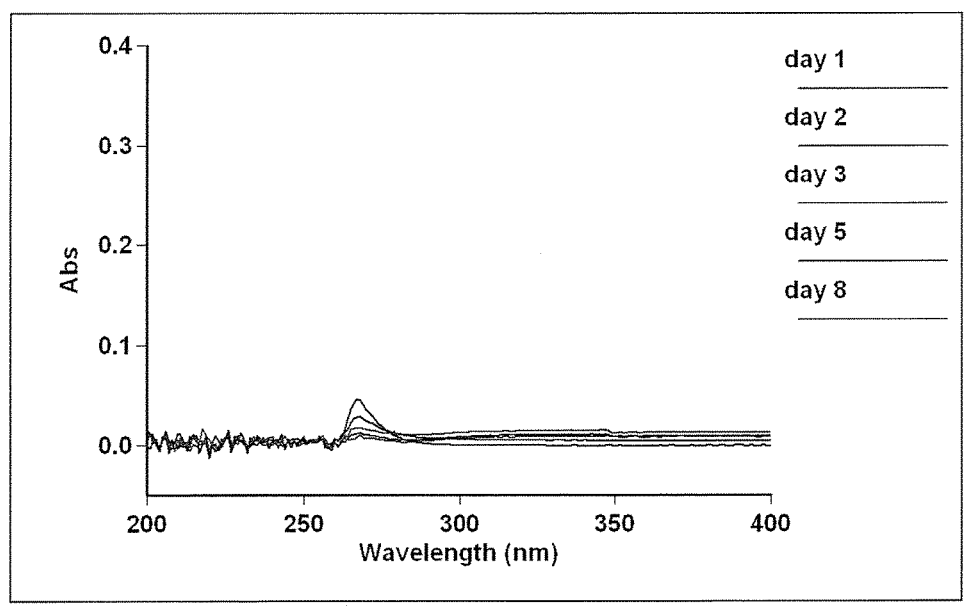
FIG. 8 illustrates the detection of AAMPS eluding out from PVA/PAAMPS gels during unreacted monomer removal in DI.

Example 2. Removal and Detection of Unreacted AAMPS Monomer from Hydrogel Network Unreacted AAMPS monomer was removed from the gel either in its as made or processed (for example, dehydrated, annealed, or the like) form by soaking in DI water by stirring and changing the water daily until equilibrium. The exchanged water (eluant) was tested for the presence of AAMPS using UV-Vis spectrophotometer. AAMPS has a peak absorbance at around 270 nm (see FIG. 6 for UV-Vis spectra of AMMPS solutions). A calibration curve was prepared with known amounts of AAMPS in DI water using the DI water as baseline (see FIG. 7 for calibration curve for AMMPS solutions). The AAMPS eluded from the gel was determined by reference to the calibration curve. After 7 days there was no detectable amount of AAMPS monomer in the solution (see FIG. 8).

Example 3. Dehydration and Annealing of Polyvinyl Alcohol-Acrylamido-Methylpropane Sulfonic Acid IPNs PVA/PAAMPS IPNs (15%-5%, 15%-10% 15%-15% PVA/PAAMPS) from Example 2 Method 2 were annealed following equilibrium dehydration in vacuum oven and 1-day polyethlene glycol (with a molecular weight of 400 g/mol namely PEG400) immersion after monomer removal in DI or saline. Annealing was carried out in a self pressurized closed chamber under argon gas at 100, 120 or 130° C. for DI or saline immersed IPNs for 1 hr while immersed in PEG400. The gels, with the exception of saline processed ones, were rehydrated in DI after annealing. The saline precessed ones were rehydrated in saline. 15-15% PVA/PAAMPS showed higher swelling before annealing and they gain more weight after annealing compared to all other formulations. Saline treated PVA/PAAMPS formulations reswell less after annealing compared to their DI treated counterparts.

Figure 9:
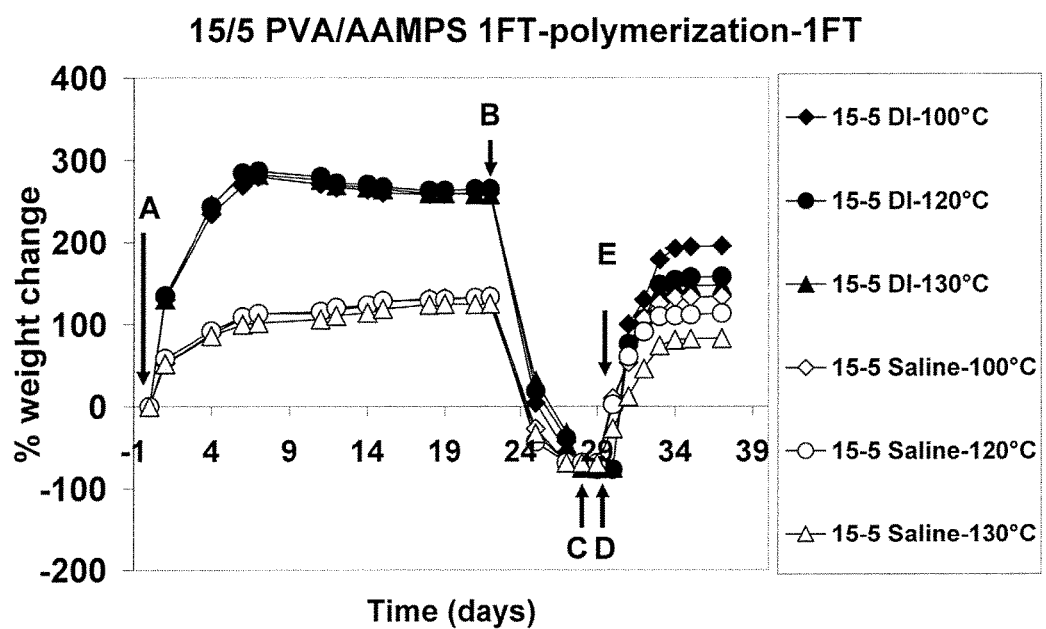
FIG. 9 shows weight change for 15-5 PVA/PAAMPS gels prepared by Method 2 (as described in Example 1) during monomer removal, dehydration in vacuum and in PEG400, annealing and subsequent rehydration in DI water or saline.
Figure 10:
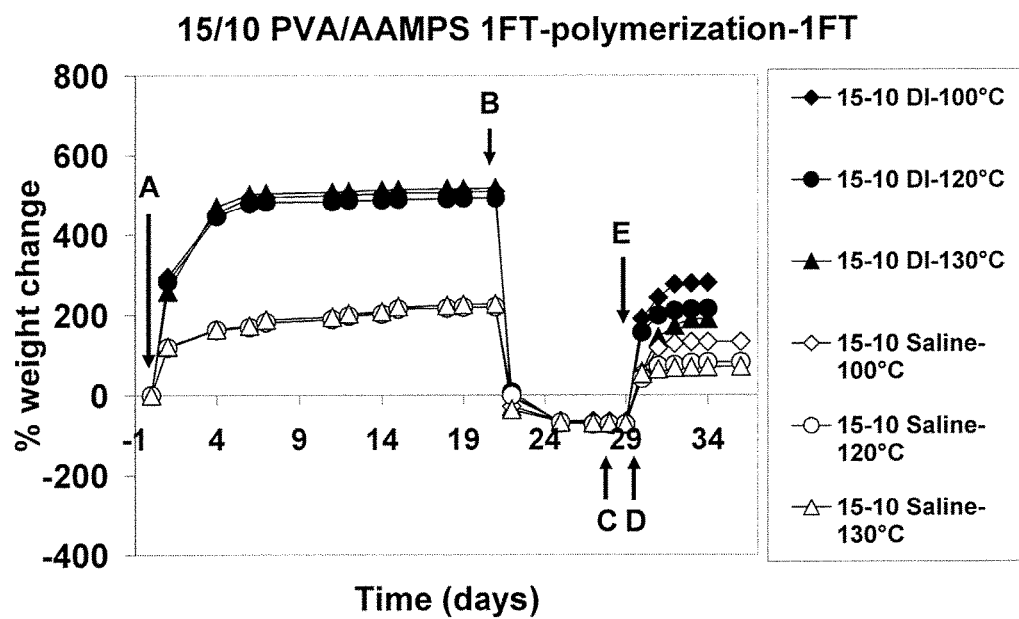
FIG. 10 shows weight change for 15-10% PVA/PAAMPS gels prepared by Method 2 (as described in Example 1) during monomer removal, dehydration in vacuum and in PEG400, annealing and subsequent rehydration in DI water or saline.
Figure 11:
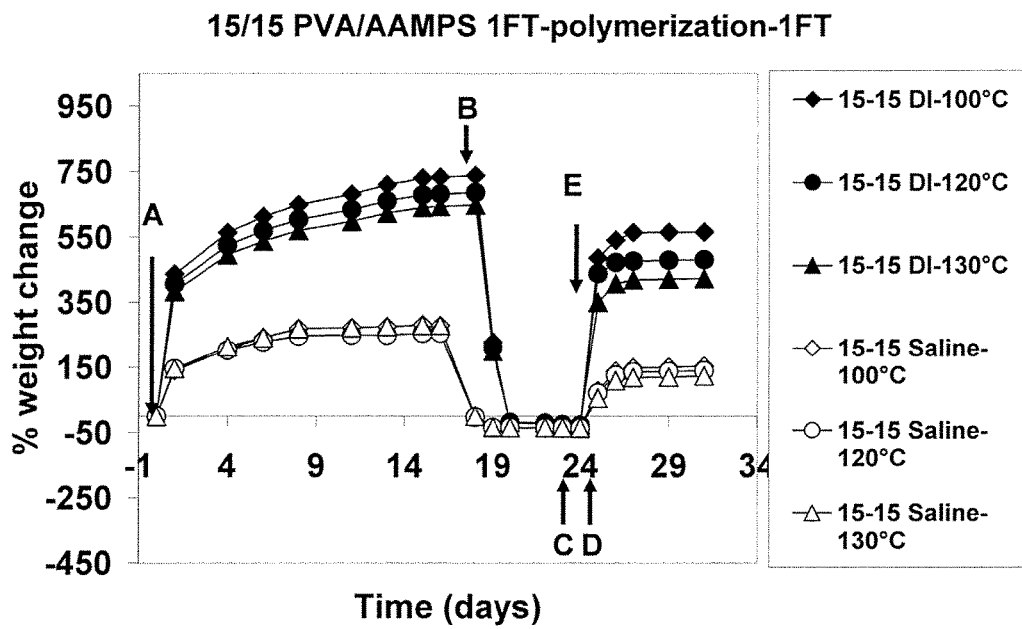
FIG. 11 shows weight change for 15-15% PVA/PAAMPS gels prepared by Method 2 (as described in Example 1) during monomer removal, dehydration in vacuum and in PEG400, annealing and subsequent rehydration in DI water or saline.

The weight changes during unreacted monomer removal, dehydration and annealing and final rehydration in respective solvents for PVA-PAAMPS are shown in FIGS. 9-11.

Figure 12:
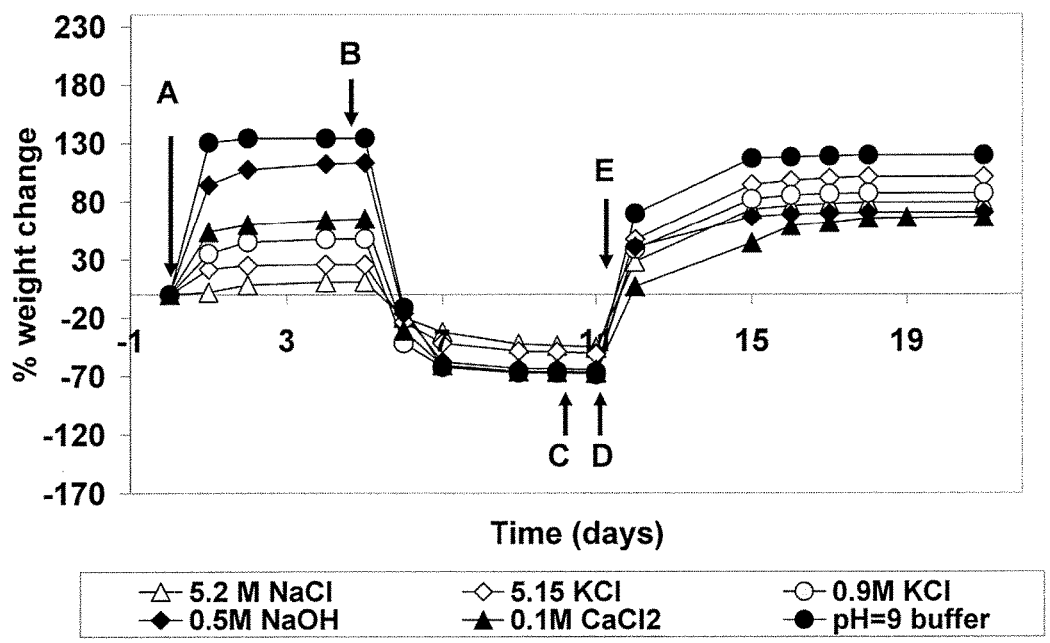
FIG. 12 shows weight change for 15-15% PVA/PAAMPS gels prepared by Method 2 (as described in Example 1)

PVA-PAAMPS IPNs (15%-15% PVA-PAAMPS) processed with 0.9M KCl, 0.1M $CaCl_2$, 0.5M NaOH and phosphate buffer (pH=9) were annealed in a self pressurized closed chamber under argon gas at 120° C. subsequent to equilibrium dehydration in vacuum oven and 1 day PEG400 immersion. All gels in this set were rehydrated in DI after annealing. FIG. 12 shows the weight changes for these gels.

Example 4. Equilibrium Water Content (EWC) of PVA/PAAMPS IPNs

EWC of the PVA/PAAMPS IPNs was measured after equilibrium rehydration either in their as made or processed (for example, dehydrated, annealed, solvent treated and annealed or the like) forms by soaking in DI water or saline by stirring and changing the water or saline daily until equilibrium. After the equilibrium hydration level was reached, the equilibrium hydration weights of the specimens were recorded. Subsequently, the gel specimens were dried first one day in vacuum oven at RT then in an air convection oven at 90° C. until no significant changes in weight were detected. The EWC in a gel was then calculated by the ratio of the difference between the hydrated and dehydrated weights to the weight at equilibrated hydration state.

One PVA/PAAMPS specimen made without a crosslinking agent from Example 1 Method 1 was equilibrated in saline solution and another one in DI water at RT. The weight and dimensional changes of the gels were recorded daily and the saline solution and DI water were replaced with fresh ones until equilibrium hydration (see Table 2). PVA/PAAMPS IPNs prepared with crosslinking agent (see Example 1 Method 1) was also measured for EWC after unreacted monomer removal and rehydration in saline and DI (see Table 3).

TABLE 2

Equilibrium water content of 15% PVA/15% AAMPS IPNs prepared without a crosslinking agent.

| Sample | EWC (%) |
|---|---|
| 15% PVA/15% AAMPS-unreacted monomer removal in saline | 90 ± 0.2 |
| 15% PVA/15% AAMPS-unreacted monomer removal in DI | 98 ± 0.1 |

TABLE 3

Equilibrium water content of 15% PVA/15% AAMPS IPNs prepared with methylene bis acrylamide crosslinking agent.

| Sample | EWC (%) |
|---|---|
| 15% PVA/15% AAMPS-unreacted monomer removal in saline | 88 ± 0.2 |
| 15% PVA/15% AAMPS-unreacted monomer removal in DI | 92 ± 0.1 |

Effect of annealing temperature on EWC was also investigated for the annealed PVA/PAAMPS IPNs (15%-5%, 15%-10% 15%-15% PVA/PAAMPS) which were synthesized with the method of Example 1 Method 1. The annealing of these IPNs were described in Example 3. FIG. 13 shows the EWC of PVA/PAAMPS gels which were first immersed in DI or saline, then dehydrated under vacuum at RT followed by immersion in PEG400 for 1 day, subsequent annealing at various temperatures (100, 120 and 130° C.) and rehydration in respective media. FIG. 13 also shows the EWC of non annealed controls in saline and DI. Increasing AAMPS content resulted in higher EWC for all formulations for both of the swelling media, namely saline or DI. Overall, increase in the annealing temperature resulted in a decrease in EWC. Saline processed gels showed lower EWC compared to their DI processed counterparts.

Example 5. Creep Behavior of PVA/PAAMS IPNs

Hydrogel sheets for the samples from Example 2 Method 2 were cut with a 16 mm diameter trephine and were allowed to equilibrate in saline solution at 40° C. for 24 hours prior to the start of the creep test.

The hydrogel creep test was done on a MTS (Eden Prairie, Minn.) 858 Mini Bionix servohydraulic machine. Cylindrical hydrogel specimens, approximately 16 mm in diameter and between 5-10 mm in height, were placed between stainless steel compression plates for testing. Prior to the start of the test, the top and bottom compression plates were brought together and the LVDT displacement was zeroed at this position. After placing the specimen on the bottom plate, the top plate was lowered until it made contact with the top surface of the creep specimen. The displacement reading from the LVDT on the MTS was recorded as the initial height of the specimen.

The compressive load was initially ramped at a rate of 50 N/min to a creep load of 100 N. This load was maintained constant for 10 hours. The load was subsequently reduced at a rate of 50 N/min to a recovery load of 10 N and was held there for 10 hours. FIG. 14 shows creep behavior of annealed and non-annealed 15% PVA-15% PAAMPS and 15% PVA-0% PAAMPS IPNs after removal of unreacted monomer and equilibrium swelling in DI and saline. Both DI and saline processed annealed gels exhibited better creep resistance then non-annealed gels. Saline processed annealed PVA-PAAMPS IPN showed higher creep resistance then the DI processed ones.

FIG. 15 shows creep behavior of 15% PVA-15% PVA/PAAMPS IPNs after removal of unreacted monomer in 0.9M Potassium chloride (KCl), 0.1M calcium chloride ($CaCl_2$), 0.5M sodium hydroxide (NaOH), or phosphate buffer (pH=9) with vacuum dehydration, PEG400 immersion for 1 day, annealing, and rehydration as described in Example 1 Method 2 above. Creep resistance varied with the choice of the monomer removal and swelling media.

Example 6. Determining Relative Coefficient of Friction (COF) of PVA/PAAm IPNs and Blends by Rheometer PVA/PAAMS gels (15% PVA-15% PAAMS) were tested for relative COF in DI water or saline (depending on which one of these solutions were used to remove the unreacted monomer and reswelling after annealing) at 40° C. against CoCr. An aluminum bath was mounted onto the Peltier plate and the hydrogel sample was placed in the bath. In this test, custom made implant-quality finish cobalt-chromium annular ring ($R_a$ 0.02 µm) with an inner radius of 1.44 cm and a contact area of 1.42 $cm^2$ was mounted into the upper fixture of a shear rheometer (AR-2000, TA Instruments Inc.). The CoCr was rubbed against the hydrogel sample at a constant angular velocity of 0.1 rad/s. The torsional load was recorded under normal loads of approximately 1, 3, 5, and 10 N. Using the method of Kavehpour and McKinley (see Kavehpour and McKinley, *Tribology Letters*, 17(2), pp. 327-335, 2004), the coefficient of friction between the hydrogel and the CoCr counterface was calculated.

Relative COF values for non-annealed saline and DI immersed 15%-15% PVA/PAAMPS hydrogels from Example 1 Method 2 were measured as 0.033 and 0.055 respectively. Annealing resulted in higher COF values for both DI and saline processed IPNs. FIG. 16 shows the relative COF data of the non annealed and annealed 15-0 PVA-PAAMPS and 15-15 PVA-PAAMPS IPNs of Example 1 Method 2. Addition of AAMPS in to the PVA network significantly lowered the relative COF of the PVA-PAAMPS gels; 15-15% PVA/PAAMPS exhibited lower COF values in DI and in saline then 15-0 PVA/PAAMPS gels. Saline treated PVA/PAAMPS gels showed lower relative COF values then their DI treated counterparts. Annealing of the PVA-PAAMPS gels increased markedly the relative for the 15-0% PVA/PAAMPS formulation whereas this increase was negligible with the 15-15% PVA/PAAMPS gels. FIG. 17 shows the effect of annealing temperature on relative COF values of 15-15 PVA/PAAMPS. Increasing annealing temperature resulted in a slight increase in COF for all gels. We also investigated the effect of the initial immersion media for unreacted monomer removal (swelling) on COF. FIG. 18 shows relative COF data of annealed 15-15% PVA/PAAMPS IPNs of Example 1 Method 2. These gels were immersed in different ionic media to remove the unreacted monomer prior to annealing at 120° C. in a self pressurized vessel in PEG400. After annealing all gels were rehydrated in DI. Immersion in NaOH resulted in lowest COF values than all other media studied.

For comparison, in FIG. 19 we included two PVA-PEG theta gels which do not contain any AAMPs monomer. PVA-PEG theta gels were prepared by mixing 15% (w/w) PVA (MW=115,000 g/mol) in deionized water at 90° C. PEG (MW=400 g/mol) was added at 28% (w (PEG)/w (PEG+water)) to this solution while stirring. The solution was placed in a mold and cooled down to room temperature for gelation. Two gel groups were prepared: One group was used in their 'as-gelled' form (AG). The other group was immersed in DI after gelation for PEG removal and was used in this 'dePEGed' form (DP). AG soak ramped annealed (SRA) gel prepared by drying in a convection oven at 25° C. for 14 h, ramping to 80° C. in 8 h, then keeping at 80° C. for 20 h with a subsequent annealing period of 20 h at 160° C. under argon in a self-pressurized vessel. After annealing PEG was washed out by immersion in DI. The relative COF of the annealed PVA/PAAMPS gels after rehydration in DI or saline was markedly lower than both of the non annealed DP or annealed AG-SRA PVA/PEG gels. This large change in COF when AAMPs is added to the PVA network is mostly due to the higher water retention capacity of the AAMPs moiety even after annealing.

Example 7. Comparison of PVA/PAAMPS IPNs to Other PVA Gels Known in the Art

FIGS. 20-21 shows the COF and creep strain comparison for PVA-PEG gels (as described in Example 6) and PVA/PAAMPS gels and 15-0% PVA/PAAMPS and 15-15% PVA/PAAMPS gels before and after annealing. Annealing results in better creep resistance for all gels. For PVA-FT gels, annealing significantly lowered the creep strain. COF values for the annealed PVA-PEG and PVA-FT gels were adversely affected by annealing. PVA-PAAMPS gels however exhibited almost same level of COF after annealing. Therefore, the PVA-hydrogels did not lose significant lubricity upon annealing (see FIG. 21).

Example 8. Determining Pore Structure of PVA/PAAPMS IPNs and Blends by Confocal Laser Scanning Microscopy (CLSM)

The microstructure of hydrogel specimens in their hydrated state was imaged using confocal laser scanning microscopy. Thin sections were cut from the central bulk region of each hydrogel specimen using a razor blade. Each cut section was placed in a vial with 1.8 ml of 0.15M aqueous solution of sodium bicarbonate (Aldrich) at pH 9.0 for at least 2 days with agitation. The fluorochrome dye reagent was prepared by dissolving 5 mg of 5-(4,6-dichlorotriazinyl)amino fluorescein) (5-DTAF, Invitrogen, Carlsbad, Calif.) in 1.0 ml anhydrous dimethylformamide. 0.1 ml of the dye reagent was added to each sample vial while stirring and the samples were kept at 4° C. for incubation for 1 hour with stirring. After reaction, the hydrogel specimens were rinsed with saline solution several times to remove non-reacted dye molecules. Hydrogel specimens were imaged by a Zeiss LSM 510 system, with a 488 nm spectral band Argon laser for fluorochrome excitation and a 520 nm bandpass filter for detection.

Confocal images of 15% PVA-15% PVA/PAAMPS IPNs from Example 1 Method 2 are depicted in FIG. 22. These gels were immersed in DI, saline 0.9M KCl, 0.1M $CaCl_2$, 0.5M NaOH and phosphate buffer (pH=9) for unreacted monomer removal and subsequently annealed at 120° C. All IPNs with the exception of saline immersed ones were rehydrated in DI after annealing, saline immersed IPNS were rehydrated in saline. PVA/PAAMPS gels did not show a porous structure which is detectable with confocal microscopy.

Example 9. Preparation of PVA/PAAMPS Blends

A 15 g of polyvinyl alcohol (PVA, Molecular weight=115, 000 g/mol, Scientific Polymer Products, Ontario, N.Y.) was dissolved in 45 g of deionized (DI) water at 90° C. by constant stirring. After a clear PVA solution was formed, 43 g of PAAMS (MW=1,300 000 g/mol, Sigma-Aldrich Inc. St Louis, Mo.) solution (prepared by dissolving 3 g of PAAMS in 40 g of water) were added to this solution and stirred until it formed a clear solution. The PVA-PAAMPS solution was poured into a hot glass mold and sealed with a glass cover. The mold was then placed in a −17° C. freezer for 16 hours between two stainless steel blocks, and thawed for 8 hours. This freeze-thaw process was repeated for five cycles. Upon removal from the mold, the hydrogel sheet was immersed in water and stirred until equilibrium rehydration.

Example 10. Additional Methods for Crosslinked PVA/PAAMPS IPNs

Additional methods for crosslinked PVA/PAAMPS IPNs synthesis are shown in FIGS. 23-24.

Exemplary Method 1. Crosslinking by Irradiation

In the irradiation method, PVA/PAAMPS mixture prepared by the method from Example 1 Method 1 or Method 2 and irradiated either in its solution form or gel form with various PVA/PAAMPS formulation (see FIG. 23). In the solution form, PVA-AAMPS solution with or without initiator and crosslinking agent is subjected to irradiation (10, 25, 50, and 100 kGy gamma or e-beam or UV light) without pre-polymerization and subsequent FT. In the polymer form, PVA-AAMPS IPNs with or without initiator and crosslinking agent are and subjected to irradiation (10, 25, 50, and 100 kGy gamma or e-beam or UV light) after pre-polymerization and subsequent FT cycles. In each method resulting gels are placed in either saline or DI water for removal of unreacted monomer to determine the swelling behavior and equilibrium water content of the polyvinyl alcohol-acrylamido-methylpropane sulfonic acid IPN either after additional FT or as irradiated. The weight and dimensional changes of sample is recorded until the equilibrium is reached for IPNs in both saline and DI. Resulting gels are processed according to the chart as shown in FIG. 24.

Exemplary Method 2. Preparation of PVA/PAAMPS IPNs by Diffusion of AAMPS Monomer in to PVA-Theta Gels and PVA-Freeze-Thaw Gel PVA/PAAMPS gels is prepared by diffusing AAMPS monomer and initiator in to a host PVA-theta gel. PVA solution (15, 20, and 25% (w/w), molecular weight=16, 86, 115, and 250 K g/mol) is prepared by dissolving PVA in deionized water at 90° C. while stirring continuously. Polyethylene glycol (PEG, 25, 28, 33, and 40% weight, MW=200, 400, 600, and 1000 g/mol) is added to the PVA solution while stirring at 90° C. PEG concentrations is calculated based on the following formula: % PEG=(weight of PEG/weight of PEG and water). The resulting PVA-PEG solution is centrifuged to remove air bubbles and poured into a heated glass mold kept at 90° C. The mold is covered by a glass cover kept at 90° C. and is sandwiched between two hot stainless steel blocks. The sandwiched mold is kept at room temperature for 24 hours and allowed to cool down and thus the PVA-PEG solution form a gel. The resulting gel is either used in its 'as gelled' form or immersed in deionized water room temperature on a rotary shaker for at least 7 days for the completion of dePEGing. Equilibrium dePEGing is determined by periodically weighing the gels. Both as-gelled and DePEGed PVA gel are immersed in AAMPS (5, 10, 15, 20, 25, and 50% w/w)-water-initiator solution (azobisisobutyronitrile, (AIBN) and ammonium persulfate (APS)=0.1, 1, and 5 weight percent of AAMPS monomer). Thus, some of the water in the gel is replaced with AAMPS-initiator solution. The resulting matrix is polymerized in a convection oven by heating. After polymerization, resulting gel is placed in water for removal of unreacted AAMPS monomer by stirring continuously and changing the water daily until no trace monomer is detected by UV-Vis. Post polymerization of the AAMPS infused PVA-theta gels also can be carried out by irradiating these gels to different doses by gamma or e-beam or exposing to UV light. Diffusion of the AAMPS monomer in to as-gelled and DePEGed PVA gels can be carried while these gels are in their as is, partially DePEGed, dehydrated, partially dehydrated or annealed forms. Resulting gels from these methods can be subjected to an additional step such as additional freeze-thaw, solvent dehydration, vacuum dehydration, annealing subsequent to dehydration for toughening. Crosslinking of these AAMPS infused gels can be carried out by adding a crosslinking agent such as methylene bis acrylamide during thermal polymerization or exposing these AAMPS infused formulation to gamma, ebeam irradiation or uv-light with or without crosslinking agent.

PVA-PAAMPS IPNs can also be made by diffusing the AAMPS monomer in to PVA-Freeze-thaw gels. PVA solution (5, 10, 15, 20, 25, 30% w/w) is prepared by dissolving PVA at 90° C. in DI water and poured into a hot glass mold and sealed with a glass cover. The mold is then placed in a −17° C. freezer for 16 hours, and subsequently thawed for 8 hours. After one or more freeze-thaw cycles, the resulting gel is immersed into an AAMPS (5, 10, 15, 20, 25, and 50% w/w)-initiator-water solution (azobisisobutyronitrile, (AIBN) and ammonium persulfate (APS)). After this process a swollen gel matrix is formed. The resulting matrix is polymerized in a convection oven by heating. After polymerization, gel was placed in water for removal of unreacted AAMPS monomer by stirring continuously and changing the water daily until no trace monomer was detected by UV-Vis. Post polymerization of the AAMPS infused PVA-FT gels also can be carried out by irradiating these gels to different doses by gamma or e-beam or exposing to UV light. Diffusion of the AAMPS monomer in to as-gelled and DePEGed PVA gels can be carried while these gels are in their as is, partially DePEGed, dehydrated, partially dehydrated or annealed forms. Resulting gels from these methods can be post processed by subjected to an additional freeze-thaw, solvent dehydration, vacuum dehydration, annealing subsequent to dehydration to toughen the polymer network. Crosslinking of these AAMPS infused gels can be carried out by adding a crosslinking agent such as methylene bis acrylamide during thermal polymerization or exposing these AAMPS infused PVA-FT formulations to gamma, ebeam irradiation or uv-light with or without crosslinking agent.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

What is claimed is:

1. A method of making a creep resistant, highly lubricious, tough and ionic hydrogel comprising:
    a) mixing an aqueous solution of a polymer with an aqueous solution of an ionic monomeric compound in presence of an initiator, thereby forming an ionic hydrogel solution, wherein the aqueous solution of the polymer comprises 1% w/w to 25% w/w of the polymer, and wherein the aqueous solution of the ionic monomeric compound comprises 5% w/w to 25% w/w of the ionic monomeric compound;
    b) heating and/or irradiating the ionic hydrogel solution, thereby forming an inter-penetrating network (IPN) structure of polymerized ionic hydrogel in the aqueous polymer solution; and
    c) subjecting the inter-penetrating network (IPN) structure of polymerized ionic hydrogel in the aqueous polymer solution to one or more freeze-thaw cycles to physically-crosslink the polymer, thereby forming a creep resistant, highly lubricious, tough and ionic hydrogel, and
    d) annealing the ionic hydrogel,
    wherein the polymer is poly(vinyl alcohol) (PVA), and the ionic monomeric compound is a acrylamido-methylpropane sulfonic acid (AAMPS) solution, and the inter-penetrating network (IPN) structure of polymerized ionic hydrogel is an inter-penetrating network (IPN) structure of polymerized PAAMPS, and the creep resistant, highly lubricious, tough and ionic hydrogel is a creep resistant, highly lubricious, tough and ionic PVA-PAAMPS-hydrogel.

2. The method according to claim 1, wherein the inter-penetrating network (IPN) structure of the polymerized ionic hydrogel at step b) is formed by heating and irradiating the ionic hydrogel solution.

3. The method according to claim 1 wherein step d) comprises:
    dehydrating the ionic hydrogel in a vacuum to form a dehydrated hydrogel, thereby increasing the melting point of the ionic hydrogel;
    annealing the dehydrated hydrogel at a temperature below the melting point of the dehydrated hydrogel; and
    re-hydrating the dehydrated hydrogel, thereby forming a creep resistant, highly lubricious, tough and ionic hydrogel.

4. A method of making a creep resistant, highly lubricious, tough and ionic PVA-PAAMPS-hydrogel comprising:
    a) mixing an aqueous solution of poly(vinyl alcohol) (PVA) with an aqueous solution of acrylamido-methylpropane sulfonic acid (AAMPS), thereby forming a homogenous PVA-AAMPS solution, wherein the aqueous solution of the PVA comprises 1% w/w to 25% w/w of the PVA, and wherein the aqueous solution of the AAMPS comprises 5% w/w to 25% w/w of the AAMPS;
    b) pouring the PVA-AAMPS solution onto a mold;
    c) cooling the PVA-AAMPS solution by freezing at a temperature below 0° C.; and
    d) thawing the PVA-AAMPS solution to a temperature above 0° C. to physically-crosslink the PVA and form the PVA-PAAMPS-hydrogel, and
    e) annealing the hydrogel.

5. The method according to claim 4, wherein the PVA-AAMPS solution is poured into an optionally pre-heated mold followed by cooling down to room temperature, thereby allowing formation of the PVA-PAAMPS-hydrogel.

6. The method according to claim 4, wherein the PVA-PAAMPS solution is poured into an optionally pre-heated followed by freezing below 0° C. and thawing to a temperature above 0° C., thereby allowing formation of the PVA-PAAMPS-hydrogel.

7. The method of claim 4 wherein step e) comprises:
    dehydrating the PVA-PAAMPS-hydrogel at room temperature in a vacuum to form a dehydrated PVA-PAAMPS hydrogel;
    annealing the dehydrated PVA-PAAMPS hydrogel at a temperature below the melting point of the dehydrated PVA-PAAMPS hydrogel; and
    re-hydrating the dehydrated PVA-PAAMPS hydrogel, thereby forming a creep resistant, highly lubricious, tough and ionic PVA-PAAMPS-hydrogel.

8. The method according to claim 1, wherein the ionic hydrogel solution is heated at a temperature below the boiling point of the polymer solution, thereby forming an inter-penetrating network (IPN) structure of polymerized ionic hydrogel in the polymer solution.

9. The method according to claim 1, wherein the ionic hydrogel solution is heated at a temperature between about 40° C. and 45° C., thereby forming an interpenetrating network (IPN) structure of polymerized ionic hydrogel in the polymer solution.

10. The method according to claim 1, wherein the ionic hydrogel solution is irradiated, thereby forming an inter-penetrating network (IPN) structure of polymerized ionic hydrogel in the polymer solution.

11. The method according to claim 3, wherein the ionic hydrogel is dehydrated under an inert environment or in a dehydrating solvent.

12. The method according to claim 3, wherein the ionic hydrogel is dehydrated by immersing in a polyethylene glycol (PEG) solution to allow diffusion of the PEG into the hydrogel.

13. The method according to claim 3, wherein the dehydrated ionic hydrogel is annealed at a temperature about 80° C. to about 200° C., for about an hour to a few weeks.

14. The method according to claim 3, wherein the dehydrated ionic hydrogel is annealed for about 24 hours.

15. The method according to claim 7, wherein the PVA-PAAMPS hydrogel is rehydrated by soaking in a saline solution or in water.

16. The method according to claim 1, wherein the ratio of the polymer to the ionic monomeric compound is about 1:1 to about 1:3.

17. The method according to claim 1, wherein total polymer content in ionic hydrogel solution is about 10 wt % to about 50 wt %.

18. The method according to claim 1, wherein the ionic hydrogel solution is heated to a temperature above room temperature to about 90° C.

19. The method according to claim 1, wherein the freeze-thaw step is repeated for at least 1 to 100 cycles.

20. The method according to claim 1, wherein the freeze-thaw step is repeated for at least 2, 3, 4, 5, 6, 7, 8, 9, 10, or more cycles.

21. The method according to claim 3, wherein the ionic hydrogel is dehydrated to remove part or all of the water content.

22. The method according to claim 3, wherein the ionic hydrogel is dehydrated by a method comprising the steps of:
 a) contacting the ionic hydrogel with an organic solvent, wherein the ionic hydrogel comprises a polymer which is not soluble in the solvent, and wherein the solvent is at least partially miscible in water;
 b) heating the ionic hydrogel to a temperature below or above the melting point of the ionic hydrogel; and
 c) cooling the heated ionic hydrogel to room temperature.

23. The method according to claim 3, wherein the ionic hydrogel is dehydrated by a method comprising the steps of:
 a) contacting the ionic hydrogel with an organic solvent, wherein the hydrogel comprises a polymer which is not soluble in the solvent, and wherein the solvent is at least partially miscible in water; and
 b) air-drying the ionic hydrogel at room temperature.

24. The method according to claim 3, wherein the ionic hydrogel is dehydrated by a method comprising the steps of:
 a) contacting the ionic hydrogel with an organic solvent, wherein the ionic hydrogel comprises a polymer which is not soluble in the solvent, and wherein the solvent is at least partially miscible in water; and
 b) subjecting the ionic hydrogel to at least one freeze-thaw cycle and allowing the ionic hydrogel to warm-up room temperature.

25. The method according to claim 3, wherein the dehydrating is carried out by placing the ionic hydrogel in:
 a) a non-solvent, wherein
  i) the non-solvent is polyethylene glycol (PEG), alcohols, acetones, saturated salinated water, vitamin, or carboxylic acid, aqueous solution of a salt of an alkali metal, and
  ii) the non-solvent contains more than one ingredient including water, PEG, vitamin, polymer, ester, proteoglycan, and carboxylic acid, or
 b) in a supercritical fluid.

26. The method according to claim 3, wherein the dehydrating is carried out by heating the ionic hydrogel in air or in inert gas to an elevated temperature, wherein the heating rate is slow or fast, ranging from about 0.01° C./m in to about 10° C./min, or the heating follows the vacuum or air dehydration.

27. The method according to claim 3, wherein the dehydrated ionic hydrogel is re-hydrated by placing the dehydrated ionic hydrogel:
 i) in water, saline solution, Ringer's solution, salinated water, buffer solution, and the like,
 ii) in a humid chamber, or
 iii) at room temperature or at an elevated temperature.

28. The method according to claim 1, wherein the method further comprising a step of heating the ionic hydrogel to a temperature about 40° C. to about 200° C.

29. The method according to claim 1, wherein the ionic hydrogel is hydrated to reach an equilibrium.

30. The method according to claim 29, wherein the ionic hydrogel is re-hydrated in water or a salt solution.

31. An ionic hydrogel, ionic PVA-hydrogel, or a PVA-PAAMPS-hydrogel made by a process according to claim 1.

32. The PVA-PAAMPS-hydrogel made by a process according to claim 1, wherein the PVA-PAAMPS ratio is about 1:1 to about 1:3.

33. The ionic hydrogel, made by a process according to claim 1, wherein the ionic hydrogel comprises one or more hydrophilic polymers selected from the group consisting of: PVA-poly(acrylamido-methylpropane sulfonic acid (PAAMPS)) copolymer, poly(ethylene oxide)(PEO)-PAAMPS copolymer, polyvinylpyrrolidone (PVP), hyaluronic acid (HA), and poly(allylamine hydrochloride) (PAH).

34. The ionic hydrogel, made by a process according to claim 1, wherein the ionic hydrogel comprises water and/or one or more other ingredients.

35. The ionic hydrogel, made by a process according to claim 34, wherein the ingredient is poly(vinyl alcohol) (PVA), polyacrylamido-methylpropane sulfonic acid (PAAMPS), polyethylene glycol (PEG), and/or salt, proteoglycan, water soluble polymer, amino acid, alcohol, dimethyl sulfoxide (DMSO), water soluble vitamin, wherein in the ingredients is partially or completely soluble in water.

36. The ionic hydrogel made by a process according to claim 34, wherein the ingredient is polyethylene glycol (PEG), wherein the PEG is in a solution of water, ethanol, ethylene glycol, dimethyl sulfoxide (DMSO), or a suitable solvent.

37. The ionic hydrogel made by a process according to claim 34, wherein the ingredient is non-volatile.

38. The ionic hydrogel made by a process according to claim 34, wherein the ingredient is at least partially miscible in water.

39. The ionic hydrogel made by a process according to claim 34, wherein the ingredient is selected from the group consisting of polyethylene glycol (PEG), salt, NaCl, KCl, $CaCl_2$, vitamins, buffers, acids, alkaline solvents, carboxylic acids, hydrocarbons, esters, and amino acids.

40. The ionic hydrogel made by a process according to claim 34, wherein the ingredient is polyethylene glycol (PEG) of different molecular weights or a blend of PEGS of different molecular weights.

41. The ionic hydrogel made by a process according to claim 34, wherein the ingredient is a water miscible polymer.

42. The ionic hydrogel made by a process according to claim 41, wherein the water miscible polymer is polyethylene oxide (PEO), Pluronic, amino acids, proteoglycans, polyacrylamido-methylpropane sulfonic acid (PAAMPS), polyvinylpyrrolidone, polysaccharides, dermatin sulfate, keratin sulfate, chondroitin sulfate, or dextran sulfate.

43. An ionic hydrogel comprising the dehydrated hydrogel made by a process according to claim 3.

44. An ionic hydrogel made by a process according to claim 1, wherein the ionic hydrogel does not lose lubricity upon annealing.

45. An ionic hydrogel comprising the dehydrated hydrogel made by a process according to claim 3, wherein the ionic hydrogel does not lose lubricity upon annealing.

46. A medical implant comprising an ionic hydrogel, made by a process according to claim 1.

47. The medical implant of claim 46 wherein the medical implant is an interpositional device.

48. The medical implant of claim 47, wherein the interpositional device a unispacer, wherein the unispacer is a free floating articular implant in a human joint.

49. The medical implant of claim 48, wherein the human joint is a knee, a hip, a shoulder, an elbow, or an upper or an extremity joint.

50. The medical implant of claim 46, wherein the ionic hydrogel or medical implant is packaged and sterilized.

51. The medical implant of claim 46, wherein the ionic hydrogel, or the medical implant is sterilized by ionizing radiation.

52. The medical implant of claim 46, wherein the ionic hydrogel or the medical implant is sterilized by gamma or E-beam radiation.

53. The medical implant of claim 46, wherein the ionic hydrogel, or the medical implant is sterilized by a radiation dose between about 25 KGB to about 200 kGy.

54. The medical implant of claim 46, wherein the ionic hydrogel, is contacted with positively charged ions by immersing the hydrogel in a salt solution, an acidic solution, and/or an alkaline solution, thereby increasing lubricity.

55. The medical implant of claim 54, wherein the salt is NaCl, KCl, $CaCl_2$ or the like, the acidic solution is HCl, an acidic buffer, or the like, the alkaline solution is NaOH, an alkaline buffer, or the like.

* * * * *

UNITED STATES PATENT AND TRADEMARK OFFICE
CERTIFICATE OF CORRECTION

PATENT NO. : 10,189,961 B2
APPLICATION NO. : 12/676379
DATED : January 29, 2019
INVENTOR(S) : Orhun K. Muratoglu et al.

It is certified that error appears in the above-identified patent and that said Letters Patent is hereby corrected as shown below:

In the Specification

Column 2, Line 33, "GAGS" should be --GAGs--.

Column 30, Line 6, "foiming" should be --forming--.

Column 36, Line 36, "team" should be --term--.

Signed and Sealed this
Twenty-sixth Day of March, 2019

Andrei Iancu
*Director of the United States Patent and Trademark Office*